(12) United States Patent
Okagaki et al.

(10) Patent No.: US 11,879,634 B2
(45) Date of Patent: Jan. 23, 2024

(54) ILLUMINATION DEVICE

(71) Applicant: Mitsubishi Electric Corporation, Tokyo (JP)

(72) Inventors: Satoru Okagaki, Tokyo (JP); Yusuke Fujii, Tokyo (JP); Haruka Yamazaki, Tokyo (JP); Muneharu Kuwata, Tokyo (JP); Kuniko Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/612,223

(22) PCT Filed: May 27, 2019

(86) PCT No.: PCT/JP2019/020917
§ 371 (c)(1),
(2) Date: Nov. 18, 2021

(87) PCT Pub. No.: WO2020/240664
PCT Pub. Date: Dec. 3, 2020

(65) Prior Publication Data
US 2022/0221130 A1  Jul. 14, 2022

(51) Int. Cl.
*F21V 9/02* (2018.01)
*F21S 8/02* (2006.01)
(Continued)

(52) U.S. Cl.
CPC ...... *F21V 9/02* (2013.01); *F21S 8/02* (2013.01); *F21V 3/049* (2013.01); *F21V 11/00* (2013.01); *F21Y 2115/10* (2016.08)

(58) Field of Classification Search
CPC .. F21V 9/02; F21V 3/049; F21V 11/00; F21S 8/02; F21Y 2115/10; G02B 6/0011; G02B 6/0088; H05B 45/10; E06B 7/28
See application file for complete search history.

(56) References Cited

U.S. PATENT DOCUMENTS

2015/0029698 A1  1/2015  Huang et al.
2015/0109816 A1  4/2015  Yagi
(Continued)

FOREIGN PATENT DOCUMENTS

CN   107797370   *  3/2018  ............... F21V 9/02
JP   2008-202283 A    9/2008
(Continued)

OTHER PUBLICATIONS

English Translation, CN 107797370, Yamauchi, Mar. 13, 2018 (Year: 2018).*

(Continued)

*Primary Examiner* — Peggy A Neils
(74) *Attorney, Agent, or Firm* — XSENSUS LLP

(57) ABSTRACT

An illumination device includes a frame forming part that is provided at at least one position on an end part of a light-emitting panel having a light emission surface or in a vicinity of the light-emitting panel and includes a bright part region and a dark part region, a light source that emits light to be incident upon the frame forming part, and a light amount regulation part that makes intensity of light heading for a space facing the light emission surface from the dark part region weaker than intensity of light heading for the space from the bright part region in the light entering the frame forming part from the light source, or makes the intensity of the light from the bright part region stronger than the intensity of the light from the dark part region in the light entering the frame forming part from the light source.

21 Claims, 25 Drawing Sheets

(51) Int. Cl.
*F21V 3/04* (2018.01)
*F21V 11/00* (2015.01)
*F21Y 115/10* (2016.01)

(56) References Cited

U.S. PATENT DOCUMENTS

| | | |
|---|---|---|
| 2016/0273723 A1 | 9/2016 | Van Gheluwe et al. |
| 2016/0320023 A1 | 11/2016 | Meerbeek et al. |
| 2018/0095330 A1 | 4/2018 | Etienne et al. |
| 2018/0252858 A1 | 9/2018 | Lowes et al. |
| 2018/0259140 A1* | 9/2018 | Keller .................... F21S 8/006 |
| 2018/0279439 A1 | 9/2018 | Takeshita et al. |
| 2021/0190279 A1 | 6/2021 | Fujii et al. |

FOREIGN PATENT DOCUMENTS

| | | | | |
|---|---|---|---|---|
| JP | 2015-22303 A | 2/2015 | | |
| JP | 2016-536744 A | 11/2016 | | |
| JP | 2016-540349 A | 12/2016 | | |
| JP | 6081663 B2 | 2/2017 | | |
| JP | 2018-70132 A | 5/2018 | | |
| JP | 2018-517166 A | 6/2018 | | |
| WO | WO 2015/049146 | * 4/2009 | ............. | H05B 33/08 |
| WO | 2013/161941 A1 | 10/2013 | | |
| WO | WO 2017/081660 | * 5/2018 | ................ | F21V 9/02 |
| WO | 2020/065806 A1 | 4/2020 | | |

OTHER PUBLICATIONS

International Search Report and Written Opinion dated Jul. 30, 2019, received for PCT Application PCT/JP2019/020917, Filed on May 27, 2019, 11 pages including English Translation.

Extended European Search Report dated May 18, 2022, in European Application No. 19930548.3.

Office Action dated May 10, 2022, in corresponding Japanese Patent Application No. 2021-521595, 8 pages.

* cited by examiner

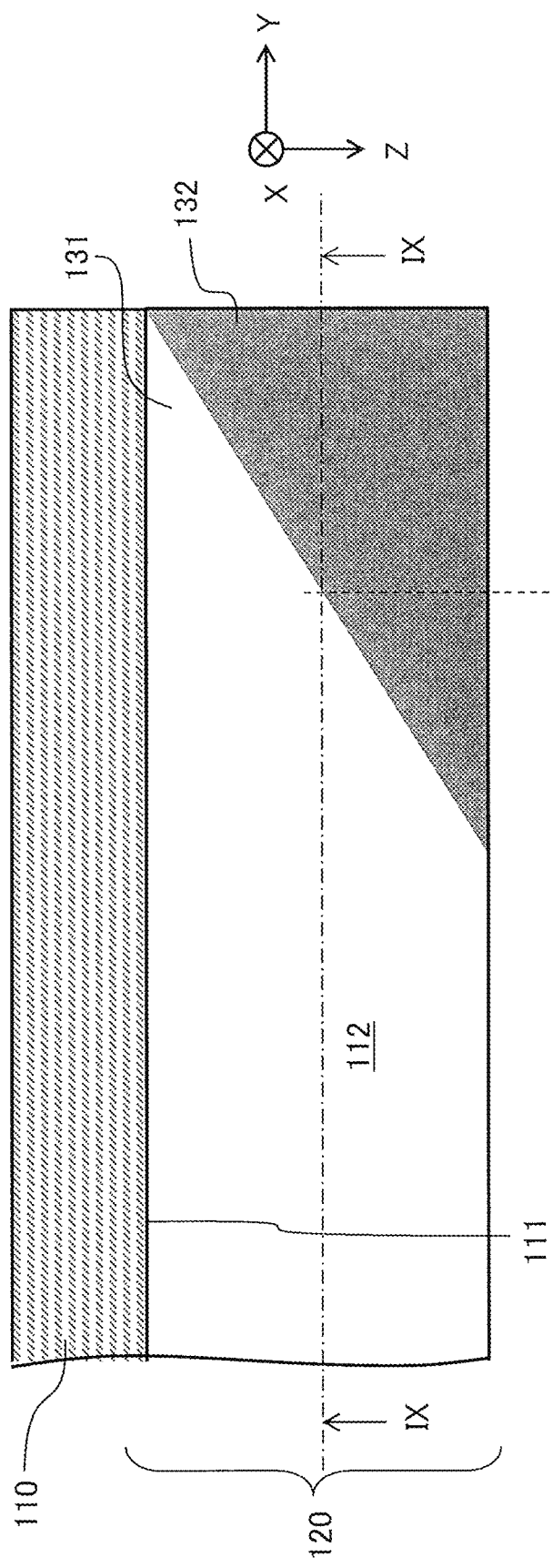
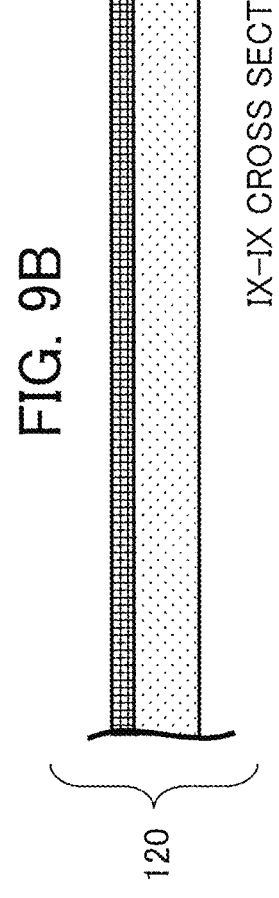

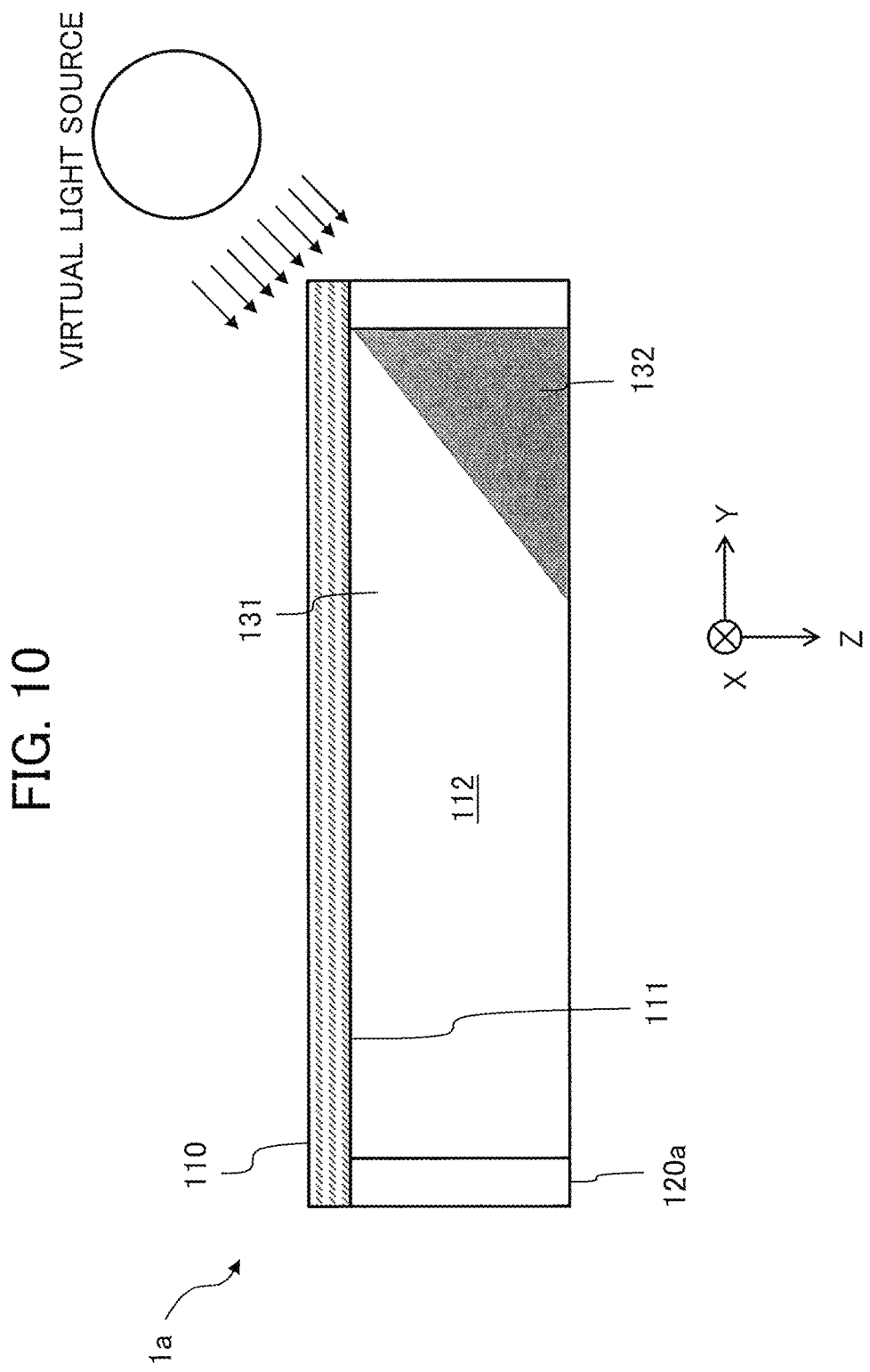

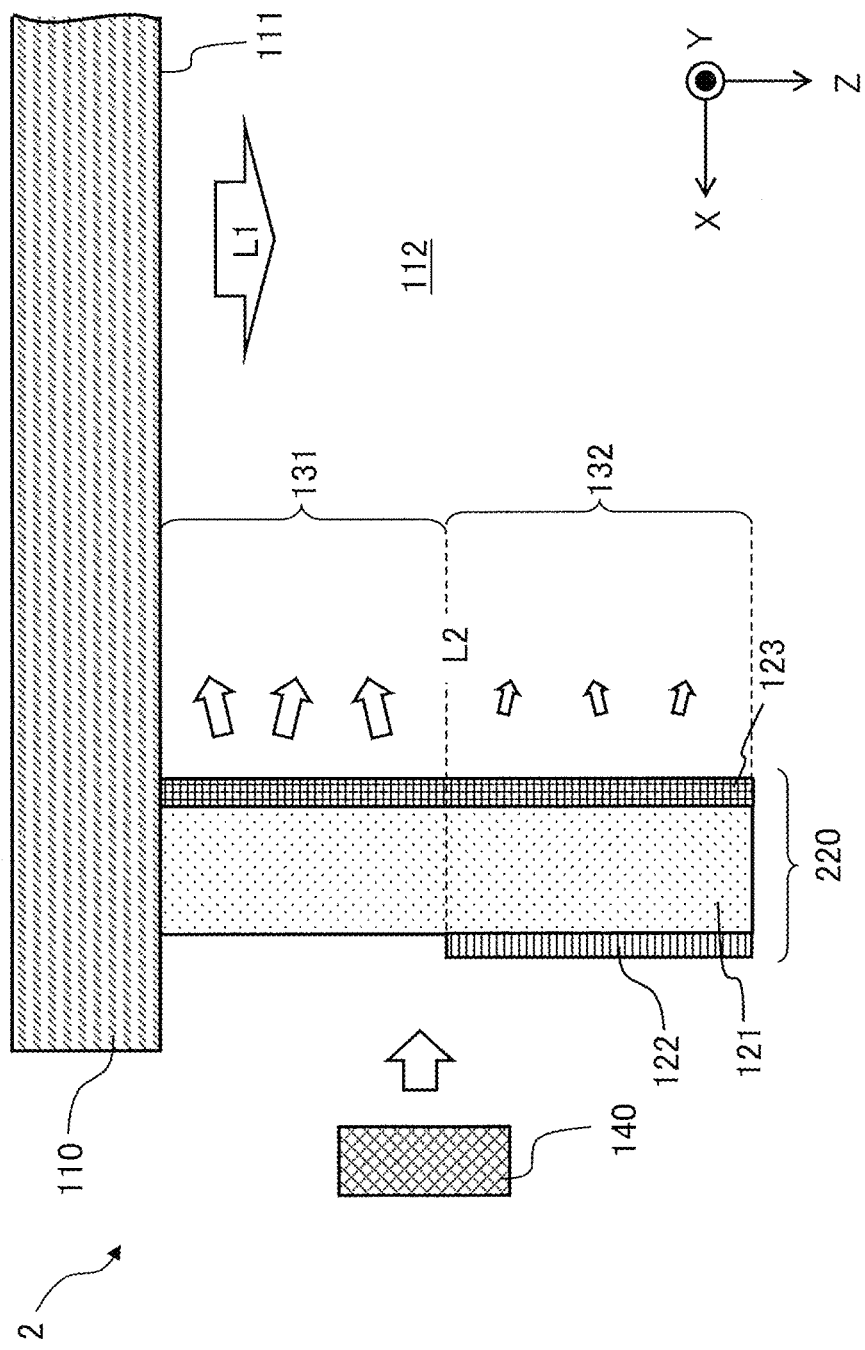

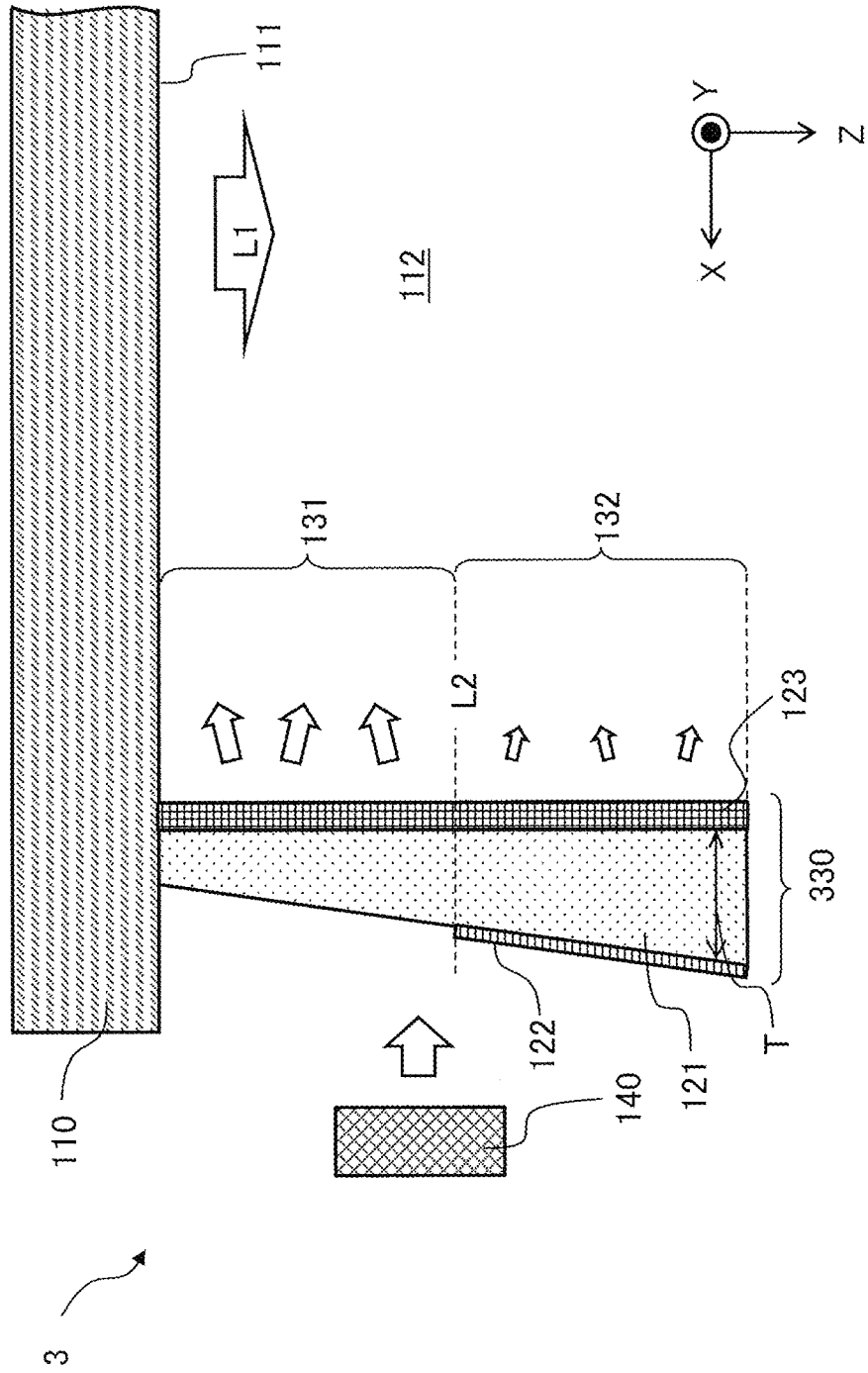

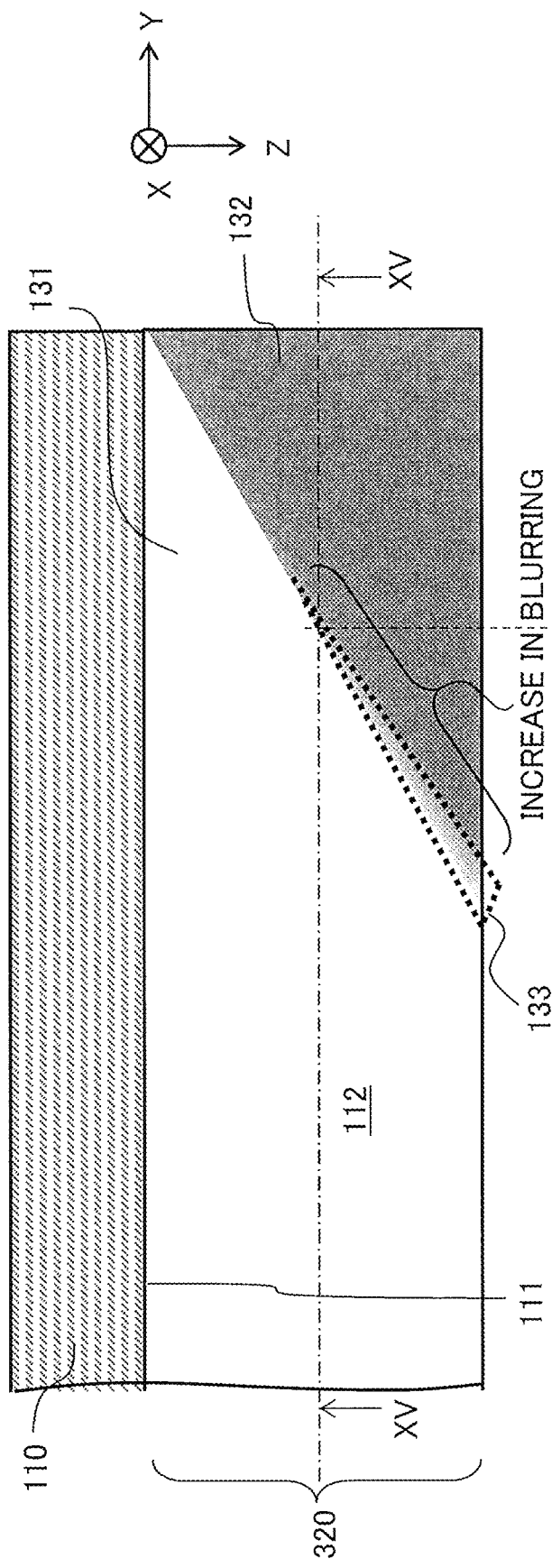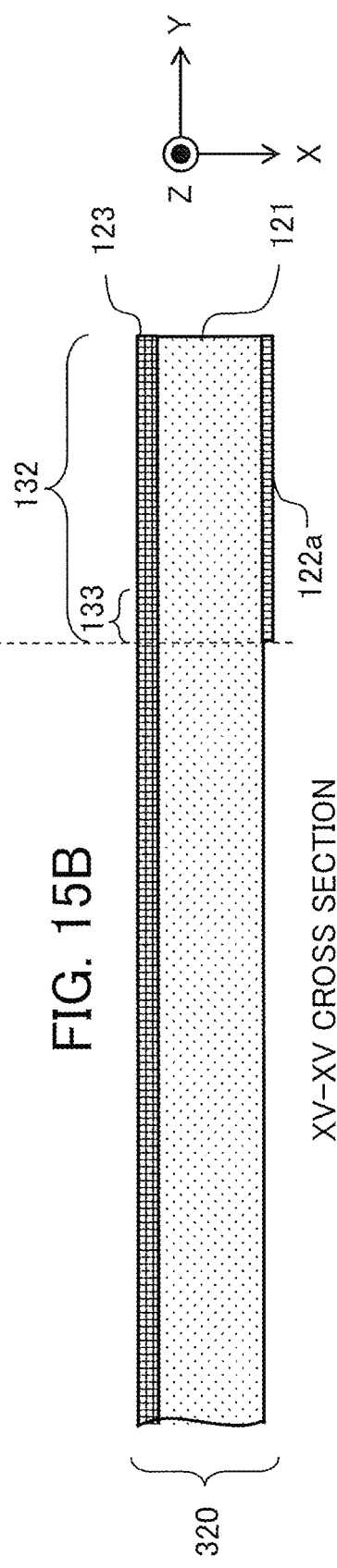

ILLUMINATION DEVICE

CROSS-REFERENCE TO RELATED APPLICATION

The present application is based on PCT filing PCT/JP2019/020917, filed May 27, 2019, the entire contents of which are incorporated herein by reference.

TECHNICAL FIELD

The present invention relates to an illumination device.

BACKGROUND ART

There has been proposed an illumination device attached to a concave part of a ceiling and having a form of a simulative skylight (see Patent Reference 1, for example). This illumination device includes an illumination panel attached to the concave part of the ceiling and a side wall around the illumination panel. The side wall includes triangular light-emitting regions that can be controlled independently, and simulates a sunny part and a shady part. The sunny part and the shady part simulate a sunny region that wound be formed by light coming in through a skylight if the illumination panel were an actual skylight and a shady region not irradiated with light.

PRIOR ART REFERENCE

Patent Reference

Patent Reference 1: Japanese Patent No. 6081663

SUMMARY OF THE INVENTION

Problem to be Solved by the Invention

However, the Patent Reference 1 has not disclosed how each of the triangular light-emitting regions of the illumination device is independently made to light up, and the relationship between the lighting/non-lighting of the triangular light-emitting regions and the control of a light source is unclear. Thus, when independent lighting/non-lighting control is performed on each of the plurality of triangular light-emitting regions, there is a problem in that the lighting/non-lighting switching stands out and that makes an observer feel unnaturalness.

An object of the present invention, which has been made to resolve the above-described problem of the conventional technology, is to provide an illumination device capable of providing the observer with natural scenery as if incoming light from the sun were shining through a light-emitting panel even in an environment with no actual incoming light from the sun.

Means for Solving the Problem

An illumination device according to an aspect of the present invention includes a frame forming part that is provided at at least one position on an end part of a light-emitting panel having a light emission surface or in a vicinity of the light-emitting panel and includes a bright part region and a dark part region, a light source that emits light to be incident upon the frame forming part, and a light amount regulation part that makes intensity of light heading for a space facing the light emission surface from the dark part region weaker than intensity of light heading for the space from the bright part region in the light entering the frame forming part from the light source, or makes the intensity of the light heading for the space from the bright part region stronger than the intensity of the light heading for the space from the dark part region in the light entering the frame forming part from the light source.

Effect of the Invention

By using the present invention, it is possible to provide the observer with more natural scenery as if incoming light from the sun were shining through the light-emitting panel.

BRIEF DESCRIPTION OF THE DRAWINGS

FIG. 9A is a front view showing an example of the bright part region and the dark part region of the frame-like member of the illumination device according to the first embodiment, and FIG. 9B is a schematic cross-sectional view taken along the line IX-IX in FIG. 9A.

FIG. 10 is a diagram showing an example of the relationship among the bright part region, the dark part region and a virtual light source in a frame-like member of an illumination device according to a modification of the first embodiment.

FIG. 13 is a principal part cross-sectional view schematically showing a configuration example of an illumination device according to a second embodiment of the present invention.

FIG. 14 is a principal part cross-sectional view schematically showing a configuration example of an illumination device according to a third embodiment of the present invention.

FIG. 15A is a front view showing an example of the bright part region and the dark part region on a frame-like member of the illumination device according to the third embodiment, and FIG. 15B is a schematic cross-sectional view taken along the line XV-XV in FIG. 15A.

MODE FOR CARRYING OUT THE INVENTION

Figure 1:
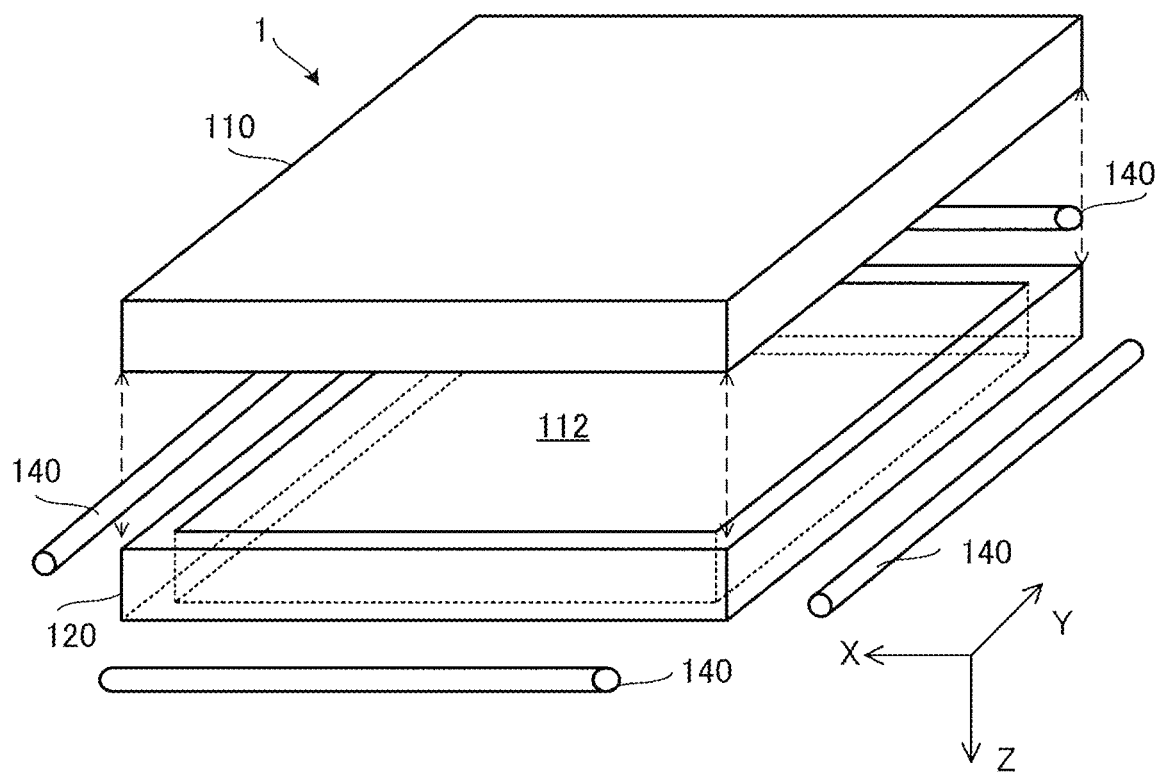
FIG. 1 is an exploded perspective view schematically showing a configuration example of an illumination device according to a first embodiment of the present invention.

An illumination device according to each embodiment of the present invention will be described below with reference to the drawings. The following embodiments are just examples and a variety of modifications are possible within the scope of the present invention.

Dimensions and reduction scales of illustrated components can vary from drawing to drawing. Coordinate axes of an XYZ orthogonal coordinate system are shown in the drawings. A Z direction is a normal direction of a light emission surface of a light-emitting panel. Incidentally, in a case where the light emission surface of the light-emitting panel includes a curved surface, an inclined surface, or both of a curved surface and an inclined surface, the Z direction may be defined as a normal direction of a central part of the light emission surface or a direction represented by the sum total of normal vectors of the light emission surface. A +Z direction represents a side in a traveling direction of light emitted from the light emission surface. For example, when the illumination device is attached to a ceiling as a horizontal surface, the +Z direction is a vertical downward direction and the −Z direction is a vertical upward direction. An X direction and a Y direction are directions orthogonal to the Z direction. When the illumination device is attached to a ceiling as a horizontal surface, the X direction and the Y direction are horizontal directions. In the following description, a +Z direction side with respect to the center of the light-emitting panel can be referred to as a front or a front side, and a −Z direction side in a direction opposite to the +Z direction side can be referred to as a rear or a back side. Further, with respect to an arbitrary position on the light emission surface of the light-emitting panel, a side heading towards an end part or the outside of the light emission surface like ±X direction sides and ±Y direction sides can be referred to as a lateral direction or a side face's side. Furthermore, while components in the drawings that are the same as each other or corresponding to each other are basically assigned the same reference character throughout the drawings, there are cases where different reference characters are assigned to such components in order to explain different features.

(1) First Embodiment (1-1) Configuration

Figure 2:
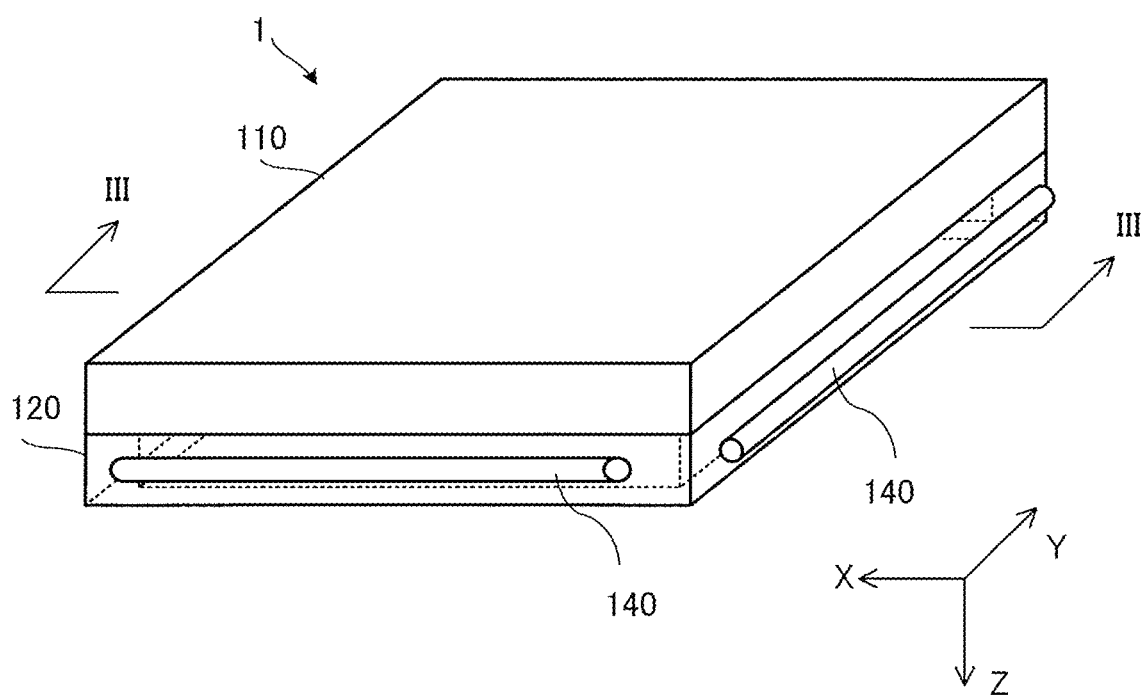
FIG. 2 is an external perspective view schematically showing the configuration example of the illumination device according to the first embodiment.
Figure 3:
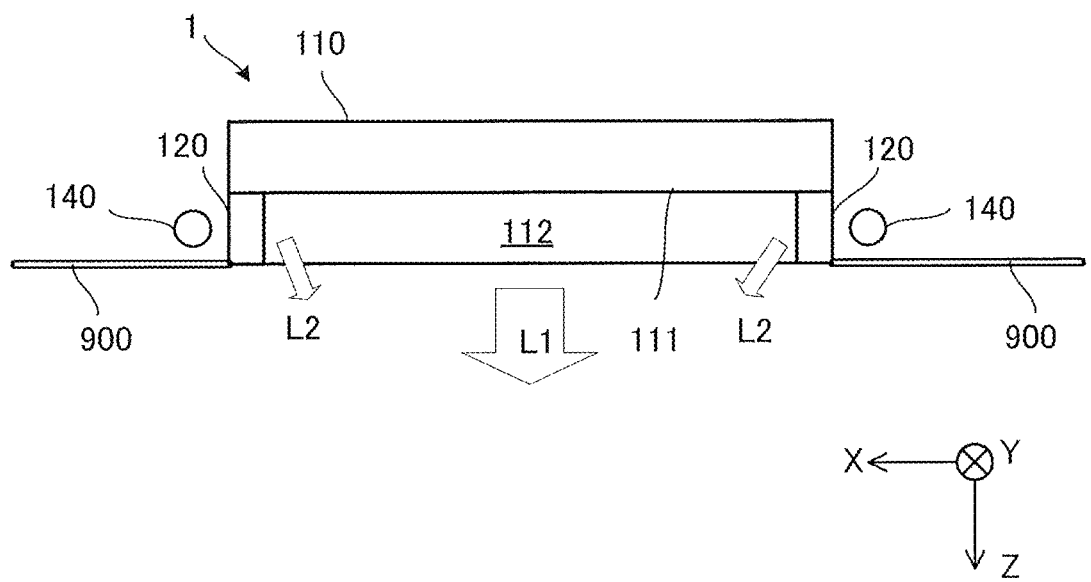
FIG. 3 is a schematic cross-sectional view of the illumination device in FIG. 2 taken along the line in FIG. 2.
Figure 4:
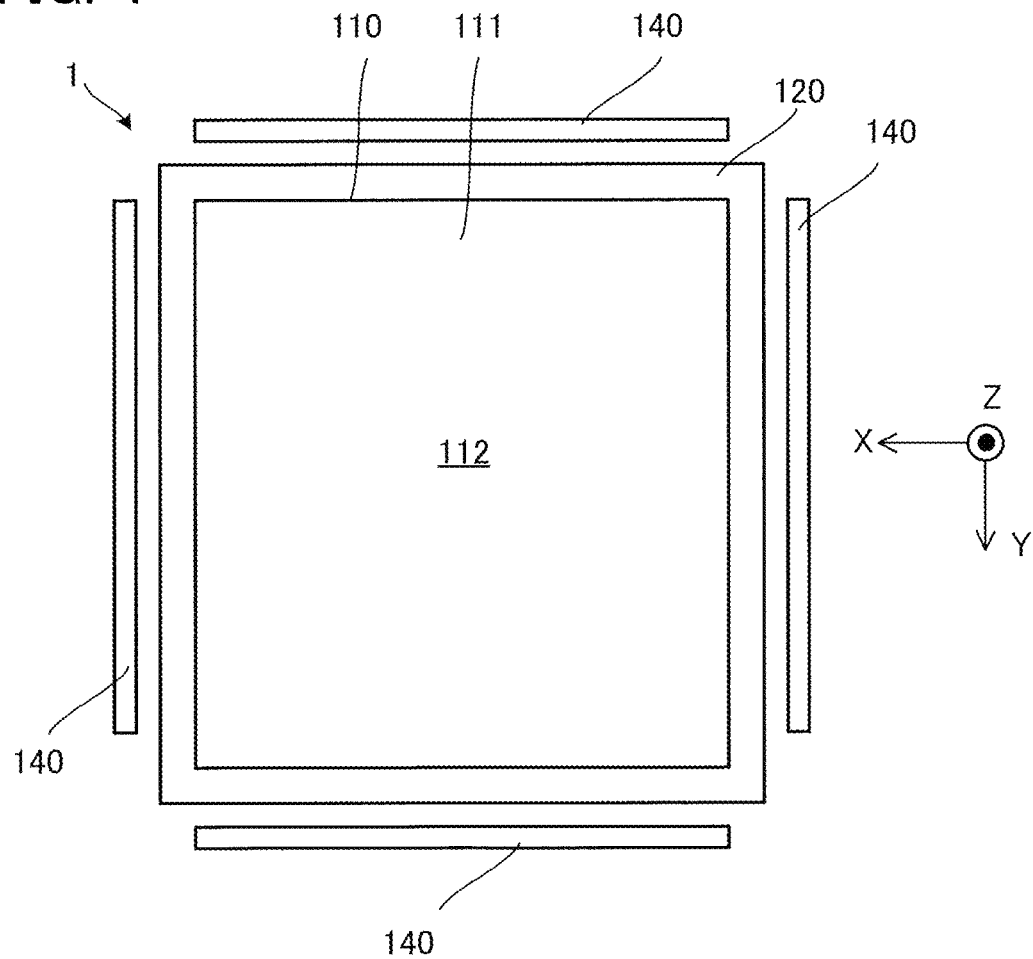
FIG. 4 is a schematic plan view showing the illumination device in FIG. 2 as viewed in a −Z direction.
Figure 5:
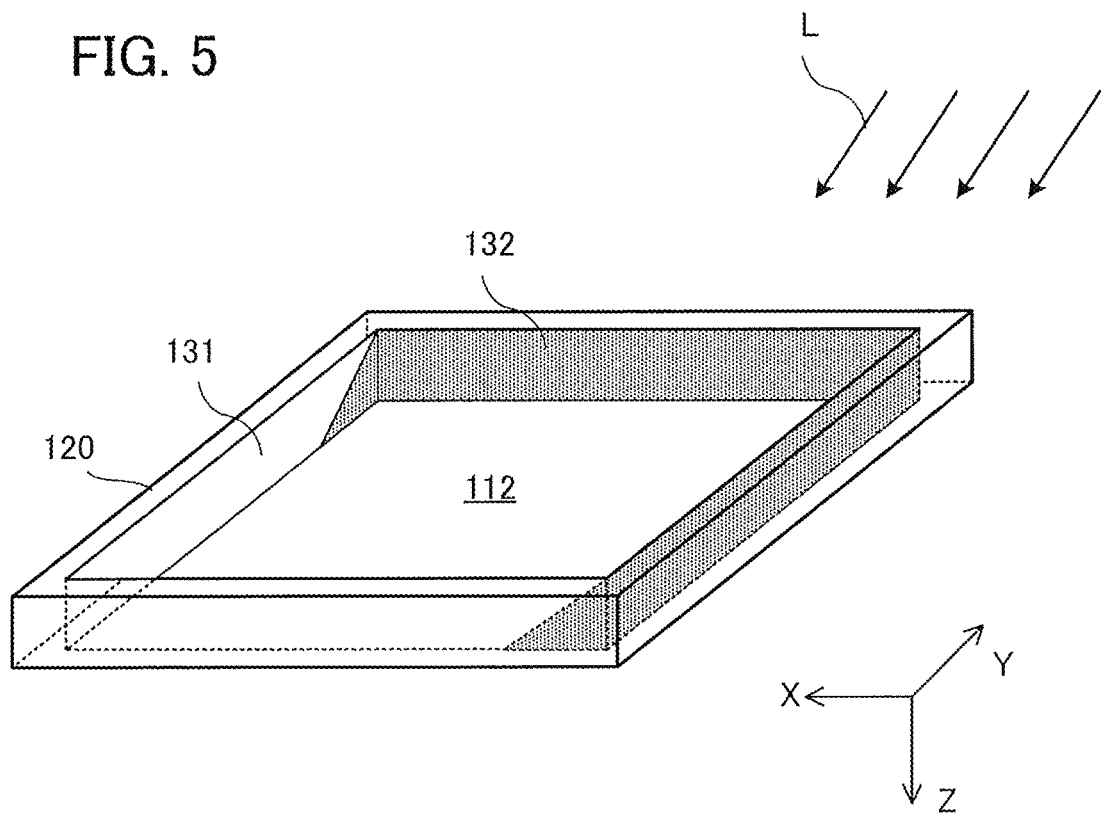
FIG. 5 is a perspective view showing a bright part region and a dark part region on a frame-like member of the illumination device according to the first embodiment.

FIG. 1 is an exploded perspective view schematically showing a configuration example of an illumination device 1 according to a first embodiment. FIG. 2 is an external perspective view schematically showing the configuration example of the illumination device 1. FIG. 3 is a schematic cross-sectional view of the illumination device 1 in FIG. 2 taken along the line in FIG. 2. FIG. 4 is a schematic plan view showing the illumination device 1 in FIG. 2 as viewed in the −Z direction. FIG. 5 is a perspective view showing a bright part region 131 and a dark part region 132 on a frame-like member 120 of the illumination device 1.

The illumination device 1 includes a frame-like member 120 provided at at least one position in an end part of a light-emitting panel 110 having a light emission surface 111 or in the vicinity of the light-emitting panel 110, a light source unit 140 that emits light towards the frame-like member 120, and a light amount regulation part 22.

The frame-like member 120 is provided in a predetermined region in an end part of the light-emitting panel 110, for example. Here, the end part of the light-emitting panel 110 means a region including a side face of the light-emitting panel 110. Incidentally, the end part of the light-emitting panel 110 includes not only the side face but also parts of a front surface and a back surface of the light-emitting panel 110 (predetermined regions) connected to the side face. Here, the side face of the light-emitting panel 110 is, for example, a surface facing sideways and contacting an edge part of the front surface as the surface where the light emission surface 111 is formed. The back surface of the light-emitting panel 110 is, for example, a surface on the side opposite to the front surface.

The frame-like member 120 is provided in a predetermined region including a certain position in the vicinity of the light-emitting panel 110, for example. Here, the vicinity of the light-emitting panel 110 is a concept including a space facing the side face of the light-emitting panel 110, a space facing the front surface of the light-emitting panel 110 and a space facing the back surface of the light-emitting panel 110.

FIG. 1 shows an example in which the illumination device 1 includes the frame-like member 120 and includes a mask 122 as an example of the light amount regulation part 22. The frame-like member 120 may be provided in a predetermined region in front of the light-emitting panel 110, for example. The frame-like member 120 may also be provided in a predetermined region lateral to the light-emitting panel 110, for example. The frame-like member 120 may also be provided in a predetermined region to the rear of the light-emitting panel 110, for example. Incidentally, FIG. 3 shows an example in which the frame-like member 120 is provided at a position in front of the light-emitting panel 110 and contacting the end part of the light-emitting panel 110.

The frame-like member 120 may be arranged to surround at least one of a space 112 facing the light emission surface 111 and the light-emitting panel 110. The frame-like member 120 may also be arranged to surround both of the space 112 and the light-emitting panel 110. For example, the frame-like member 120 may be arranged to demarcate an outer edge of the space 112 facing the light emission surface 111 in the vicinity of the light-emitting panel 110. Here, the vicinity of the light-emitting panel 110 may be defined as a space within 500 mm of the light-emitting panel 110, for example. As already explained earlier, the space in the vicinity is not limited to the +z direction. For example, the frame-like member 120 may be provided at a position within 500 mm of the light-emitting panel 110 in at least one of a forward direction, a rearward direction and a lateral direction.

Incidentally, the frame-like member 120 may be arranged with no clearance between the frame-like member 120 and the light-emitting panel 110 in the forward direction, the rearward direction or the lateral direction from the light-emitting panel 110. In this case, the light-emitting panel 110 and the frame-like member 120 may be connected together via a cushioning material or the like, for example. With such a configuration, it is possible to prevent unnecessary light (light other than light L1 that is desired to be emitted from the light-emitting panel 110 or light L2 that is desired to be emitted from the frame-like member 120) from being emitted to the inside of the space 112.

Further, the frame-like member 120 may have structure in which a plurality of members are arranged with clearance between each other. Namely, the frame-like member 120 may have structure separated into two or more parts. For example, the frame-like member 120 may have structure separated into parts corresponding to four sides forming an outer periphery of the light emission surface 111 of the light-emitting panel 110. In that case, the frame-like member 120 may have a shape in which corner parts of the light emission surface 111 are open. The frame-like member 120 may also have a shape in which a part of each side other than the corner parts is open. In that case, the frame-like member 120 may have structure in which parts are arranged with clearance in the X direction and the Y direction. The frame-like member 120 may also have structure in which parts are arranged with clearance in the Z direction like the blind structure, for example. As above, the shape of the frame-like member 120 can be provided with a variety of designability.

The light-emitting panel is referred to also as an illumination panel. The light-emitting panel 110 emits illuminating light L1 towards the space 112. The light-emitting panel 110 has a planar light emission surface 111, for example. The light emission surface 111 is not limited to a planar surface. The light emission surface 111 may be curved, for example. Further, the shape of the light-emitting panel 110 is not limited to the shape illustrated in the drawings. Besides the illustrated flat plate-like shape (shape having two surfaces connected to each other by one or more side faces), the light-emitting panel 110 can take a variety of shapes such as a spherical shape, a polyhedral shape, a columnar shape (shape in which two bases are connected to each other by one or more side faces), a barrel shape and a spool shape, for example. The light emission surface 111 is formed on a surface which the light-emitting panel 110 has, for example. Incidentally, the light emission surface 111 may also be formed in a region as a part of a surface which the light-emitting panel 110 has. The formation position, the shape, etc. of the light emission surface 111 are not particularly limited.

The light source unit 140 is a light source that emits white light, for example. The light source unit 140 emits the light towards the back side (more specifically, a back surface) of the frame-like member 120, for example. In that case, a transmissive frame-like member is provided as the frame-like member 120. Here, the back side of the frame-like member 120 means a side opposite to the front side defined as the side viewed by an observer after the installation of the illumination device. The back surface of the frame-like member 120 means a surface on a side opposite to a surface on the front side (hereinafter referred to as a front surface) defined as the surface viewed by the observer after the installation. Incidentally, "the side viewed by the observer after the installation" is more specifically a side facing the space 112 or a light emission direction of the light-emitting panel 110 (+Z direction). Thus, the front surface of the frame-like member 120 can be a surface facing the space 112 or the light emission direction of the light-emitting panel 110 (+Z direction). For example, the front surface of the frame-like member 120 includes a light emission surface (referred to also as a light-emitting surface) that emits the light L2 simulating solar light.

In the case where the illumination device 1 includes a transmissive frame-like member 120, the light source unit 140 may be arranged on the back side of the frame-like member 120. The light source unit 140 may be arranged on the back side of the frame-like member 120 along the shape of the frame-like member 120 as shown in FIGS. 1 to 4, for example. The light source unit 140 may be formed with a plurality of LEDs (light-emitting diodes). Incidentally, the LED is an example of a light-emitting element. In that case, the light source unit 140 may be configured so that a plurality of LEDs (light-emitting elements) are arranged to face the back surface of the frame-like member 120 and to be in an array of one line or a plurality of lines along the shape of the frame-like member 120, for example.

The light source unit 140 may also be configured to emit the light towards the front side (more specifically, the front surface) of the frame-like member 120, for example. In that case, a reflective frame-like member is provided as the frame-like member 120. In the case where the illumination device 1 includes a reflective frame-like member 120, the light source unit 140 may be arranged lateral to the light-emitting panel 110, for example.

Incidentally, it is also possible to use a panel-purposed light source 110a which will be described later as the light source unit 140. For example, the light source unit 140 can be left out by splitting light emitted from the panel-purposed light source 110a into light heading for the light-emitting panel 110 and light heading for the frame-like member 120. In that case, the illumination device 1 may include a light splitting part 180 such as a half mirror that turns a part of the light emitted from the panel-purposed light source 110a into the light heading for the frame-like member 120.

Further, the light source unit 140 can be left out by receiving the light emitted from the panel-purposed light source 110a via the light-emitting panel 110, for example. For example, the illumination device 1 may make use of light emitted from the light-emitting panel 110 after being emitted from the panel-purposed light source 110a and entering the light-emitting panel 110. In that case, the illumination device 1 may include a light deflection member such as a mirror that deflects the light emitted from the light-emitting panel 110 towards a direction in which the frame-like member 120 is arranged.

In the case where the panel-purposed light source 110a is used as the light source unit 140, the illumination device 1 can be considered to include the panel-purposed light source 110a as the light source unit 140. Incidentally, if the panel-purposed light source 110a is a light source that uses external light or the like by guiding the light, the illumination device 1 can be considered to include a light guide part for guiding the external light as the light source unit 140. As above, the illumination device 1 does not necessarily have to include a special light source specially for the frame-like member 120.

The shape of the frame-like member 120 is not limited to the shapes described above. Further, the shape and the position of the light source unit 140, the color of the emitted light, and the number of the emitted light beams are not limited to the examples described above.

The frame-like member 120 emits the light L2 towards the space 112 by transmitting or reflecting the light emitted from the light source unit 140. The frame-like member 120 may also emit the light L2 towards the space 112 by diffusively transmitting or diffusively reflecting the light emitted from the light source unit 140.

While examples in which the frame-like member 120 emits the light L2 by transmitting and diffusing the light emitted from the light source unit 140 will be mainly described below, it is also possible for the frame-like member 120 to emit the light L2 by reflecting and diffusing the incident light, for example. Incidentally, it is permissible even if the frame-like member 120 does not have the function of providing the light L2 with diffuseness. In the following description, the light emitted from the frame-like member 120 to the space 112 is referred to as the light L2 irrespective of whether the light is diffuse light or not.

As shown in FIG. 3, the illumination device 1 is attached to a concave part of a ceiling 900, for example. In this case, the light-emitting panel 110 simulates a skylight. To simulate the skylight, the light-emitting panel 110 emits illuminating light L1 at a color temperature representing the color of a natural sky towards a space in front (the space 112 in this example) in which the observer (user) is situated, for example. However, the illumination device 1 may also be attached to a position other than the ceiling 900, such as a wall, a door or a vehicle's body. While the light-emitting panel 110 can be a panel reproducing a natural sky such as a blue sky as above, the light-emitting panel 110 is not limited to this example. For example, the light-emitting panel 110 can be a panel emitting illuminating light L1 representing a color other than the sky color.

While the specific configuration of the light-emitting panel 110 is not limited, it is possible to take some examples of the light-emitting panel 110, such as a light guide panel as a light transmissive member that diffuses light by allowing the light to pass through, reflecting and guiding the light, a liquid crystal panel making use of a liquid crystal and a backlight, and an organic EL (ElectroLuminescence) panel. As a suitable example, the light-emitting panel 110 can be a panel that reproduces the color tone of a natural sky such as a blue sky (e.g., blue color with transparency) by using a diffusive body that exerts Rayleigh scattering or similar scattering power on the incident light. For example, the light-emitting panel 110 can be a light guide panel that receives incident light from the panel-purposed light source 110a and emits scattered light as the light L1. The light-emitting panel 110 can also be a panel of a different type capable of simulating a window.

As a concrete example of the light guide panel, there is a panel that includes an optical medium on the nanometer order and generates scattered light by having the incident light scattered by the optical medium. Here, the optical medium on the nanometer order is, for example, nanoparticles, composites (e.g., sol-gel hardened oxide), cavities, surface concave parts, surface convex parts, or the like having size on the nanometer order.

By letting light enter such a light guide panel from the back side or the side face's side, in the process of guiding the light (incident light) in the diffusive body, scattered light having a correlated color temperature higher than that of the incident light can be emitted from the light emission surface 111. Further, the light guide panel may also be configured to include a scattering layer that exerts predetermined scattering power on the incident light and a transmission layer that allows the incident light to pass through and to function as a light guide path that guides the incident light to a predetermined light guide end while making the light go back and forth between the scattering layer and the transmission layer in the diffusive body. Also with such a multilayer structure, scattered light having a correlated color temperature higher than that of the incident light can be emitted from the light emission surface 111.

As shown in FIG. 5, the frame-like member 120 includes the bright part region 131 and the dark part region 132. In the following description, a part of the frame-like member 120 in which at least one of the bright part region 131 and the dark part region 132 is provided can be referred to as a sunlight expression part 130. For example, the sunlight expression part 130 may be provided in a predetermined region on the front surface of the frame-like member 120. The bright part region 131 and the dark part region 132 on the frame-like member 120 respectively simulate a sunny part and a shady part formed by incoming light L from the sun that is assumed to irradiate the frame-like member 120 through the light-emitting panel 110. To simulate the sunny part and the shady part, the frame-like member 120 emits the light L2.

The light amount regulation part 22 is provided, for example, in an optical path until the light emitted from the light source unit 140 enters the frame-like member 120 and is emitted as light heading for the space 112. For example, the light amount regulation part 22 can be a light restriction member having a function of making the intensity of light heading for the space 112 from the dark part region 132 weaker than the intensity of light heading for the space 112 from the bright part region 131 in the light entering the frame-like member 120 from the light source unit 140. The light amount regulation part 22 can also be, for example, a light extraction member having a function of strengthening the intensity of the light heading for the space 112 from the bright part region 131 than the intensity of the light heading for the space 112 from the dark part region 132 in the light entering the frame-like member 120 from the light source unit 140. By providing such a light amount regulation part 22, the observer is made to visually recognize the dark part region 132 as a region darker than the bright part region 131. The intensity of light is referred to also as a light amount per unit area or luminance.

In the case where the illumination device 1 includes a transmissive frame-like member 120, the illumination device 1 may include, for example, a light restriction member (hereinafter referred to as a first light restriction member) that makes the intensity of light advancing to the space 112 from the dark part region 132 weaker than the intensity of light advancing to the space 112 from the bright part region 131 by absorbing or reflecting a part of light entering from the back side of the frame-like member 120 as the light amount regulation part 22. For example, the mask 122 is an example of such a first light restriction member.

The first light restriction member can be an optical member that is arranged in the dark part region 132, or in a region corresponding to the dark part region 132 and situated in an optical path until the light emitted from the light source unit 140 enters the back surface of the frame-like member 120 and is emitted from the front surface of the frame-like member 120 as the light heading for the space 112, and absorbs or reflects at least a part of the entered light. By including such an optical member, it is possible to make the intensity of light advancing to the space 112 through the dark part region 132 weaker than the intensity of light advancing to the space 112 through the bright part region 131 in the light from the light source unit 140.

Here, the "optical path until the light emitted from the light source unit 140 enters the back surface of the frame-like member 120 and is emitted from the front surface of the frame-like member 120 as the light heading for the space 112" includes an optical path until the light emitted from the light source unit 140 enters the back surface of the frame-like member 120 and an optical path until the light entering the back surface of the frame-like member 120 is emitted from the front surface of the frame-like member 120 as the light heading for the space 112. Therefore, the aforementioned optical path includes not only the path between the light source unit 140 and the frame-like member 120 (e.g., a space on the back side of the frame-like member 120) but also the front surface of the frame-like member 120, various interfaces in the frame-like member 120, and so forth.

The "region corresponding to the dark part region 132" in such an optical path means a region (range in directions in which the light spreads) at an arbitrary position (position in the traveling direction of the light) in the optical path in which the light from the light source unit 140 passing through the region turns into the light heading for the space 112 from the dark part region 132 of the frame-like member 120. For example, when the dark part region 132 is formed on the front surface of the frame-like member 120, a region on the back surface facing the dark part region 132 formed on the front surface may be specified as the region corresponding to the dark part region 132 in a case where the region means a region on the back surface of the frame-like member 120.

Incidentally, a region corresponding to the bright part region 131 may be defined by replacing the dark part region 132 in the above description of the "region corresponding to the dark part region 132" with the bright part region 131. The same goes for the reflective frame-like member 120.

The first light restriction member may be provided, for example, between the light source unit 140 and the frame-like member 120, on a surface of the frame-like member 120 where an incidence surface for the light from the light source unit 140 or the light emission surface is formed, or at one of various interfaces existing in the frame-like member 120, so as to cover the dark part region 132 or the region corresponding to the dark part region 132.

In the case where the illumination device 1 includes a reflective frame-like member 120, the illumination device 1 may include, for example, a light restriction member (hereinafter referred to as a second light restriction member) that makes the intensity of the light advancing to the space 112 from the dark part region 132 weaker than the intensity of the light advancing to the space 112 from the bright part region 131 by absorbing or transmitting (preventing reflection of) a part of light entering from the front side of the frame-like member 120 as the light amount regulation part 22.

For example, the second light restriction member can be an optical member that is arranged in the dark part region 132, or in a region corresponding to the dark part region 132 and situated in an optical path until the light emitted from the light source unit 140 enters the front surface of the frame-like member 120 and is emitted again from the front surface of the frame-like member 120 as the light heading for the space 112, and absorbs or transmits (prevents reflection of) at least a part of the entered light or deflects at least a part of the entered light into an angle not heading for the space 112. By including such an optical member, it is possible to make the intensity of light reflected by the frame-like member 120 and advancing to the space 112 from the dark part region 132 weaker than the intensity of light advancing to the space 112 from the bright part region 131 in the light from the light source unit 140.

Here, the "optical path until the light emitted from the light source unit 140 enters the front surface of the frame-like member 120 and is emitted again from the front surface of the frame-like member 120 as the light heading for the space 112" includes an optical path until the light emitted from the light source unit 140 enters the front surface of the frame-like member 120 and an optical path until the light entering the front surface of the frame-like member 120 is emitted again from the front surface of the frame-like member 120 as the light heading for the space 112. Therefore, the aforementioned optical path includes not only the path between the light source unit 140 and the frame-like member 120 (e.g., a space on the front side of the frame-like member 120) but also the front surface of the frame-like member 120, various interfaces in the frame-like member 120, a path between the frame-like member 120 and a light reflection member if the frame-like member 120 and the light reflection member are arranged separately from each other, and so forth.

The second light restriction member may be provided, for example, between the light source unit 140 and the frame-like member 120, on a surface of the frame-like member 120 where the incidence surface for the light from the light source unit 140 or the light emission surface is formed, at one of various interfaces existing in the frame-like member 120, or between the frame-like member 120 and the light reflection member, so as to cover the dark part region 132 or the region corresponding to the dark part region 132.

Figure 6:
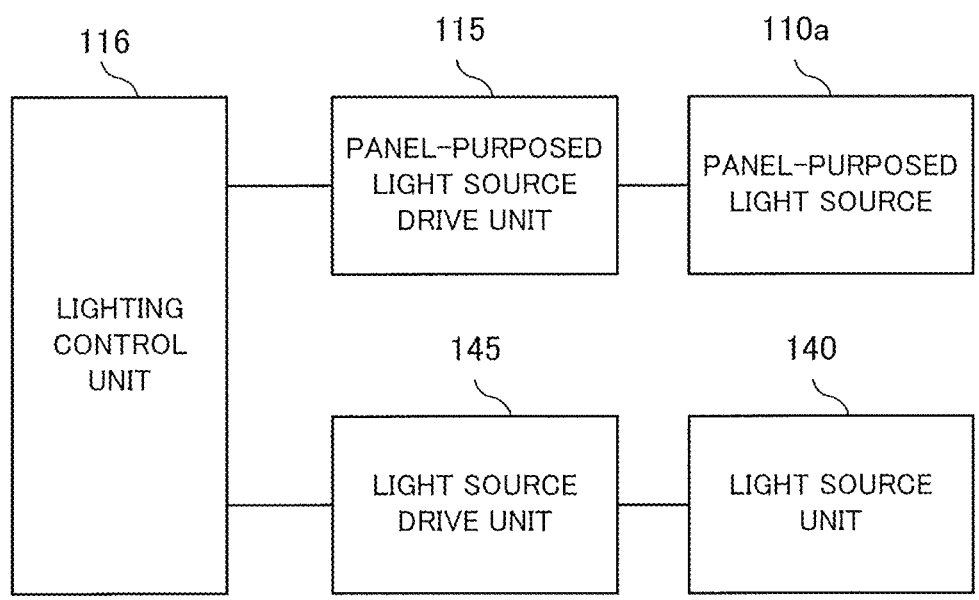
FIG. 6 is a block diagram showing a configuration example of a control system of the illumination device according to the first embodiment.

FIG. 6 is a block diagram showing a configuration example of a control system of the illumination device 1. As shown in FIG. 6, the illumination device 1 includes, for example, a panel-purposed light source drive unit 115 as a drive circuit that turns on, adjusts or turns off the panel-purposed light source 110a as a light source for the light-emitting panel 110, a light source drive unit 145 as a drive circuit that turns on, adjusts or turns off the light source unit 140, and a lighting control unit 116 as a control circuit that controls the panel-purposed light source drive unit 115 and the light source drive unit 145. The lighting control unit 116 is capable of performing control so that the turning on, adjustment and turning off of the panel-purposed light source 110a and the turning on, adjustment and turning off of the light source unit 140 have certain relevance to each other. The lighting control unit 116 may also control the turning on, adjustment and turning off of the panel-purposed light source 110a and the turning on, adjustment and turning off of the light source unit 140 independently of each other. Incidentally, while FIG. 6 shows a case where the panel-purposed light source 110a and the light source unit 140 are light sources separate from each other, the panel-purposed light source 110a and the light source unit 140 can also be a common light source. In other words, the panel-purposed light source 110a may function also as the light source unit 140. In this case, the panel-purposed light source drive unit 115 functions also as the light source drive unit 145. Each of the panel-purposed light source 110a and the light source unit 140 is, for example, an LED, a laser light-emitting element, a fluorescent lamp or the like.

Figure 7:
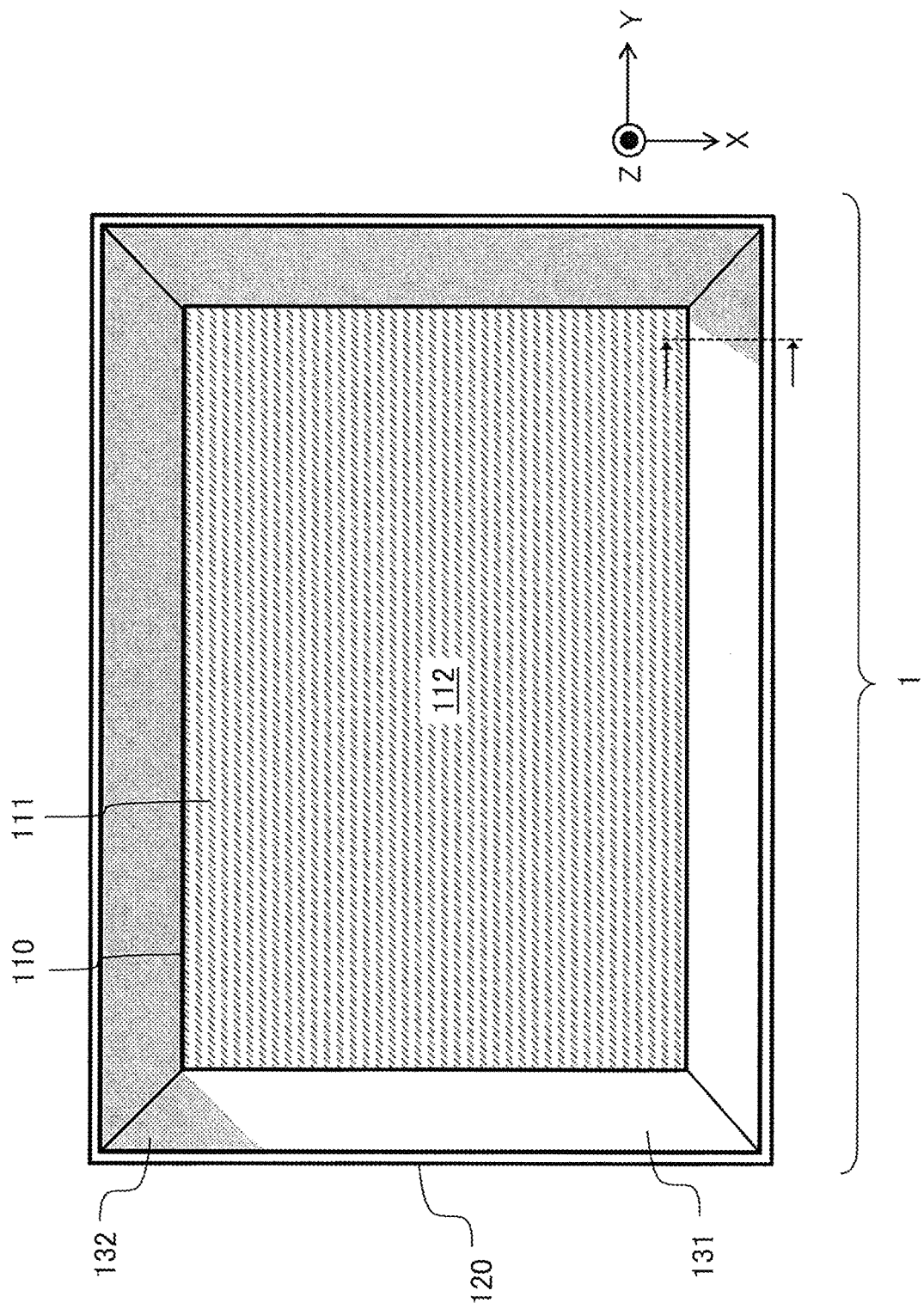
FIG. 7 is a schematic diagram showing an example of a state of the illumination device according to the first embodiment observed when the illumination device is looked up at from below.
Figure 8:
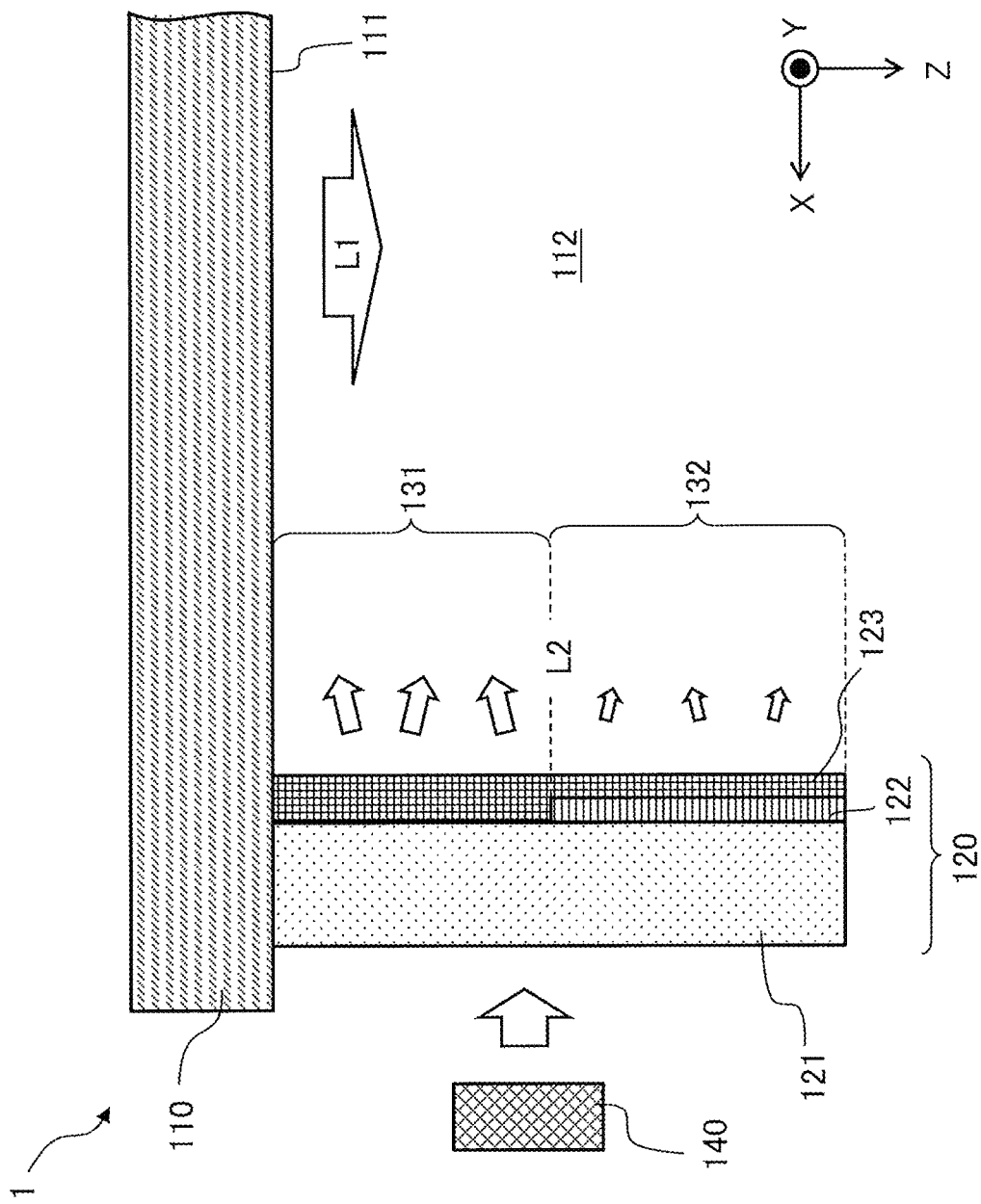
FIG. 8 is a principal part cross-sectional view schematically showing a configuration example of the illumination device according to the first embodiment.

FIG. 7 is a schematic diagram showing an example of a state of the illumination device 1 observed when the illumination device 1 attached to the ceiling 900 is looked up at from below. FIG. 8 is a principal part cross-sectional view schematically showing a configuration example of the illumination device 1. FIG. 9A is a front view showing an example of the bright part region 131 and the dark part region 132 of the frame-like member 120 of the illumination device 1 shown in FIG. 8 as viewed in a horizontal direction from the front side (the inside of the space 112). FIG. 9B is a schematic cross-sectional view taken along the line IX-IX in FIG. 9A.

In this example, the frame-like member 120 is provided at a position in front of the light-emitting panel 110 and contacting the end part of the light-emitting panel 110. Further, the frame-like member 120 has a shape with an opening part so as to expose the light emission surface 111 of the light-emitting panel 110. As shown in FIG. 4 and FIG. 7, the frame-like member 120 is formed with four side walls, and the shape of the frame-like member 120 as viewed in the −Z direction is a quadrangle such as a rectangle or a square. However, the shape of the frame-like member 120 as viewed in the −Z direction can also be a shape other than a quadrangle. For example, the shape of the frame-like member 120 as viewed in the −Z direction can be a polygon other than a quadrangle. Further, the shape of the frame-like member 120 as viewed in the −Z direction can be a circle, an ellipse, a shape formed with a smooth curved line, or the like. Incidentally, in this example, the front surface of the frame-like member 120 is an inside surface that is exposed to the observer's side in the state after the installation of the illumination device 1, and the back surface of the frame-like member 120 is an outside surface that is not exposed to the observer's side.

As shown in FIG. 8 and FIG. 9B, the frame-like member 120 may include a frame body 121 as a base member being a light transmissive member, a mask 122 as the first light restriction member, and a light transmission diffusion member 123 as a first light diffusion member. The light transmission diffusion member 123 has a function of diffusing light passing through the member. The frame body 121 is formed by, for example, integral molding by using a light transmissive material. The mask 122 is arranged on a region as a part of a surface of the frame body 121 of the frame-like member 120 on the front side (the space 112's side). Incidentally, the mask 122 does not need to constitute a part of the frame-like member 120. For example, the mask 122 may be provided independently between the light source unit 140 and the frame-like member 120.

The light transmission diffusion member 123 is arranged on a surface of the mask 122 being a surface of the frame body 121 of the frame-like member 120 on the space 112's side. Incidentally, even supposing that the mask 122 is formed on a surface (back surface) of the frame body 121 of the frame-like member 120 on the back side, the light transmission diffusion member 123 is desired to be provided on the surface of the frame body 121 of the frame-like member 120 on the space 112's side. In other words, the light transmission diffusion member 123 is desired to be provided at a position closer to the space 112 than the light amount regulation part 22 (in this example, the mask 122).

The mask 122 has a function of decreasing the light amount by blocking off a part of the light heading for the space 112 through the frame body 121 of the frame-like member 120.

The light transmission diffusion member 123 is formed on the whole or part of the front surface of the frame-like member 120, for example. The light transmission diffusion member 123 has a function of transmitting and diffusing a part of the incident light. For example, the light transmission diffusion member 123 is formed by applying or printing a light transmission diffusion material on a predetermined region on the front surface of the frame-like member 120, by sticking a film as a light diffusion member on a predetermined region on the front surface of the frame-like member 120, or by a combination of these methods.

The light transmission diffusion member 123 may be formed, for example, on the whole of the front surface of the frame-like member 120 including the bright part region 131 and the dark part region 132. With such a configuration, the front surface of the frame-like member 120 can be provided with uniformized texture. Further, it is possible to make the mask 122 and the light source unit 140 be less visually recognizable to the observer when the light source unit 140 is off.

It is possible to use a material having relatively high light transmittance as the light transmission diffusion member 123 formed in the bright part region 131 and use a material having relatively low light transmittance as the light transmission diffusion member 123 formed in the dark part region 132. In that case, the light transmission diffusion member 123 formed in the dark part region 132 is regarded as the first light restriction member.

The light transmission diffusion member 123 may be left out in a case where the light incident upon the frame-like member 120 is diffuse light or the frame body 121 itself has the diffusing function due to particles dispersed in the frame body 121, surface roughening treatment performed on the frame body 121, or the like.

The dark part region 132 included in the front surface of the frame-like member 120 is a region in which a simulative shady part, simulating a shady part as a region formed when the sunlight is blocked off by an object (e.g., window frame), is formed when the light source unit 140 is on. The mask 122 forms the simulative shady part in the dark part region 132. The dark part region 132 is referred to also as a simulative shady region. The bright part region 131 included in the frame-like member 120 is a region in which a simulative sunny part, simulating a sunny part as a region formed by the irradiation with the sunlight, is formed when the light source unit 140 is on.

The dark part region 132 is determined based on installation condition of the illumination device 1 and the position of a virtual sun, for example. The dark part region 132 may be made, for example, to coincide with a shady region that is formed on the frame-like member 120 as a virtual window frame when light from the virtual sun is emitted from the light-emitting panel 110 as a virtual window. Installation environment of the illumination device 1 includes a three-dimensional position (i.e., latitude, longitude and a height direction position) of the illumination device 1, posture (i.e., an azimuth angle and an elevation angle) of the illumination device 1, surrounding environment (i.e., the shape and design of the ceiling), and so forth. While the dark part region 132 may be determined based on the position of the actual sun, the dark part region 132 may also be determined based on the position of a virtual sun. For example, when the illumination device 1 is installed in a building in Japan, the dark part region 132 may be determined based on the position of the sun measured in a foreign country.

The mask 122 is formed, for example, by applying or printing a member that limits the light transmittance on the frame body 121 being a light transmissive member, by sticking a film that limits the light transmission on the frame body 121, or by a combination of these methods. As the member that limits the light transmittance, a light absorption member or a light reflection member can be used, for example. As the film, it is also possible to use a polarizing film, paper having a light-blocking property, or the like. The configuration of the mask 122 is not limited to the above-described example. A surface of the mask 122, especially a back surface (surface not facing the space 112), may be formed with a material having high light reflectance (e.g., 50% or higher). Further, the mask 122 can also be a member provided with the aforementioned function by controlling the light transmittance by forming a plurality of minute openings through a film that does not allow light to pass through. The mask 122 may also be formed by using a film having a function of transmitting a part of the incident light and reflecting a part of the incident light. The light transmittance of the mask 122 is desired to be within a range of approximately 1% to 50%.

(1-2) Operation

In the region corresponding to the bright part region 131, the light emitted from the light source unit 140 passes through the frame body 121, is thereafter transmitted through and diffused by the light transmission diffusion member 123, and is emitted from the frame-like member 120. Consequently, the bright part region 131 of the frame-like member 120 looks like a bright region with high luminance. In contrast, in the region corresponding to the dark part region 132, the light emitted from the light source unit 140 passes through the frame body 121 and is thereafter mostly reflected by the mask 122. Light that passed through the mask 122 without being reflected by the mask 122 is transmitted and diffused by the light transmission diffusion member 123 and is emitted from the frame-like member 120. The mask 122 can be either a mask that reflects the whole of the incident light or a mask that allows a certain amount of light to pass through. Since the light emitted from the dark part region 132 is the light that passed through the mask 122, the dark part region 132 of the frame-like member 120 looks like a darker region with lower luminance than the bright part region 131. In other words, a light emission amount of the bright part region 131 per unit area is high and a light emission amount of the dark part region 132 per unit area is low. Incidentally, since the light emission amount of the frame-like member 120 is low in the dark part region 132 of the frame-like member 120, it is also possible not to arrange the light source unit 140 on the back side of the dark part region 132 of the frame-like member 120. In other words, it is also possible to arrange the light source unit 140 only on the back side of the bright part region 131 of the frame-like member 120.

By forming the bright part region 131 and the dark part region 132 as shown in FIG. 5 and FIG. 7, the observer looking up from under the illumination device 1 can feel the bright part region 131 and the dark part region 132 as a sunny part and a shady part. In other words, the observer can feel as if actual solar light, that is, natural light, were coming in through the light-emitting panel 110. Incidentally, while the solar light actually coming in through a window is substantially parallel light, the light that feels like it is entering through the light-emitting panel through the light-emitting panel 110 due to the bright part region 131 and the dark part region 132 does not need to be parallel light.

In the example shown in FIG. 5 and FIG. 7, the illumination device 1 has the bright part region 131 in parts of intra-surface regions of two surfaces corresponding to two sides among the four sides forming the outer periphery of the light emission surface 111, and forms the simulative sunny part simulating a sunny part in the bright part region 131 when the light source unit 140 is on. Further, the illumination device 1 has the dark part region 132 on two surfaces corresponding to the other two sides and in the remaining parts of the two surfaces on which the bright part region 131 is arranged, and forms the simulative shady part simulating a shady part in the dark part region 132 when the light source unit 140 is on. As above, the illumination device 1 is capable of simulating a situation where the sun exists in the direction of a virtual light source shown in FIG. 10.

Figure 12:
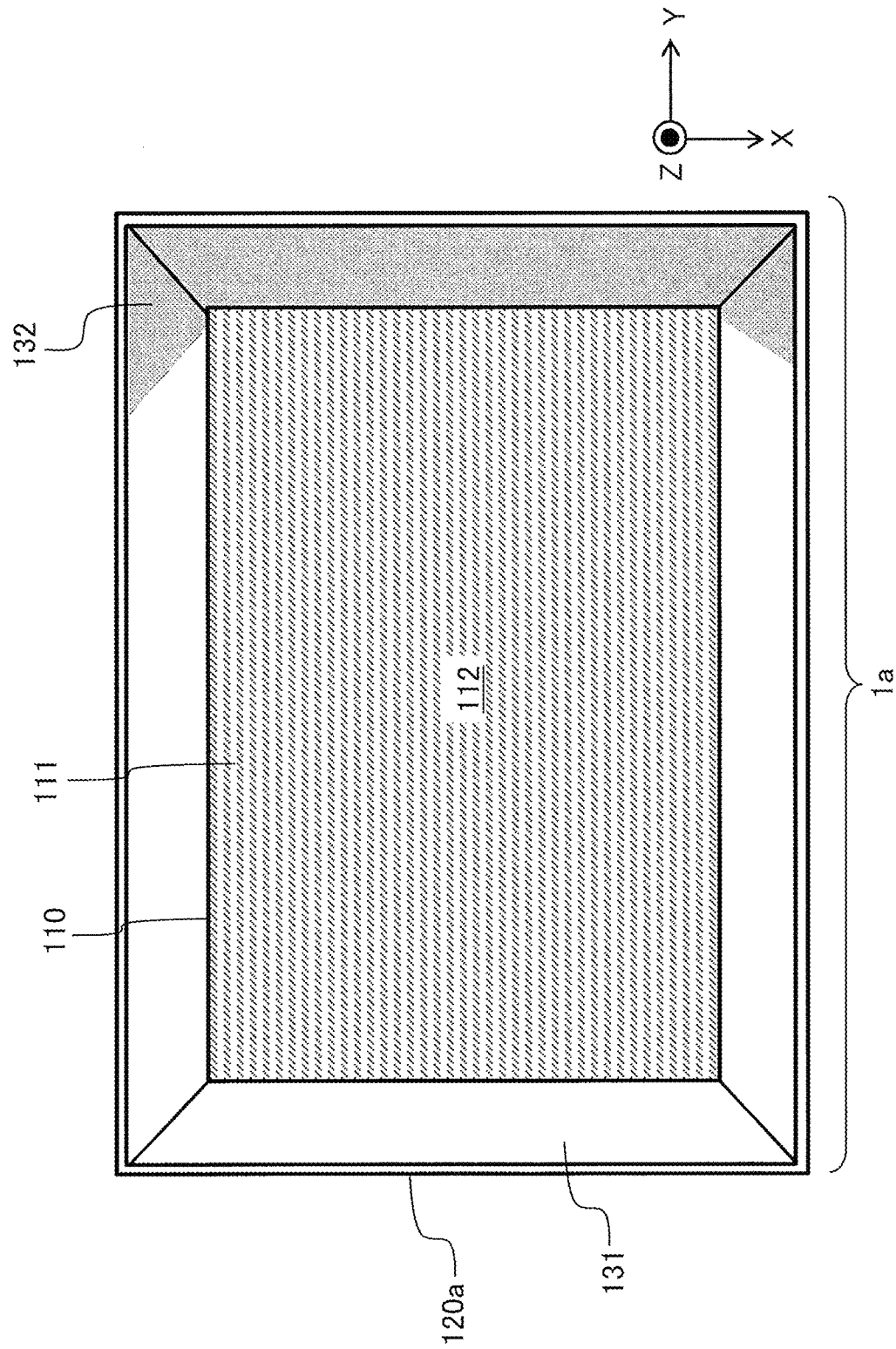
FIG. 12 is a schematic diagram showing an example of a state of the illumination device according to the modification of the first embodiment observed when the illumination device is looked up at from below.

In the example shown in FIG. 5 and FIG. 7, the dark part region 132 is arranged across four surfaces of the frame-like member 120 corresponding to the four sides forming the outer periphery of the light emission surface 111, and the bright part region 131 is arranged across two surfaces of the frame-like member 120. In the case where the frame-like member 120 is regarded as being in a quadrangular frame shape having four front surfaces corresponding to the four sides of the light emission surface 111 as above, the bright part region 131 and the dark part region 132 may be arranged as follows: The dark part region 132 may be arranged across the four sides in the frame shape of the frame-like member 120 (more specifically, the four front surfaces of the frame body 121 forming the four sides of the frame shape), and the bright part region 131 may be arranged across two sides in the frame shape of the frame-like member 120 (more specifically, two front surfaces among the four front surfaces of the frame body 121 forming the four sides of the frame shape). Incidentally, besides the above-described examples, it is also possible, for example, to arrange the dark part region 132 across three sides in the quadrangular frame shape and arrange the bright part region 131 across three sides including the other one side in the quadrangular frame shape and two sides connected to both ends of the side as shown in FIG. 12 which will be explained later.

(1-3) Modification

FIG. 10 is a diagram showing an example of the relationship among the bright part region 131, the dark part region 132 and the virtual light source in a frame-like member 120a of an illumination device 1a as a modification of the illumination device 1 according to the first embodiment. In FIG. 10, the virtual light source simulates the sun. The bright part region 131 and the dark part region 132 simulate a sunny region that would be formed by light coming in through a window if the light-emitting panel 110 were an actual window and a shady region not irradiated with light.

Figure 11:
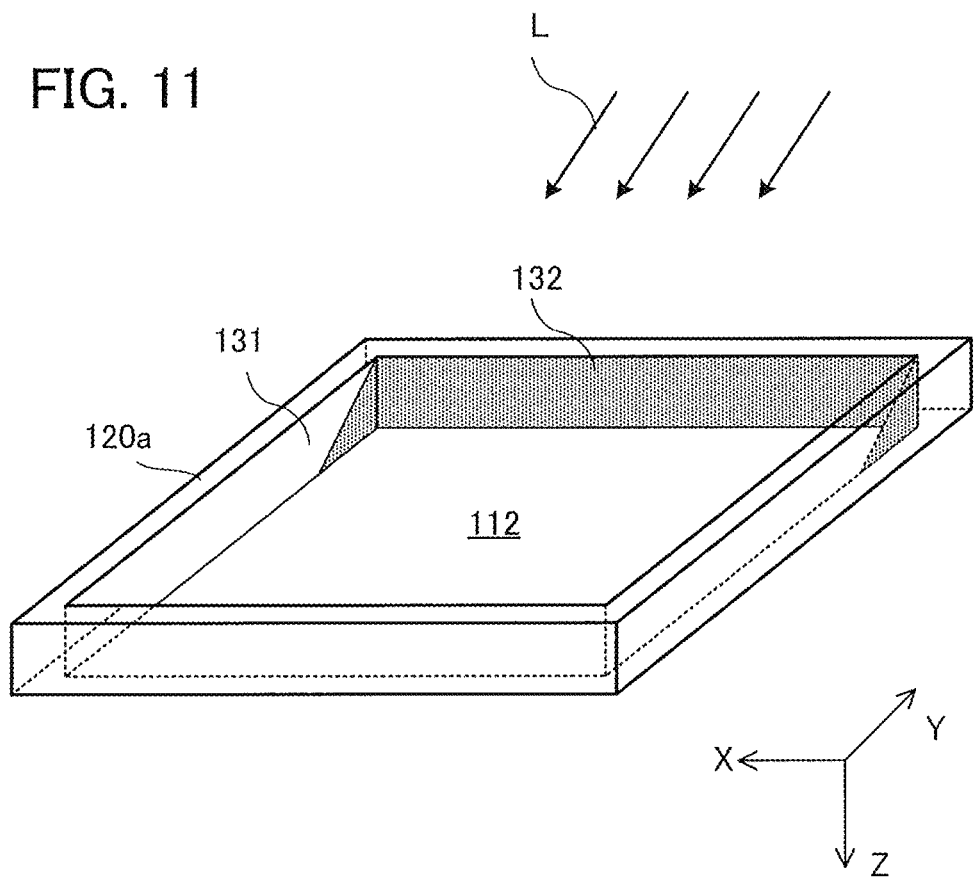
FIG. 11 is a perspective view showing the bright part region and the dark part region on the frame-like member of the illumination device according to the modification of the first embodiment.

FIG. 11 is a perspective view showing the bright part region 131 and the dark part region 132 on the frame-like member 120a of the illumination device 1a. FIG. 12 is a schematic diagram showing an example of a state of the illumination device 1a observed when the illumination device 1a is looked up at from below. In the example shown in FIG. 11 and FIG. 12, the frame-like member 120a has the bright part region 131 on three sides (one side and parts of two sides), and forms the simulative sunny part simulating a sunny part in the bright part region 131. Further, the frame-like member 120a has the dark part region 132 on the other one side and in the remaining parts of the two sides where the bright part region 131 is arranged, and forms the simulative shady part simulating a shady part in the dark part region 132. Also with such a configuration, it is possible to let the observer feel that natural light is coming in.

Further, the bright part region 131 and the dark part region 132 may have the following characteristic in regard to the shape of the dark part region 132 (especially, at the boundaries with the bright part region 131 existing at both ends): That is a characteristic that the two boundaries between the dark part region 132 and the bright part regions 131 overlap with each other when the two boundaries are viewed while being projected on a plane (in the example shown in FIG. 12, a YZ plane) parallel to a normal direction of the light emission surface 111, more specifically, a characteristic that there exists a projection direction (in the example shown in FIG. 12, a direction parallel to the X-axis direction) in which the two boundary positions coincide with each other in directions orthogonal to the normal direction of the light emission surface 111. This is a characteristic appearing as the result of simulating the incoming light from the solar light being parallel light.

Further, assuming that the light-emitting panel 110 is an illumination panel that simulates a blue sky in fine weather viewed through a window, the bright part region 131 is desired to be able to simulate a sunny region on a window frame in fine weather and the dark part region 132 is desired to be able to simulate a shady region on the window frame in fine weather. In such cases, it is easily imaginable that the bright part region 131, that is, a simulative sunny region, at the time of lighting is bright compared with the light-emitting panel 110 at the time of lighting, and at the same time the light L2 emitted from the bright part region 131 is at a lower color temperature than the light L1 emitted from the light emission surface 111. For example, the luminance of the blue sky in fine weather is approximately 5000 [cd/m$^2$] and the luminance of the sunny region on a white diffusion reflection surface commonly used for a window frame member is approximately 30000 [cd/m$^2$]. Further, the color temperature of light when viewing the blue sky in fine weather is approximately 20000 [K] and the color temperature of light when viewing the sunny region on the white diffusion reflection surface is approximately 5000 [K]. Therefore, magnitude relationships regarding the luminance and the color temperature of the emitted light between the light-emitting panel 110 and the bright part region 131 are desired to be maintained as described above. However, the sky viewed through the window is not limited to the blue sky in fine weather, and taking into consideration times of rainy weather, times of cloudy weather, or both of them, it is preferable that the ratio of the luminance (or a luminous flux emitted from an object) between the light-emitting panel 110 and the bright part region 131 be within a range of 20:1 to 1:30.

For example, the luminance of the light-emitting panel 110 at the time of lighting may be 100 [cd/m$^2$] to 6000 [cd/m$^2$], or preferably 500 [cd/m$^2$] to 3000 [cd/m$^2$]. In contrast, the luminance of the bright part region 131 at the time of lighting may be 300 [cd/m$^2$] to 30000 [cd/m$^2$], or preferably 1000 [cd/m$^2$] to 12000 [cd/m$^2$]. Further, the correlated color temperature of the light L1 emitted from the light-emitting panel 110 may be 10000 [K] to 100000 [K], or preferably 20000 [K] to 80000 [K]. In contrast, the correlated color temperature of the light L2 emitted from the bright part region 131 may be 2000 [K] to 7000 [K], or preferably 2500 [K] to 6500 [K].

Furthermore, a correlated color temperature difference between the light L1 emitted from the light-emitting panel 110 and the light L2 emitted from the bright part region 131 may be greater than or equal to 20000 K and less than or equal to 98000 K.

Moreover, the ratio of the luminance (or the luminous flux) between the bright part region 131 and the dark part region 132 at the time of lighting is desired to be within a range of 100:1 to 20:1, or preferably, approximately 10:1. However, this relationship is a condition that holds in fine weather, and does not apply to conditions like cloudy weather and nighttime.

(1-4) Effect

As described above, by using the illumination device 1 or 1a, the light L2 emitted from the frame-like member 120 is capable of simulating a sunny region and a shady region on a window frame, and thus even in an environment with no actual incoming light from the sun, it is possible to provide the observer with natural scenery as if the incoming light from the sun were shining through the light-emitting panel. Further, by the combination of the emitted illuminating light L1 with the light-emitting panel 110 simulating natural light, it is possible to provide the observer with more natural scenery. Furthermore, with the configuration in which the mask 122 is provided in a region of the frame body 121 being a light transmissive member corresponding to the dark part region 132, the illumination devices 1 and 1a have an advantage in that no complicated configuration is necessary, such as an advantage that the simulative shady part (including the boundaries with the simulative sunny region) can be formed in the dark part region 132 with ease.

(2) Second Embodiment

FIG. 13 is a principal part cross-sectional view schematically showing a configuration example of an illumination device 2 according to a second embodiment. FIG. 13 shows a configuration example corresponding to the configuration example shown in FIG. 8. As shown in FIG. 13, the illumination device 2 according to the second embodiment differs from the illumination device 1 according to the first embodiment in the structure of the frame-like member. The illumination device 2 in the second embodiment includes a frame-like member 220 in which the mask 122 is provided on the back surface of the frame body 121 being a light transmissive member. Incidentally, while the mask 122 is shown as one of the components of the frame-like member 220 in the example shown in FIG. 13, the mask 122 may also be provided, for example, between the light source unit 140 and the frame-like member 220 (e.g., in the space on the back side of the frame-like member 220) as already explained earlier. The second embodiment may be the same as the first embodiment except for the features described above.

Also by using the illumination device 2 according to the second embodiment, advantages the same as those of the first embodiment can be obtained.

Further, in the illumination device 2 according to the second embodiment, blurring can be caused in the boundary parts between the bright part region 131 and the dark part region 132 on the frame-like member 220 by arranging the mask 122 to be separate from the light transmission diffusion member 123, and thus it is possible to provide the observer with more natural scenery with a simple configuration.

(3) Third Embodiment

FIG. 14 is a principal part cross-sectional view schematically showing a configuration example of an illumination device 3 according to a third embodiment. FIG. 14 shows a configuration example corresponding to the configuration examples shown in FIG. 8 and FIG. 13. As shown in FIG. 14, the illumination device 3 according to the third embodiment differs from the illumination devices 1 and 2 according to the first and second embodiments in the structure of the frame-like member. The illumination device 3 in the third embodiment is configured so that the thickness T (length in the traveling direction of the light from the light source unit 140) of the frame body 121 being a light transmissive member increases with the increase in the distance from the light emission surface 111. In the example shown in FIG. 14, the mask 122 is provided in a region on the back surface of the frame body 121 corresponding to the dark part region 132. Further, the light transmission diffusion member 123 is provided on a surface (front surface) on the front side of the frame body 121. Incidentally, leaving out the light transmission diffusion member 123 is possible similarly to the first embodiment.

FIG. 15A is a front view showing an example of the bright part region 131 and the dark part region 132 on a frame-like member 320 of the illumination device 3 according to the third embodiment, and FIG. 15B is a schematic cross-sectional view taken along the line XV-XV in FIG. 15A. When the configuration shown in FIG. 14 is employed, the light transmittance in a boundary part 133 between the bright part region 131 and the dark part region 132 on the frame-like member 320 of the illumination device 3 increases with the increase in the distance from the light emission surface 111. Namely, as shown in FIG. 15A, on the frame-like member 320 of the illumination device 3, the blurring in the boundary part 133 between the bright part region 131 and the dark part region 132 increases with the increase in the distance from the light emission surface 111.

When light arriving directly from the sun comes into a window frame via a window, it is imaginable that a sunny part and a shady part are formed as shown in FIG. 7, for example. However, more detailed observation clarifies that the blurring of the boundary part between the sunny part and the shady part increases with the increase in the distance from the window. This is because the sun is a light source having a certain size and the boundary of a shadow formed on the window frame blurs with the increase in the distance from the opening of the window to the irradiation position.

Therefore, the illumination device 3 changes the spacing between the mask 122 and the light transmission diffusion member 123 so that the spacing gradually increases with the increase in the distance from the light emission surface 111. With such a configuration, the blurring is gradually increased with the increase in the distance from the light emission surface 111 as shown in FIG. 15A. Specifically, the frame-like member 320 of the illumination device 3 is configured so that the thickness T of the frame body 121 increases so as to increase the distance between the mask 122 and the light transmission diffusion member 123 with the increase in the distance from the light emission surface 111 of the light-emitting panel 110.

Further, the same advantage as that described above can be obtained by leaving out the light transmission diffusion member 123, providing the frame body 121 with the scattering power, and then configuring the frame body 121 so that the thickness T of the frame body 121 increases with the increase in the distance from the light emission surface 111 of the light-emitting panel 110.

It is also possible to obtain the same advantage by configuring the mask 122 so that the light transmittance of the region of the mask 122 corresponding to the boundary part 133 with the bright part region 131 increases with the increase in the distance from the light emission surface 111 of the light-emitting panel 110 without changing the thickness T of the frame body 121.

For example, the light transmittance can be varied in a surface by increasing/decreasing printing density of a constituent material having a light blocking function and formed as the mask 122.

As an example, it is also possible to provide a mask 122a whose light transmittance varies in a surface instead of the mask 122 as shown in FIGS. 15A and 15B. The mask 122a is configured so that the printing density of the constituent material having the light blocking function decreases or the amount of applying the constituent material decreases with the increase in the distance from the light emission surface 111 of the light-emitting panel 110 at least in a region corresponding to the boundary part 133 forming the boundary with the bright part region 131 included in the dark part region 132. Incidentally, the mask 122a may also be configured so that the thickness of a film forming the mask 122a decreases in the region with the increase in the distance from the light emission surface 111 of the light-emitting panel 110. By changing the light transmittance of the mask 122a in a surface as above, the blurring can be caused to the boundary part 133.

Incidentally, the place where the mask 122a is formed is not limited to the back surface of the frame-like member 320. For example, it is also possible to provide the mask 122a between the frame body 121 and the light transmission diffusion member 123 as shown in FIG. 8.

Further, the region where the mask 122a is provided is also not limited to the region corresponding to the boundary part 133 included in the dark part region 132. For example, it is also possible to provide the mask 122a in the whole region of the sunlight expression part 130 including a boundary part forming the boundary with the dark part region 132 included in the bright part region 131 or in a region corresponding to the sunlight expression part 130. In that case, the mask 122a may be configured so that the light transmittance in a region corresponding to the bright part region 131 is higher than that in a region corresponding to the boundary part.

As described above, by using the illumination device 3 according to the third embodiment, in addition to obtaining the advantages of the first and second embodiments, it is possible to achieve a configuration in which the blurring increases with the increase in the distance from the light emission surface 111 in the boundary part 133 between the bright part region 131 and the dark part region 132 on the frame-like member 320, by which a window frame can be simulated with high quality. Namely, it is possible to provide the observer with still more natural scenery with a simple configuration.

(4) Fourth Embodiment

Figure 16:
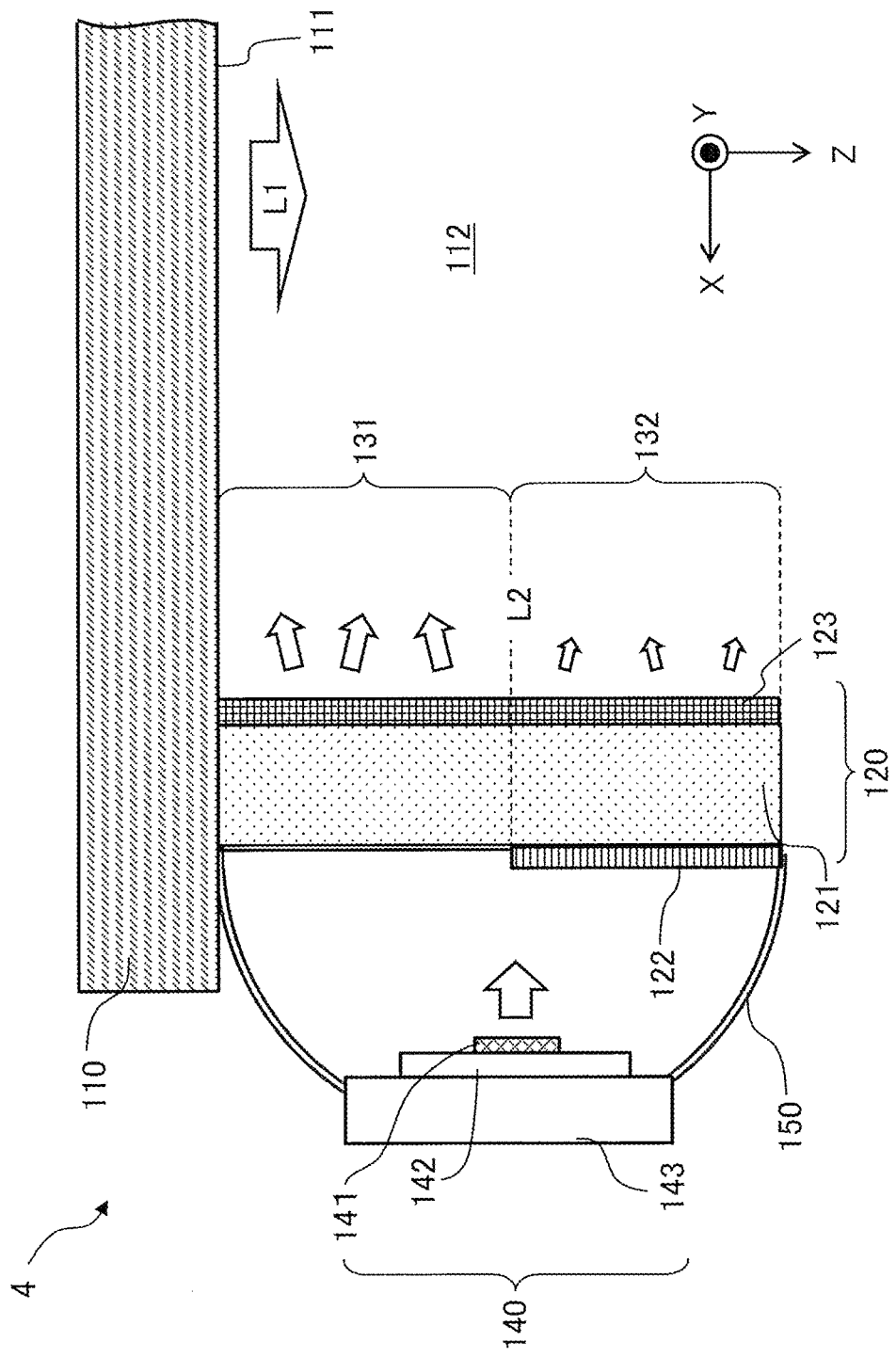
FIG. 16 is a principal part cross-sectional view schematically showing a configuration example of an illumination device according to a fourth embodiment of the present invention.
Figure 17:
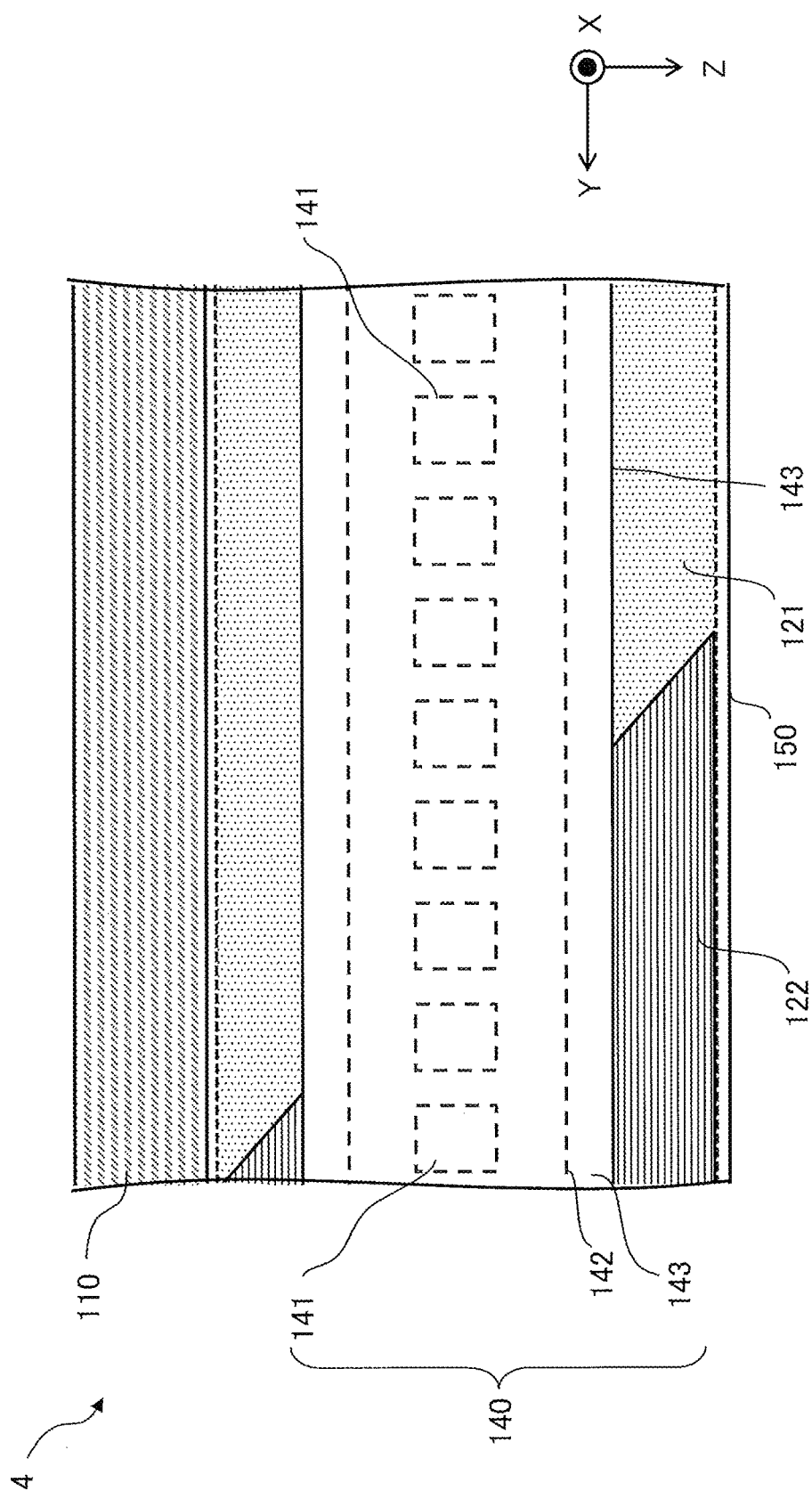
FIG. 17 is a rear view showing an example of a frame-like member and a light source unit of the illumination device according to a fourth embodiment.

FIG. 16 is a principal part cross-sectional view schematically showing a configuration example of an illumination device 4 according to a fourth embodiment. FIG. 16 shows a configuration example corresponding to the configuration examples shown in FIG. 8, FIG. 13 and FIG. 14. FIG. 17 is a rear view showing a configuration example of the illumination device 4 according to the fourth embodiment as viewed from the back side of the frame-like member.

The illumination device 4 includes a light reflection diffusion member 150 that connects the back surface of the frame-like member 120 and the light source unit 140.

The light reflection diffusion member 150 has a concave surface in a shape like a semicircular column, and has a function of reflecting and diffusing a part of the incident light and letting the light reach the back surface of the frame-like member 120.

The fourth embodiment may be the same as any one of the first to third embodiments except for the features described above. For example, while the frame-like member 120 in the first embodiment shown in FIG. 8 is illustrated as an example of the frame-like member in the example shown in FIG. 16, the configuration of the frame-like member is not limited to this example.

In the example shown in FIG. 16, the light source unit 140 includes LEDs 141, an LED substrate 142 and a light source holder 143. The light reflection diffusion member 150 is fixed to the light source holder 143, and an open end of the light reflection diffusion member 150 is arranged to be in proximity to the back surface of the frame-like member 120. The light reflection diffusion member 150 is formed by painting a metal plate or a resin plate with white, for example. The light reflection diffusion member 150 may also be formed by sticking a film that diffuses light on a metal plate or a resin plate.

While most of the light emitted from the light source unit 140 (more specifically, each LED 141) directly reaches the back surface of the frame-like member 120, a part of the light emitted from the light source unit 140 is reflected and diffused by the light reflection diffusion member 150 and consequently reaches the back surface of the frame-like member 120. By the reflection and diffusion by the light reflection diffusion member 150, the light from the light source unit 140 can be made to be incident upon the whole region of the back surface of the frame-like member 120 efficiently (without turning the light into stray light).

Incidentally, it is also possible for the illumination device 4 to include a light reflection member 150a having no diffusing power instead of the light reflection diffusion member 150.

As described above, by using the illumination device 4 according to the fourth embodiment, in addition to obtaining the advantages of the first to third embodiments, it is possible to reduce the loss in the light emitted from the light source unit 140. Namely, utilization efficiency of the light from the light source unit 140 can be increased.

Figure 18:
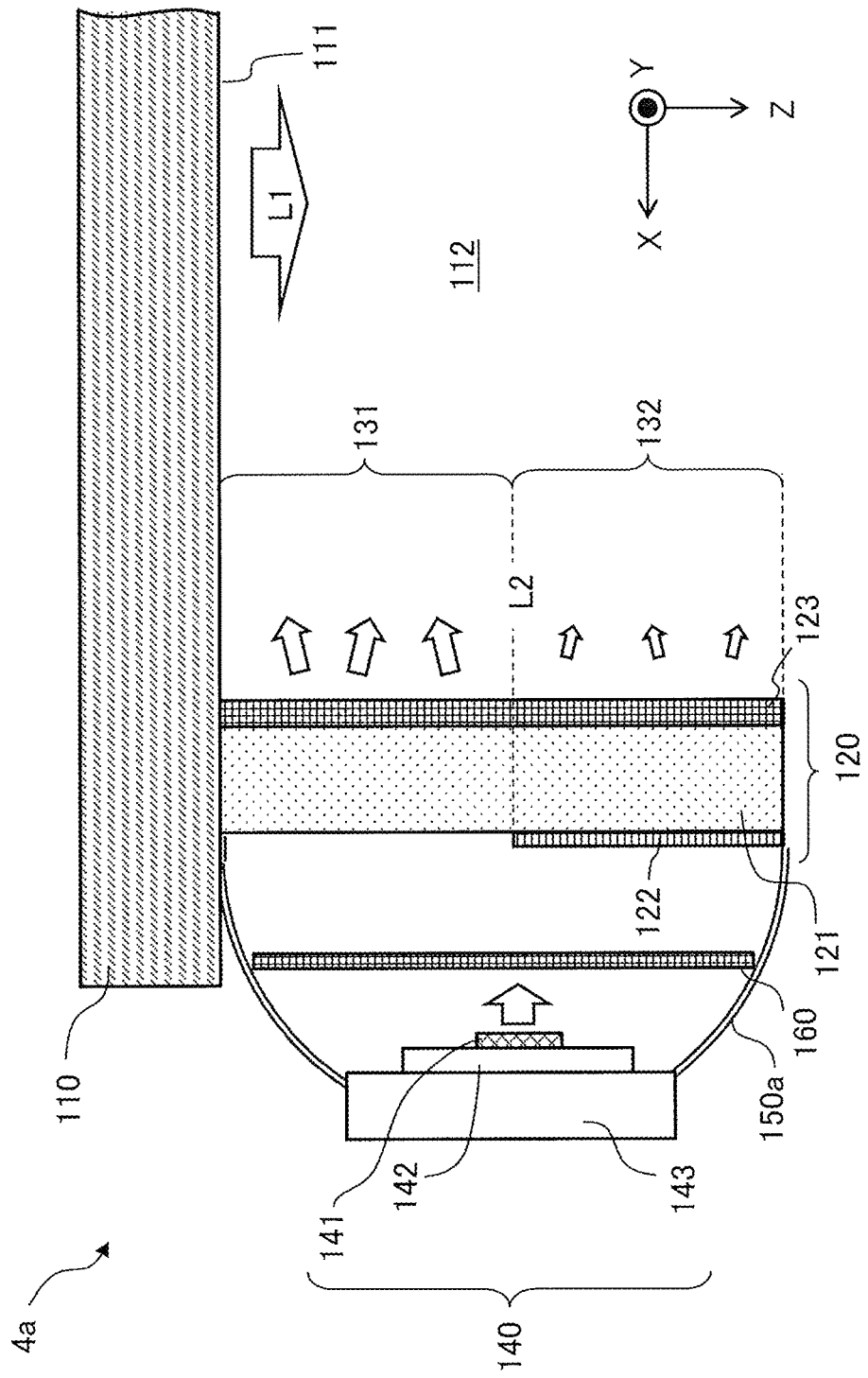
FIG. 18 is a principal part cross-sectional view schematically showing a configuration example of an illumination device according to a modification of the fourth embodiment.

FIG. 18 is a principal part cross-sectional view schematically showing a configuration example of an illumination device 4a according to a modification of the fourth embodiment. The illumination device 4a shown in FIG. 18 differs from the illumination device 4 shown in FIG. 16 in including a light transmission diffusion member 160 as a second light diffusion member between the light source unit 140 and the back surface of the frame-like member 120.

In this example, the light emitted from each LED 141 of the light source unit 140 is diffused by the light transmission diffusion member 160 and then reaches the back surface of the frame-like member 120. In this case, intensity distributions of the light emitted from a plurality of LEDs arranged in an array are superimposed on each other by the light transmission diffusion member 160, by which the intensity distribution of the light reaching the frame-like member 120 is uniformized.

Also in this example, it is also possible for the illumination device 4a to include the light reflection member 150a having no diffusing power instead of the light reflection diffusion member 150. Also in such cases, the light emitted from the light source unit 140 can be prevented from turning into stray light and can be made to efficiently reach the back surface of the frame-like member 120.

In the following description, the light reflection diffusion member 150, the light reflection member 150a, the light transmission diffusion member 160 described later, and so forth that are provided in order to deflect (including reflection and diffusion) the light from the light source unit 140 and guide the light to the frame-like member can be collectively referred to as first light deflection members.

As described above, by using the illumination device 4a, since the illumination device 4a further includes the light transmission diffusion member 160, an advantage is obtained in that luminance unevenness in the bright part region can be reduced further, such as an advantage that the intensity distribution of the light emitted from the plurality of LEDs arranged in an array can be uniformized.

(5) Fifth Embodiment

Figure 19:
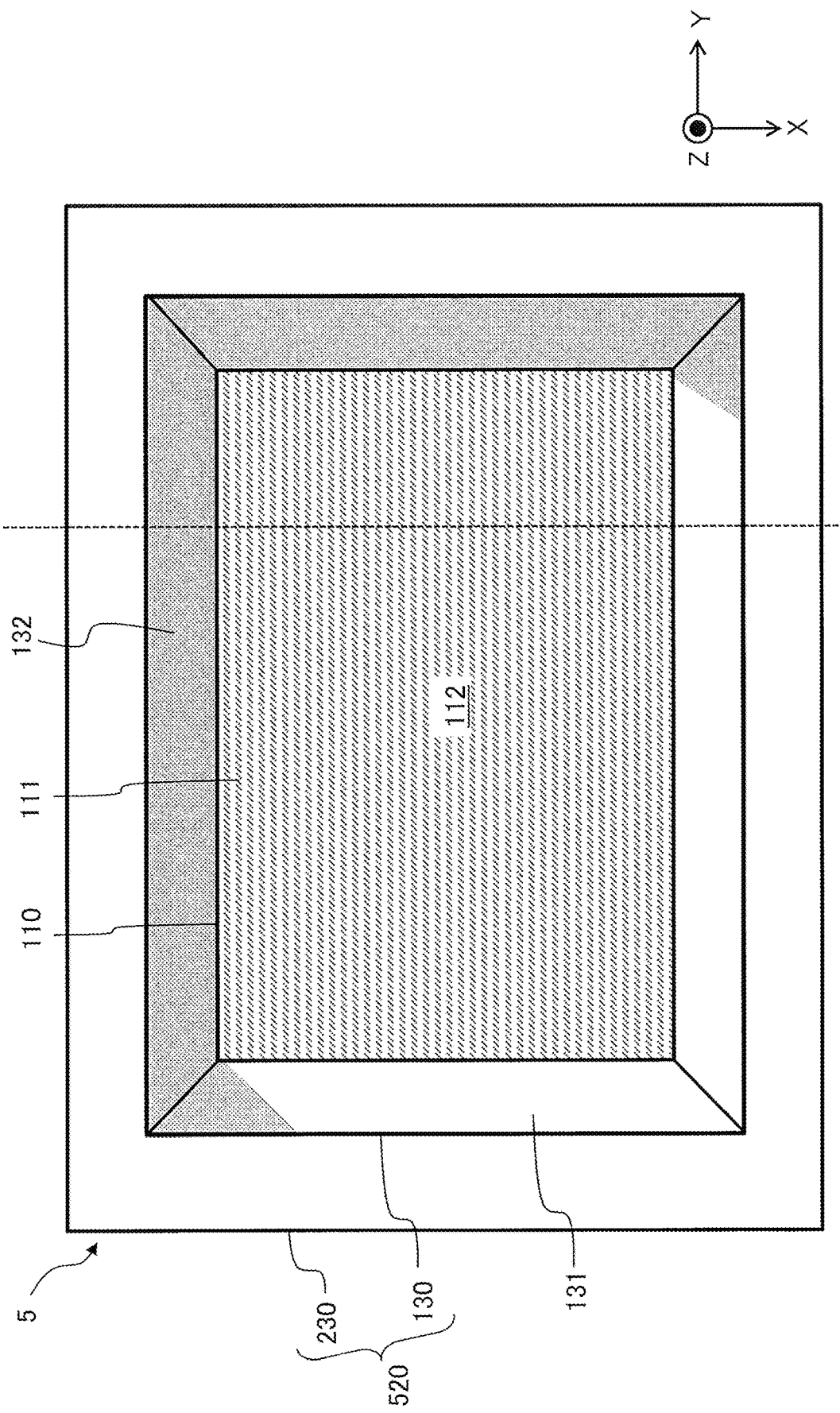
FIG. 19 is a schematic diagram showing an example of a state of an illumination device according to a fifth embodiment of the present invention observed when the illumination device is looked up at from below.
Figure 20:
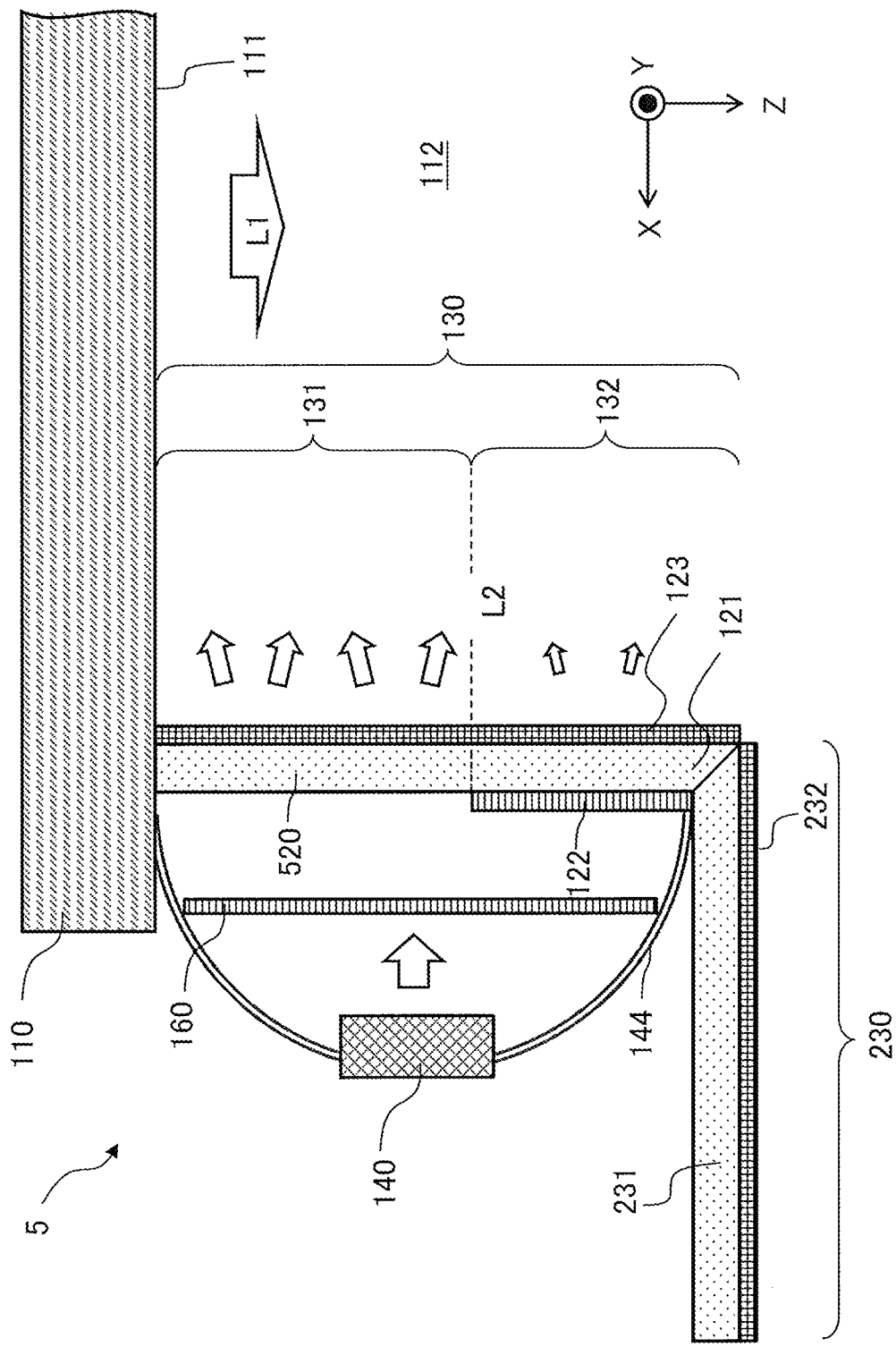
FIG. 20 is a cross-sectional view schematically showing a configuration example of the illumination device according to the fifth embodiment.

FIG. 19 is a schematic diagram showing an example of a state of an illumination device 5 according to a fifth embodiment observed when the illumination device 5 is looked up at from below. FIG. 20 is a cross-sectional view schematically showing a configuration example of the illumination device according to the fifth embodiment. FIG. 20 shows a configuration example corresponding to the configuration examples shown in FIG. 8, FIG. 13, FIG. 14 and FIG. 16.

The illumination device 5 according to the fifth embodiment differs from the illumination devices according to the first to fourth embodiments in that a frame-like member 520 further includes a flange part 230.

Here, the flange part 230 means a part of the frame-like member 520 that is connected to a farthest end part of the region where the sunlight expression part 130 (the bright part region 131, the dark part region 132, or both of the bright part region 131 and the dark part region 132) is formed, farthest from the light emission surface 111, and extends outward from the end part. For example, when the illumination device 5 is provided on a ceiling, a part extending outward in a horizontal direction from the end part may be regarded as the flange part. When the illumination device 5 is provided on a wall orthogonal to a horizontal surface, a part extending outward in the vertical direction from the end part may be regarded as the flange part.

As shown in FIG. 20, the flange part 230 may include a plate-shaped part 231 as a member like a plate and a light diffusion member 232 provided on the front side of the plate-shaped part 231. While the plate-shaped part 231 may be a light transmissive member, the plate-shaped part 231 may also be a nontransparent member in order to prevent the observer from visually recognizing the light source unit 140. This does not apply to cases where the illumination device 5 is configured so that the light source unit 140 is invisible due to the light reflection diffusion member 150, the light reflection member 150a, the light diffusion member 232 or the like.

Further, the frame body 121 may serve also as the plate-shaped part 231. For example, the frame body 121 may be configured to spread outward from the farthest end part of the region where the sunlight expression part 130 (the bright part region 131, the dark part region 132, or both of the bright part region 131 and the dark part region 132) is formed farthest from the light emission surface 111.

The light diffusion member 232 is a light reflection diffusion member, for example. The light transmittance in the light reflection diffusion member may be approximately 1% to 50%, for example. Incidentally, the light transmittance in the light reflection diffusion member may also be less than or equal to 10%, for example.

The light diffusion member 232 may also be a light transmission diffusion member, for example. The light transmittance in the light transmission diffusion member is higher than or equal to 50%, for example. In that case, the light transmission diffusion member 123 may serve also as the light diffusion member 232. For example, the light transmission diffusion member 123 may be provided on the front surface of the frame body 121 and on the front surface of the plate-shaped part 231 integrally or continuously. In the aforementioned case where the frame body 121 serves also as the plate-shaped part 231, a similar configuration can be achieved by forming the light transmission diffusion member 123 to cover the front surface of the frame body 121. Incidentally, for a reason described later, it is preferable that the light diffusion surface provided on the front surface of the flange part 230 have light reflectiveness at least for light incident from the front side. For example, even in the configuration including a light transmission diffusion member as the light diffusion member 232, the light transmission diffusion member is desired to reflect a part of the light.

When the illumination device 5 is mounted on a ceiling, the flange part 230 is arranged in parallel with or flush with the ceiling surface, for example. When the illumination device 5 is mounted on a wall, the flange part 230 is arranged in parallel with or flush with the wall surface, for example. Incidentally, the shape of the flange part 230 is not limited to the shape illustrated in the drawing. For example, the flange part 230 may be formed with a plurality of members. Further, the illumination device 5 may also employ structure in which the flange part 230 is detachable or structure including no flange part 230.

Furthermore, the frame-like member 520 may include a part to be in parallel with the installation target surface (ceiling surface, wall surface, etc.) and include the sunlight expression part 130 (i.e., the bright part region 131 and the dark part region 132) on a front surface of the part (hereinafter referred to as a flange surface 233). Incidentally, in not only the fifth embodiment but also other embodiments, the position on the frame-like member where the sunlight expression part 130 is provided is not particularly limited. For example, it is also possible to form the sunlight expression part 130 on the front surface of the frame body 121 and the flange surface shown in FIG. 20.

Further, while the cross-sectional shape of the frame-like member 520 cut in the Z direction (hereinafter referred to as a vertical sectional shape) is an L-shape and the front surface of the frame body 121 and the flange part 230 on which the sunlight expression part 130 is formed are orthogonally connected to each other in the example shown in FIG. 20, the vertical sectional shape of the frame-like member 520 may also be a curved line shape (i.e., the frame-like member 520 may be in a curved surface shape). The bright part region 131 and the dark part region 132 may be provided on the curved surface on the front side of such a frame-like member 520. In that case, the frame-like member may either include or not include the flange part 230 further connected to an end part of such a curved surface.

As already explained earlier, the frame body 121 and the plate-shaped part 231 of the flange part 230 may be formed integrally. The frame body 121 and the plate-shaped part 231 of the flange part 230 may also be connected together by using another component.

It is also possible to make a part of the light emitted from the light source unit 140 be emitted in the +Z direction through the flange part 230 by not providing the light reflection diffusion member 150 around the light source unit 140 or by configuring the light reflection diffusion member 150 to transmit a part of the light. In that case, the flange part 230 is formed with the plate-shaped part 231 being a light transmissive member and the light diffusion member 232 being a light transmission diffusion member, for example.

Figures 21A, 21B:
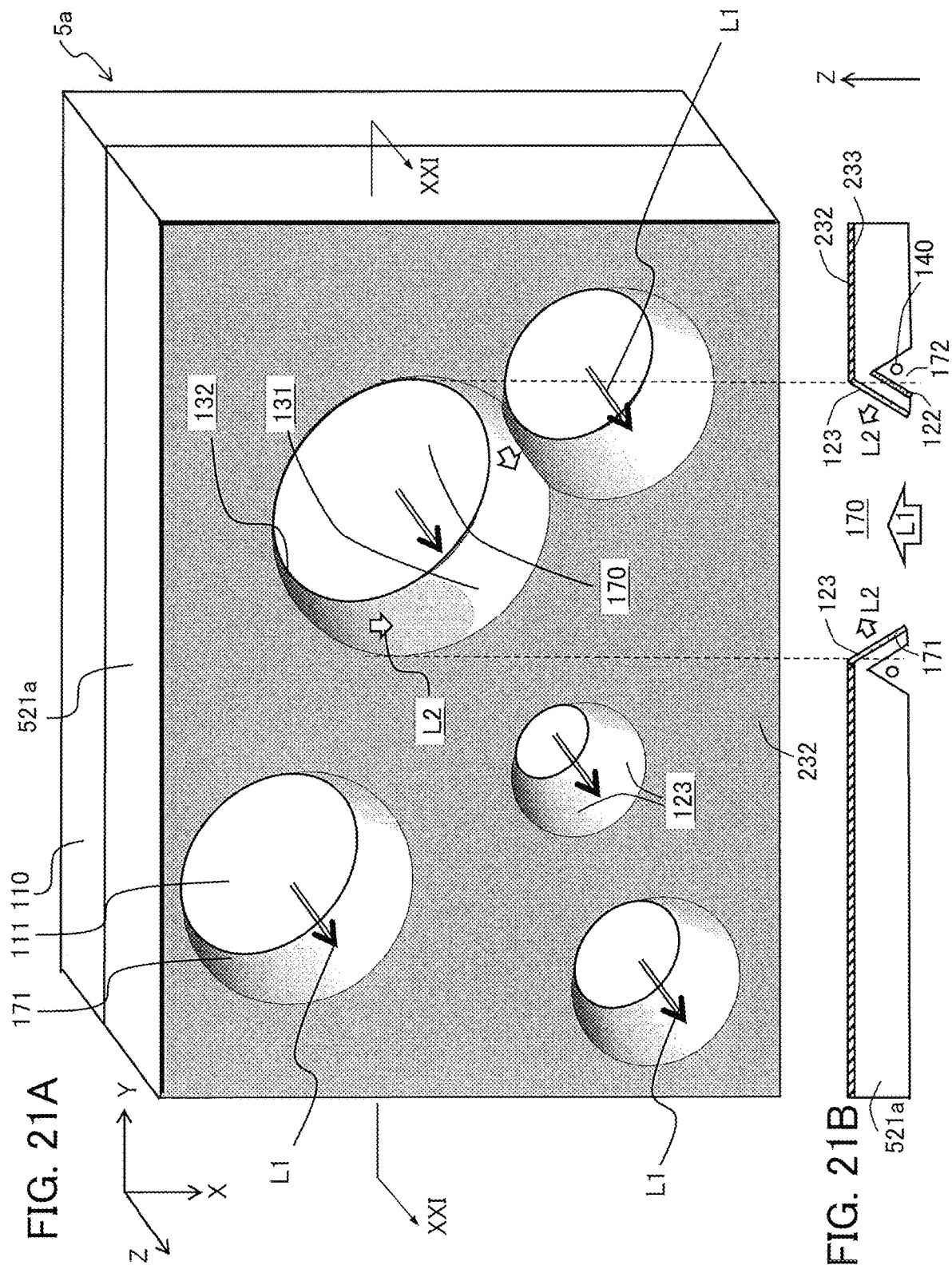
FIG. 21A is a principal part perspective view schematically showing a configuration example of a frame-like member of an illumination device according to a modification of the fifth embodiment.
FIG. 21B is a schematic cross-sectional view taken along the line XXI-XXI in FIG. 21A.

FIG. 21A is a principal part perspective view schematically showing a configuration example of a frame-like member of an illumination device 5a according to a modification of the fifth embodiment, and FIG. 21B is a schematic cross-sectional view taken along the line XXI-XXI in FIG. 21A. As shown in FIG. 21A, the frame-like member may have structure including a plurality of opening parts 170. Incidentally, the frame-like member 520a may also be configured to include only one opening part 170.

The frame-like member includes a frame body 521a including the opening parts 170 having a predetermined height, for example. In this example, the sunlight expression part 130 (the bright part region 131, the dark part region 132, or both of the bright part region 131 and the dark part region 132) is provided at least on side walls 171 of the opening parts 170 of the frame body 521a. The side walls 171 in this example correspond to a front surface of the frame-like member formed by the opening parts 170. Further, a front surface of the frame body 521a corresponds to the aforementioned flange surface 233.

Incidentally, while the flange surface 233 also corresponds to the front surface of the frame-like member, a light reflection diffusion member is provided as the light diffusion member 232 in this example without providing the sunlight expression part 130 on the flange surface 233.

The frame body 521a in this example is a light transmissive member. On the back side of the side walls 171, a storage part 172 storing the light source unit 140 may be provided to surround the opening parts 170. In this case, the light source unit 140 is stored in the storage part 172 and emits light to enter the side walls 171 from the back side. Also in this example, a back surface of the side wall 171 as a surface on the back side of the side wall 171 (more specifically, an inner wall of the storage part 172) may be provided with the light reflection diffusion member 150 connecting the back surface and the light source unit 140.

It is also possible to provide the light source unit 140 to the rear of the light-emitting panel 110 without providing the frame body 521*a* with the storage part 172 and make the light from the light source unit 140 enter the side walls 171 from the back side via the light-emitting panel 110.

On a front surface of the side wall 171 as a surface on the front side of the side wall 171, the light transmission diffusion member 123 is provided. Then, the mask 122 is provided in a region on the back side of the light transmission diffusion member 123 and corresponding to the dark part region 132. While the mask 122 is provided on the back surface of the side wall 171 formed by the storage part 172 in the example shown in FIG. 21, the mask 122 may be provided on the front surface of the side wall 171 (however, on the back side of the light transmission diffusion member 123), for example. Further, in the case where the light source unit 140 is provided to the rear of the light-emitting panel 110, it is also possible, for example, to provide the mask 122 on the back surface (surface closer to the light-emitting panel 110) of the frame body 521*a*, between the frame body 521*a* and the light-emitting panel 110, or on the back surface of the light-emitting panel 110.

While an example of providing the mask 122 only in the dark part region 132 or a region corresponding to the dark part region 132 was shown in the above-described example, it is also possible, for example, to use the mask 122*a* whose light transmittance varies in a surface and provide the mask 122*a* in a region including the bright part region 131 or a region corresponding to the bright part region 131 (e.g., on a whole surface). In that case, the illumination device 5*a* may include, for example, the mask 122*a* that is configured so that the light transmittance of the dark part region 132 (or the region corresponding to the dark part region 132) becomes lower than the light transmittance of the bright part region 131 (or the region corresponding to the bright part region 131). Incidentally, even in such a case, the mask 122*a* is regarded as arranging a member having the function of blocking light in at least the dark part region 132 or the region corresponding to the dark part region 132, and the mask 122*a* (especially, a part arranged in the dark part region 132 or the region corresponding to the dark part region 132) is referred to as the first light restriction member.

Incidentally, also in this example, the panel-purposed light source 110*a* can be used instead of the light source unit 140. In that case, the illuminating light L1 emitted from a region of the light emission surface 111 of the light-emitting panel 110 where no opening part 170 is provided in front may be used as the light from the light source unit 140, for example. In that case, the storage part 172 may be left out. In that case, the mask 122 may be either provided at a position on the front surface of the side wall 171 and between the light transmission diffusion member 123 and the frame body 521*a* or provided on the back surface (surface closer to the light-emitting panel 110) of the frame body 521*a* or between the frame body 521*a* and the light-emitting panel 110.

With such a configuration, when the light that entered the side wall 171 of the opening part 170 from the back side (including the back surface of the frame body 521*a*) is transmitted by the side wall 171 and emitted as the light L2, the intensity of the light heading for the space 112 from the dark part region 132 can be reduced compared with the intensity of the light heading for the space 112 from the bright part region 131 on the side wall 171.

Also in the frame body 521*a*, it is possible to employ the configuration in which the thickness T of the region where the sunlight expression part 130 is formed (in this example, the distance between the side wall 171 of the opening part 170 and the surface regarded as the back side of the side wall 171 in the frame body 521*a*) increases with the increase in the distance from the aforementioned light emission surface, and the blurring can be expressed by using the difference in the thickness of the region in such a frame body 521*a*.

It is also possible for the frame-like member to use the illuminating light L1 emitted from regions of the light emission surface 111 of the light-emitting panel 110 where an opening part 170 is provided in front, external light entering from the front of the frame-like member, or the like instead of the light from the light source unit 140. In that case, it is possible to form the frame body 521*a* with a light reflection member 124 as a reflective frame-like member 520*b* or to provide the light reflection member 124 (not shown) between the light transmission diffusion member 123 and the frame body 521*a*. Here, the light reflection member 124 can be a light reflection diffusion member. In that case, the mask 122 can be a light absorptive mask 122*b* that is provided in a region between the light transmission diffusion member 123 and the light reflection member 124 and corresponding to the dark part region 132 and absorbs reflected light from the light reflection member 124. Here, the mask 122*b* corresponds to the aforementioned second light restriction member.

Incidentally, it is also possible to use a light reflection member 124*a* whose light reflectance varies in a surface (in other words, whose light transmittance varies in a surface) instead of the mask 122*b*. In the following description, the light reflection member 124*a* provided instead of the mask 122*b* can be referred to as a mask 122*d*. For example, an illumination device 5*b* can achieve the same advantages by including the mask 122*d* configured so that the light reflectance of the dark part region 132 (or the region corresponding to the dark part region 132) becomes lower than the light reflectance of the bright part region 131 (or the region corresponding to the bright part region 131) instead of the mask 122*b* and the light reflection member 124. Incidentally, even in such a case, the mask 122*d* is regarded as arranging a member having the function of blocking light in at least the dark part region 132 or the region corresponding to the dark part region 132, and the mask 122*d* (especially, a part arranged in the dark part region 132 or the region corresponding to the dark part region 132) is referred to as the second light restriction member.

In this example, the light reflection member is a member whose light transmittance is less than 50%, for example. Incidentally, the light reflection member can also be a member whose light reflectance is less than or equal to 10%. However, this does not apply to cases where the light reflectance is purposely varied in a surface like the aforementioned light reflection member 124*a*. In that case, the aforementioned light reflectance may be paraphrased as light reflectance in the bright part region 131 or the region corresponding to the bright part region 131.

With such a configuration, in the reflective frame-like member, the illuminating light L1 emitted from a region of the opening part 170 surrounded by the side wall 171 or external light entering from the front can be reflected by the side wall 171 and emitted as the light L2, and in that case, the intensity of the light heading for the space 112 from the dark part region 132 can be reduced compared with the intensity of the light heading for the space 112 from the bright part region 131 on the side wall 171. In the following description, the illumination device 5a including the reflective frame-like member can be referred to as the illumination device 5b.

Incidentally, it is also possible to arrange a plurality of plate-shaped frame bodies 121 in an array with spacing between each other in front of the light-emitting panel 110 instead of the frame body 521a including the opening parts 170. In that case, regions between side faces of the plurality of frame bodies 121 serve in place of the opening parts 170. For example, the sunlight expression part 130 may be provided on the side faces or front surfaces of such plate-shaped frame bodies 121. The frame-like member may also be, for example, a member that forms a shape like a louver as a whole by parallelly arranging a plurality of long and narrow plate-shaped (e.g., like plates having a length substantially equal to the length of one side of the light-emitting panel 110) frame bodies with spacing between each other in front of the light-emitting panel 110. It is possible to regard inner walls of openings in front of the light-emitting panel 110 formed by such a plurality of frame bodies 121 (front surfaces of the plurality of frame-like members) as the side walls 171 of the opening parts 170 described earlier and thereby implement a similar configuration.

As described above, by using the illumination device 5, 5a or 5b according to the fifth embodiment, in addition to obtaining the advantages of the first to fourth embodiments, the sunlight expression part 130 can be formed in a variety of shapes, and thus it is possible to enrich the designability as an illumination device while providing the observer with natural scenery.

(6) Sixth Embodiment

Figure 22:
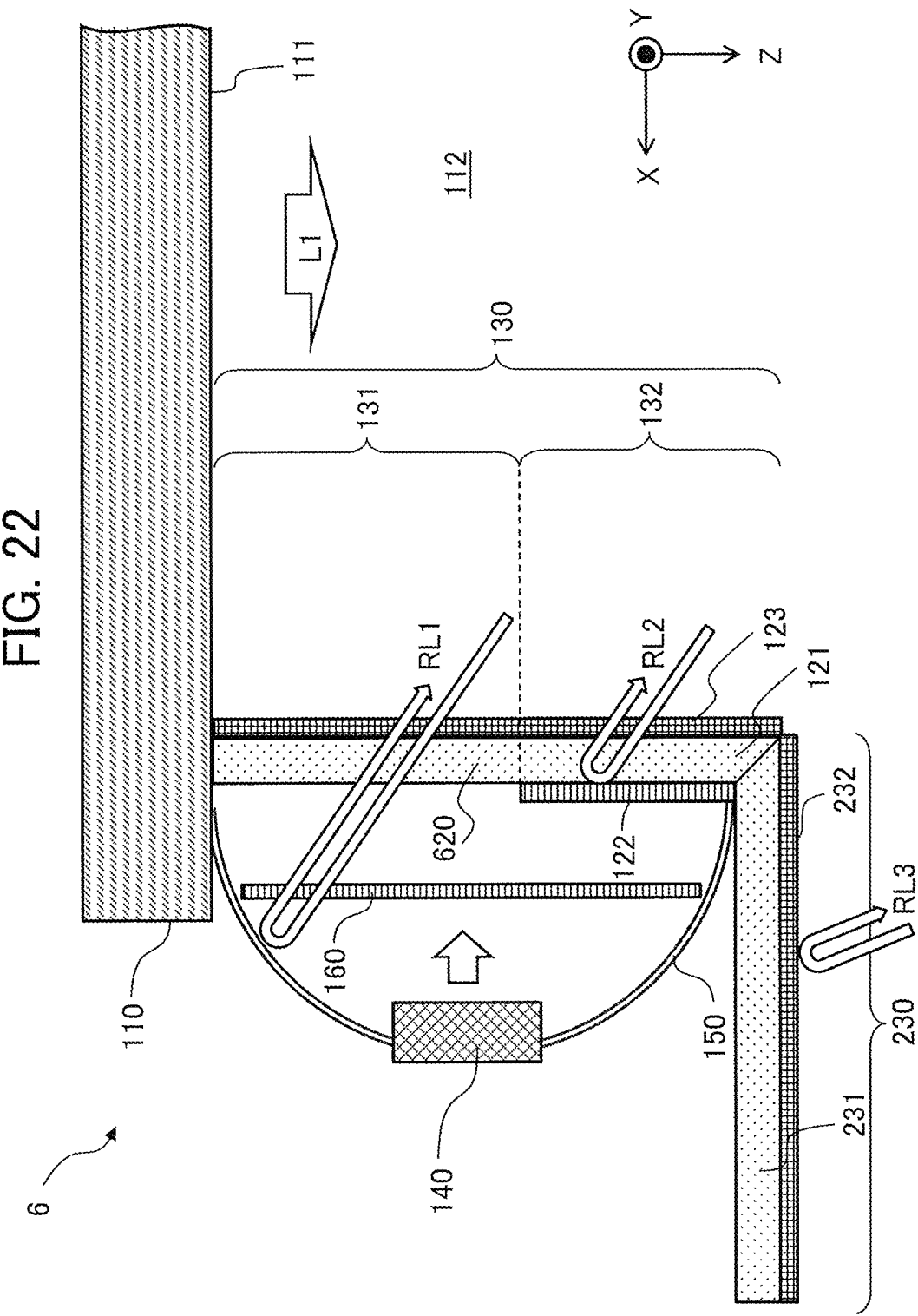
FIG. 22 is a principal part cross-sectional view schematically showing a configuration example of an illumination device according to a sixth embodiment of the present invention.

FIG. 22 is a principal part cross-sectional view schematically showing a configuration example of an illumination device 6 according to a sixth embodiment. FIG. 22 shows a configuration corresponding to the configuration example shown in FIG. 20. The illumination device 6 according to the sixth embodiment includes a frame-like member 620. Incidentally, the configuration of the frame-like member 620 may be basically the same as that in the above fifth embodiment. In the example shown in FIG. 22, the frame-like member 620 includes the flange part 230 similarly to the frame-like member 520.

Incidentally, it is also possible to leave out the flange part 230. Further, the frame-like member 620 may include the flange surface 233 instead of the flange part 230.

The sixth embodiment proposes a configuration capable of simulating a window frame to some extent for the light-emitting panel 110 even in the off state of the illumination device 6, that is, even when the light-emitting panel 110 and the light source unit 140 are in the non-lighting state. A configuration that looks natural in the non-lighting state is more specifically a configuration in which the luminance of the bright part region 131 of the frame-like member 620 is equivalent to or higher than the luminance of the dark part region 132, and the luminance of a front surface of a part where no sunlight expression part 130 is formed (e.g., the flange part 230 or the flange surface 233) is equivalent to or higher than the luminance of the bright part region 131 in a case where the frame-like member 620 includes such a part, in a situation where external light is incident upon the illumination device 6 in the non-lighting state. This means that the relationship between the bright part region 131 and the dark part region 132 regarding the luminance does not invert even in the non-lighting state, and means a situation where the front surface of the part where no sunlight expression part 130 is formed (in the example shown in FIG. 22, the light diffusion member 232) is visually recognizable in the cases where the frame-like member 620 includes such a part.

In the non-lighting state, external light shines on the illumination device 6. Here, focusing on the bright part region 131, a part of the external light incident upon the bright part region 131 included in the front surface of the frame-like member 620 passes through the light transmission diffusion member 123, is reflected by the light reflection diffusion member 150, passes through the light transmission diffusion member 123 again, and is emitted from the bright part region 131. Incidentally, when the illumination device 6 further includes the light transmission diffusion member 160 as in the example shown in FIG. 22, the incident external light passes through the light transmission diffusion member 123, passes through the light transmission diffusion member 160 before and after being reflected by the light reflection diffusion member 150, and then passes through the light transmission diffusion member 123 again.

In the following description, such light entering the frame-like member 620 through the front surface and being emitted again from the front surface is referred to as reflected external light RL, in which light emitted from the bright part region 131 is referred to as reflected external light RL1, light emitted from the dark part region 132 is referred to as reflected external light RL2, and light emitted from a region other than the sunlight expression part 130, such as the flange part 230 or the flange surface 233, is referred to as reflected external light RL3.

Light reflectance R1, defined as the ratio of the reflected external light RL1 to the incident external light in the bright part region 131, is higher than or equal to 50%, for example. The light reflectance R1 may be obtained by, for example, irradiating the bright part region 131 with a known amount of light and measuring the returning light with an actinometer or the like.

Next, the dark part region will be focused on. External light incident upon the dark part region 132 included in the front surface of the frame-like member 620 passes through the light transmission diffusion member 123, is partially reflected by the mask 122, passes through the light transmission diffusion member 123 again, and is emitted from the dark part region 132. Also in the case of the dark part region 132, when the illumination device 6 includes the light transmission diffusion member 160, the incident external light passes through the light transmission diffusion member 123, passes through the light transmission diffusion member 160 before and after being reflected by the light reflection diffusion member 150, and then passes through the light transmission diffusion member 123 again.

Light reflectance R2, defined as the ratio of the reflected external light RL2 to the incident external light in the dark part region 132, is higher than or equal to 1% and less than 50%, for example. The light reflectance R2 may be obtained by, for example, irradiating the dark part region 132 with a known amount of light and measuring the returning light with an actinometer or the like.

By configuring the light transmission diffusion member 123, the light reflection diffusion member 150, the light transmission diffusion member 160, the mask 122, etc. so that the light reflectance R1 of the bright part region 131 becomes higher than the light reflectance R2 of the dark part region 132 as above, the light emission amount of the bright part region 131 can be made higher than that of the dark part region 132 also in regard to the external light.

Incidentally, in the situation where the external light is incident upon the illumination device 6 in the non-lighting state, the light emitted from the bright part region 131 can include light reflected by the front surface of the frame body 121 and the light transmission diffusion member 123 arranged in the bright part region 131 and light entering through the dark part region 132, passing through the light transmission diffusion member 123 and the mask 122, reflected (and diffused) by the light reflection diffusion member 150, and emitted from the bright part region 131. Similarly, the light emitted from the dark part region 132 can include light reflected by the front surface of the frame body 121 and the light transmission diffusion member 123 arranged in the dark part region 132 and light entering through the bright part region 131, passing through the light transmission diffusion member 123 and the mask 122, reflected (and diffused) by the light reflection diffusion member 150, and emitted from the dark part region 132. However, the increase/decrease in the light amount due to these factors can occur in both of the bright part region 131 and the dark part region 132, and thus the influence of these factors may be neglected.

Next, the region of the front surface of the frame-like member 620 where no sunlight expression part 130 is formed (e.g., the flange part 230, the flange surface 233 or the like) will be focused on. When the frame-like member 620 includes such a region, it is desirable to configure the frame-like member 620 further considering the following situation: When external light is incident upon the front surface of the region or the light diffusion member 232 arranged on the front surface, the external light is reflected by the front surface of the frame body (the plate-shaped part 231 or the frame body 121a) forming the region, the surface of the light diffusion member 232, or both of them, and is emitted again from the region.

Here, light reflectance R3, defined as the ratio of the reflected external light RL3 to the incident external light in the region of the frame-like member 620 where no sunlight expression part 130 is formed, is higher than or equal to 50%, for example. More specifically, the light reflectance R3 is desired to be equivalent to or higher than the light reflectance R1. The light reflectance R3 may be obtained by, for example, irradiating the front side of the region where no sunlight expression part 130 is formed with a known amount of light and measuring the returning light with an actinometer or the like.

By configuring the light transmission diffusion member 123, the light reflection diffusion member 150, the light transmission diffusion member 160, the frame body 121, the light diffusion member 232, the plate-shaped part 231, etc. so that the light reflectance R3 of the region where no sunlight expression part 130 is formed such as the flange part 230 and the flange surface 233 becomes equivalent to or higher than the light reflectance R1 of the bright part region 131 as above, the light emission amount of the region where no sunlight expression part 130 is formed can be made equivalent to or higher than that of the bright part region 131 also in regard to the external light.

As described above, by using the illumination device 6, in addition to obtaining the advantages of the first to fifth embodiments, it is made possible to feel that a window and a window frame exist even in the non-lighting state with a simple configuration.

(7) Seventh Embodiment

Figure 23:
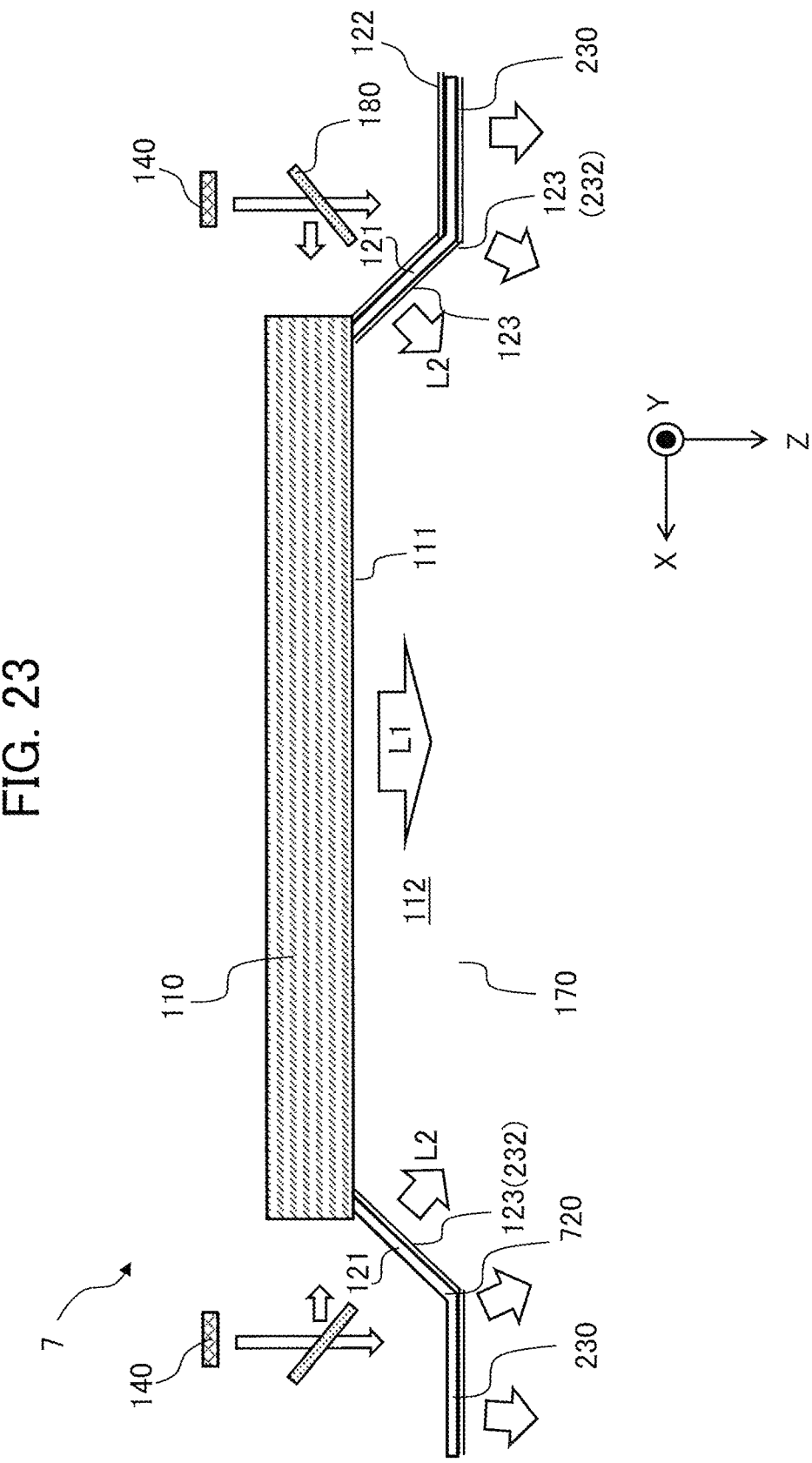
FIG. 23 is a cross-sectional view schematically showing a configuration example of an illumination device according to a seventh embodiment of the present invention.

FIG. 23 is a cross-sectional view schematically showing a configuration example of an illumination device 7 according to a seventh embodiment of the present invention. The illumination device 7 is configured so that especially a part of a frame-like member 720 where the sunlight expression part 130 is formed is inclined with respect to the normal line of the light emission surface 111.

More specifically, the frame-like member 720 (more specifically, the frame body 121) in this example includes a part that extends outward toward the front. With such a part included in the frame-like member 720, the area of the sunlight expression part 130 captured in the observer's field of view can be increased.

In this example, the frame body 121 is in a tapered shape in which the opening size of the opening part 170 formed by the frame body 121 (opening region in an XY cross section) increases with the increase in the distance from the light emission surface 111.

Further, the frame-like member 720 in this example includes the flange part 230 that spreads outward from the farthest end part of the frame body 121 farthest from the light emission surface 111. In this example, the frame body 121 serves also as the plate-shaped part 231 of the flange part 230. Namely, these parts are formed integrally.

On the front surface of the frame body 121 including the flange part 230, the sunlight expression part 130 (the bright part region 131, the dark part region 132, or both of the bright part region 131 and the dark part region 132) is provided. While the area of the sunlight expression part 130 captured in the observer's field of view is increased further in this example by forming the sunlight expression part 130 not only on the front surface of the inclined part of the frame body 121 but also on the front surface of the flange part 230, the sunlight expression part 130 does not necessarily have to be provided on the flange part 230.

In the example shown in FIG. 23, the mask 122 is arranged on the back surface of the frame body 121 of the frame-like member 720 on the right side of the drawing. The example shown in FIG. 23 is an example in which the whole region on the front side of the frame-like member 720 on the right side of the drawing is the dark part region 132 and the whole region on the front side of the frame-like member 720 on the left side of the drawing is the bright part region 131.

Further, the light transmission diffusion member 123 is arranged on the front surface of the frame body 121 of the frame-like member 720 and the front surface of the flange part 230 on the right side of the drawing. Similarly, the light transmission diffusion member 123 is arranged on the front surface of the frame body 121 of the frame-like member 720 and the front surface of the flange part 230 on the left side of the drawing. Incidentally, a part of the light transmission diffusion member 123 in this example (more specifically, the part arranged on the front surface of the flange part 230) serves also as the light transmission diffusion member as the light diffusion member 232. Incidentally, it is also possible to arrange the mask 122 at a position on the front surface of the frame body 121 and between the frame body 121 and the light transmission diffusion member 123.

In such a configuration, when light from the light source unit 140 is incident upon the back side of the frame body 121 of the frame-like member 720 on the right side of the drawing, the light is diminished by the mask 122, then passes through the frame body 121 and the light transmission diffusion member 123, and is emitted from the dark part region 132 as the light heading for the space 112. On the other hand, when light from the light source unit 140 is incident upon the back side of the frame body 121 of the frame-like member 720 on the left side of the drawing, the light passes through the frame body 121 and the light transmission diffusion member 123 without being diminished by the mask 122, and is emitted from the bright part region 131 as the light heading for the space 112.

Except for the above-described features, the illumination device 7 shown in FIG. 23 may be the same as the illumination device in any one of the first to sixth embodiments.

Incidentally, while FIG. 23 shows an example in which the illumination device 7 includes the light splitting part 180, light emitted from a light source unit 140a is split by the light splitting part 180 into light heading for the frame-like member 720 and light heading for the light-emitting panel 110, and thereby the light source unit 140a serves also as the panel-purposed light source 110a, it is also possible to provide the light source unit 140a and the panel-purposed light source 110a separately from each other. Such a configuration including the light splitting part 180 is not limited to the example in the seventh embodiment. Even in the seventh embodiment, it is also possible to employ a configuration including no light splitting part 180 described earlier in other embodiments. Further, in the configuration of FIG. 23 in which the frame-like member 720 is in the tapered shape, other components such as the light-emitting panel and the light source may have the configurations described in other embodiments.

Further, the shape of the flange part 230 is not limited to the shape illustrated in the drawing. For example, the flange part 230 may be formed with a plurality of members. Further, the illumination device 7 may also employ structure in which the flange part 230 is detachable or structure including no flange part 230. It is also possible to configure the illumination device 7 so that the frame-like member 720 includes a horizontal part (flange surface 233) and the flange surface 233 includes a bright part region and a dark part region. The flange surface 233 may also be a nontransparent member. Further, the cross-sectional shape of the frame-like member 720 may also be a curved line shape (i.e., the frame-like member 720 may be in a curved surface shape). The frame-like member in a curved surface shape can serve as both of the frame-like member 720 and the flange part 230 shown in FIG. 23.

As described above, by using the illumination device 7 according to the seventh embodiment, in addition to obtaining the advantages of the first to sixth embodiments, the bright part region simulating a sunny region and the dark part region simulating a shady region become easier to visually recognize since the area of the sunlight expression part 130 captured in the observer's field of view increases.

Further, by using the illumination device 7, a larger amount of light can be emitted from the bright part region 131 enlarging due to the increase in the area of the sunlight expression part 130.

Figure 24:
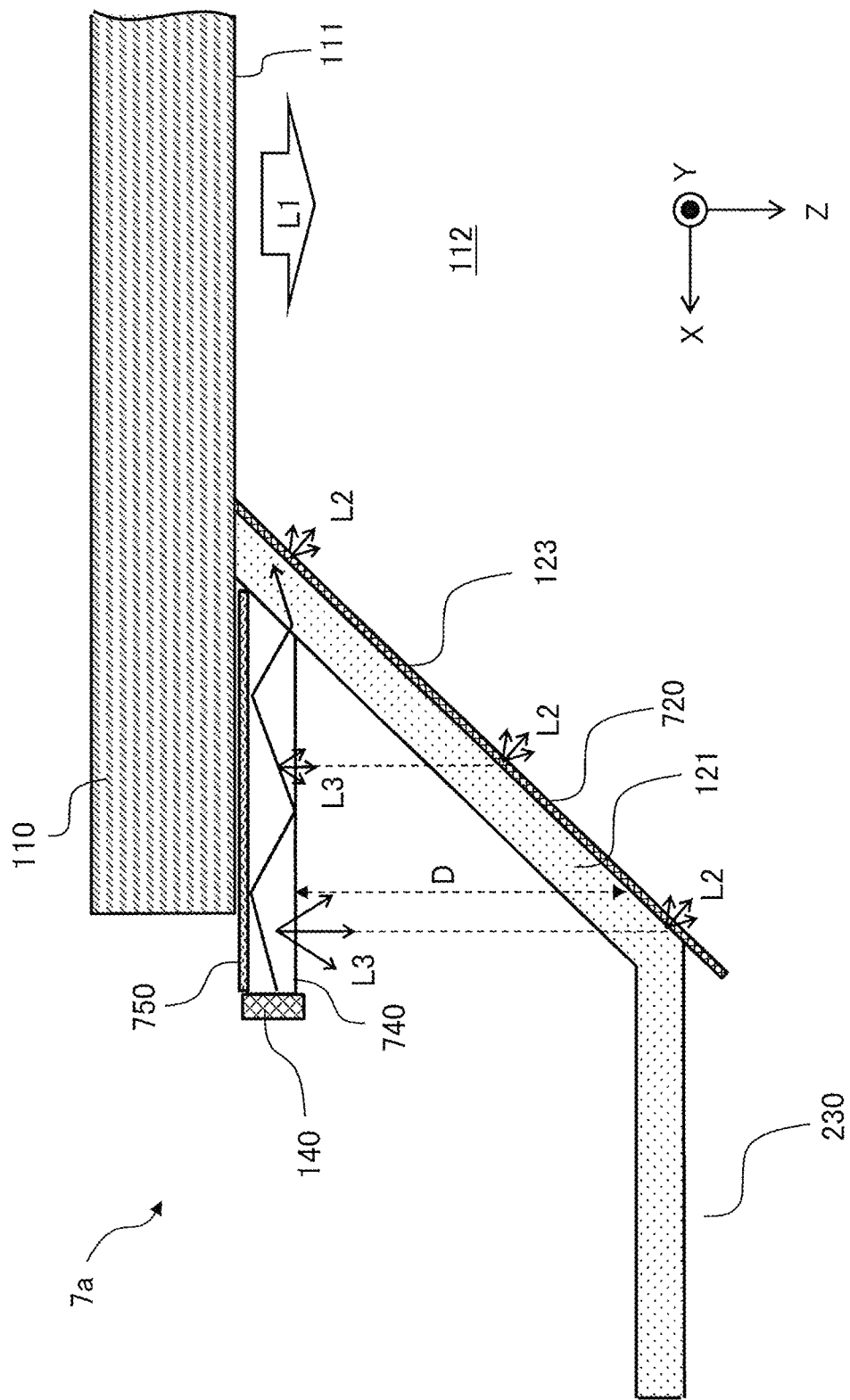
FIG. 24 is a principal part cross-sectional view schematically showing a configuration example of an illumination device according to a modification of the seventh embodiment.

FIG. 24 is a principal part cross-sectional view schematically showing a configuration example of an illumination device 7a according to a modification of the seventh embodiment. In FIG. 24, each component identical or corresponding to a component shown in FIG. 23 is assigned the same reference character as in FIG. 23. The illumination device 7a greatly differs from the illumination device 7 shown in FIG. 23 in that a light guide part 740 for guiding the light emitted from the light source unit 140 is provided between the light source unit 140 and the frame-like member 720 including a part that extends outward toward the front. Incidentally, the illumination device 7a shown in FIG. 24 differs from the illumination device 7 shown in FIG. 23 also in that the flange part 230 of the frame-like member 720 does not include the sunlight expression part 130 or the light diffusion member 232. However, the frame-like member 720 may also be configured to include the sunlight expression part 130 and the light diffusion member 232 also in the example shown in FIG. 24.

In the illumination device 7a, one end of the light guide part 740 (in the example in the drawing, an end in the −X direction) is arranged to be in proximity to an end of the back surface of the frame-like member 720 on the light-emitting panel 110's side. Further, the light source unit 140 is arranged at a position facing the other end of the light guide part 740 (in the example in the drawing, an end in the +X direction). The end of the light guide part 740 on the frame-like member 720's side and the frame-like member 720 may be either fixed to each other by using a transparent adhesive agent or the like or facing each other via an air interface.

The light guide part 740 is provided corresponding to the light source unit 140 arranged on the back side of the frame-like member 720, for example. For example, the light guide part 740 may be provided to cover a region of the back surface of the frame-like member 720 corresponding to the sunlight expression part 130 in a rear view. Incidentally, while the example shown in FIG. 24 shows only a region corresponding to the bright part region 131, in the dark part region 132 or a region corresponding to the dark part region 132, one end of a light guide part 740 is arranged to be in proximity to an end of the back surface of the frame-like member 720 including the mask 122 on the light-emitting panel 110's side.

In this example, the light guide part 740 is arranged along the shape of the frame-like member 720 so that a light incidence end is situated on an end side of the light-emitting panel 110 and a light emission end is situated on a central side of the light-emitting panel 110. However, the light guide part 740 is arranged to be inclined with respect to the frame-like member 720 so that a part closer to the light source unit 140 is farther from the frame-like member 720 and a part farther from the light source unit 140 is closer to the frame-like member 720.

The light guide part 740 in this example includes a light reflection diffusion member 750 that diffuses a part of the incident light (in this example, light from the light source unit 140). The light reflection diffusion member 750 is formed by printing a print material including a material that reflects and diffuses light, performing surface treatment (e.g., treatment for forming a rough surface that irregularly reflect light) on a member forming the light guide part 740, sticking a film including a material that reflects and diffuses light, or the like. The light reflection diffusion member 750 is arranged at a position inside the light guide part 740 and on the light-emitting panel 110's side and reflects and diffuses light traveling in the light guide part 740.

In FIG. 24, when light from the light source unit 140 enters the light guide part 740, the light guide part 740 guides the light as light heading for an opposing end, more specifically, light heading for the end of the frame-like member 720 on the light-emitting panel 110's side (in the example in the drawing, light traveling in the −X direction), and emits the light from the opposing end. Further, the light guide part 740 reflects and diffuses a part of the light guided towards the opposing end with the light reflection diffusion member 750, thereby turns the light into light traveling in the +Z direction, and emits the light. As above, a part of the light traveling in the light guide part 740 travels substantially in the −X direction from the end side towards the center of the light-emitting panel 110 and is incident upon the frame-like member 720. Meanwhile, another part of the light traveling in the light guide part 740 is reflected and diffused by the light reflection diffusion member 750, consequently travels in the +Z direction as the forward direction through a wall surface of the light guide part 740 (more specifically, a wall surface on the frame-like member 720's side), and is incident upon the back side of the frame-like member 720 situated in front of the light guide part 740.

The light arriving at the frame-like member 720 as above is partially reflected by the mask 122 if the mask 122 is there, thereafter diffused by the light transmission diffusion member 123, and is emitted as the light L2, similarly to light incident upon another transmissive frame-like member.

Since a part of the light traveling in the light guide part 740 is extracted by the light reflection diffusion member 750 through the wall surface on the frame-like member 720's side, the intensity of the light guided in the light guide part 740 decreases as the light travels in the light guide part 740. In FIG. 24, the light emitted from the light source unit 140 and entered the light guide part 740 gradually decreases in the light intensity as the light travels in the −X direction as the light guide direction from the light incidence end situated at the left end of the light guide part 740 in FIG. 24. Accordingly, the light intensity of diffuse light L3 (light emitted in the +Z direction) deriving from the guided light in the light guide part 740 also decreases as the position moves in the light guide direction from the light incidence end.

On the other hand, the light intensity of the diffuse light L3 at the time of arriving at the back surface of the frame-like member 720 after being emitted in the +Z direction from the light guide part 740 attenuates depending on the distance D between the light guide part 740 and the frame-like member 720. Namely, the light intensity of the diffuse light L3 decreases with the increase in the distance D between the light guide part 740 and the frame-like member 720.

In consideration of the above-described properties, in the illumination device 7a in this example, the light guide part 740 is arranged so that the distance to the frame-like member 720 decreases as the position moves in the light guide direction from the light incidence end. In the example shown in FIG. 24, the light emission end of the light guide part 740 is the closest to the frame-like member 720 and the light incidence end of the light guide part 740 is the farthest from the frame-like member 720. With such an arrangement, even though the intensity of the diffuse light L3 emitted from the light guide part 740 decreases as the position moves in the light guide part 740 towards the light guide end, that is, towards the central side of the light-emitting panel 110, the amount of the attenuation of the diffuse light L3 until arriving at the frame-like member 720 can be made to decrease as the position moves towards the light guide end. Consequently, variations in the intensity distribution of the diffuse light L3 arriving at the back surface of the frame-like member 720 decrease and variations in the luminance in the bright part region formed on the light transmission diffusion member 123's side of the frame-like member 720 decrease irrespective of the X direction position in the frame-like member 720.

For example, an angle formed by the surface of the frame-like member 720 on which the sunlight expression part 130 is formed and the light guide direction of the light guide part 740 or the probability of occurrence of the diffuse light L3 in the light guide part 740 (or the amount of attenuation of the guided light with respect to its traveling distance) may be adjusted so that the amount of attenuation of the guided light in the light guide part 740 with respect to the traveling distance and the amount of attenuation of the diffuse light L3 emitted from the light guide part 740 with respect to the traveling distance cancel each other out.

As described above, by using the illumination device 7a, the variations in the luminance in the bright part region can be decreased.

(8) Eighth Embodiment

Figure 25:
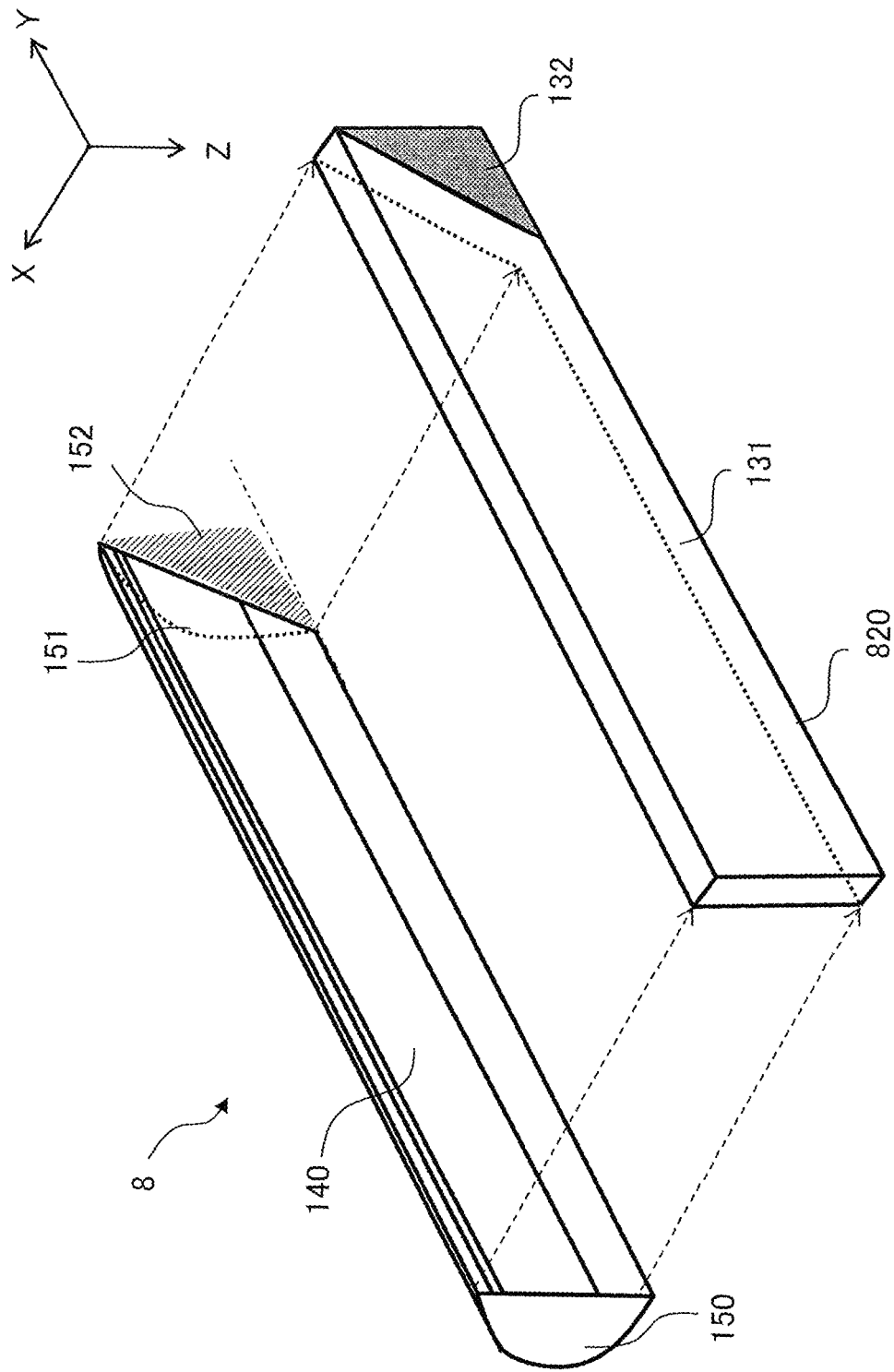
FIG. 25 is an exploded perspective view schematically showing a configuration example of a light source unit, a light reflection diffusion member and a frame-like member of an illumination device according to an eighth embodiment of the present invention.
Figure 26:
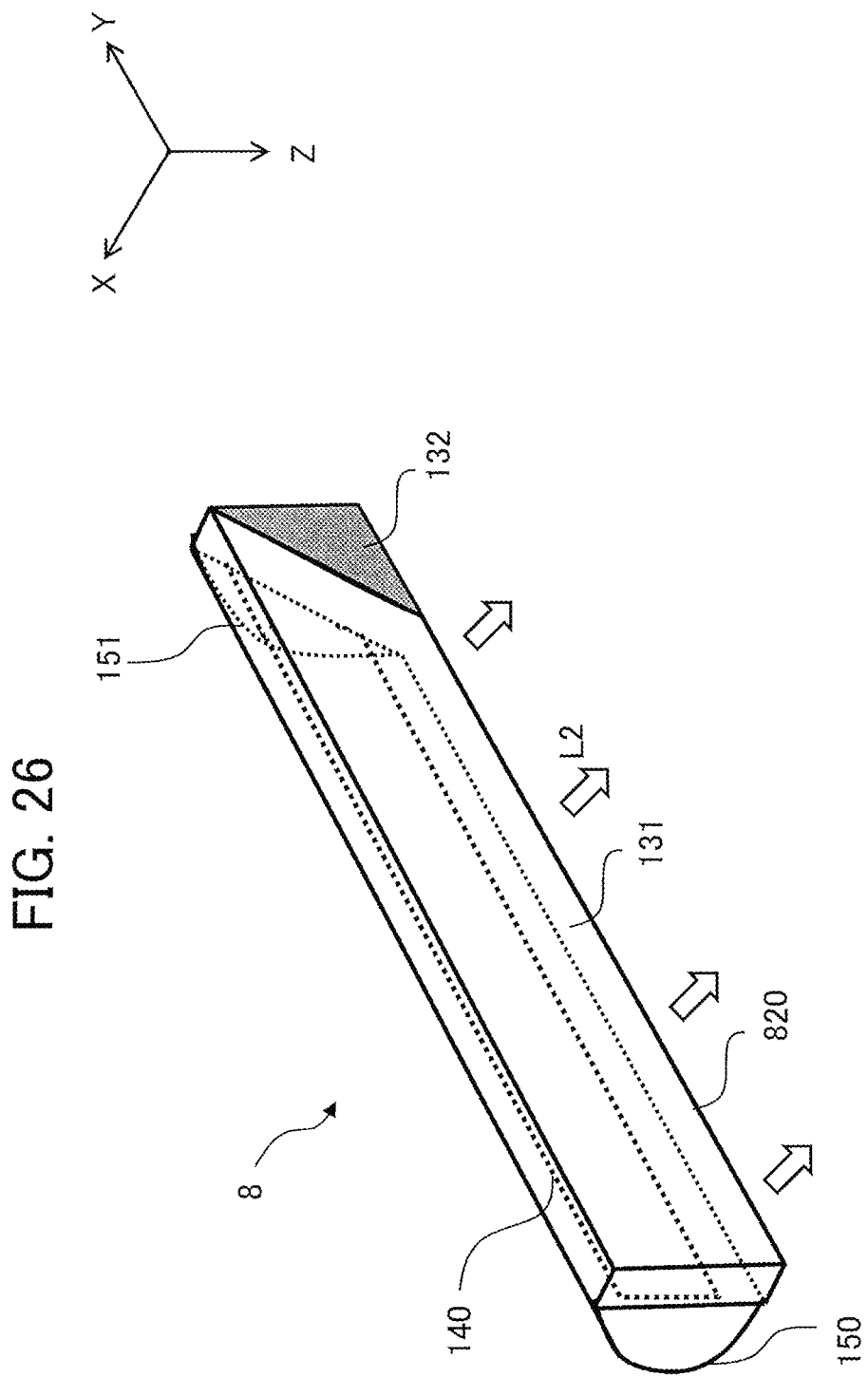
FIG. 26 is a perspective view schematically showing the configuration example of the illumination device according to the eighth embodiment.
Figure 27:
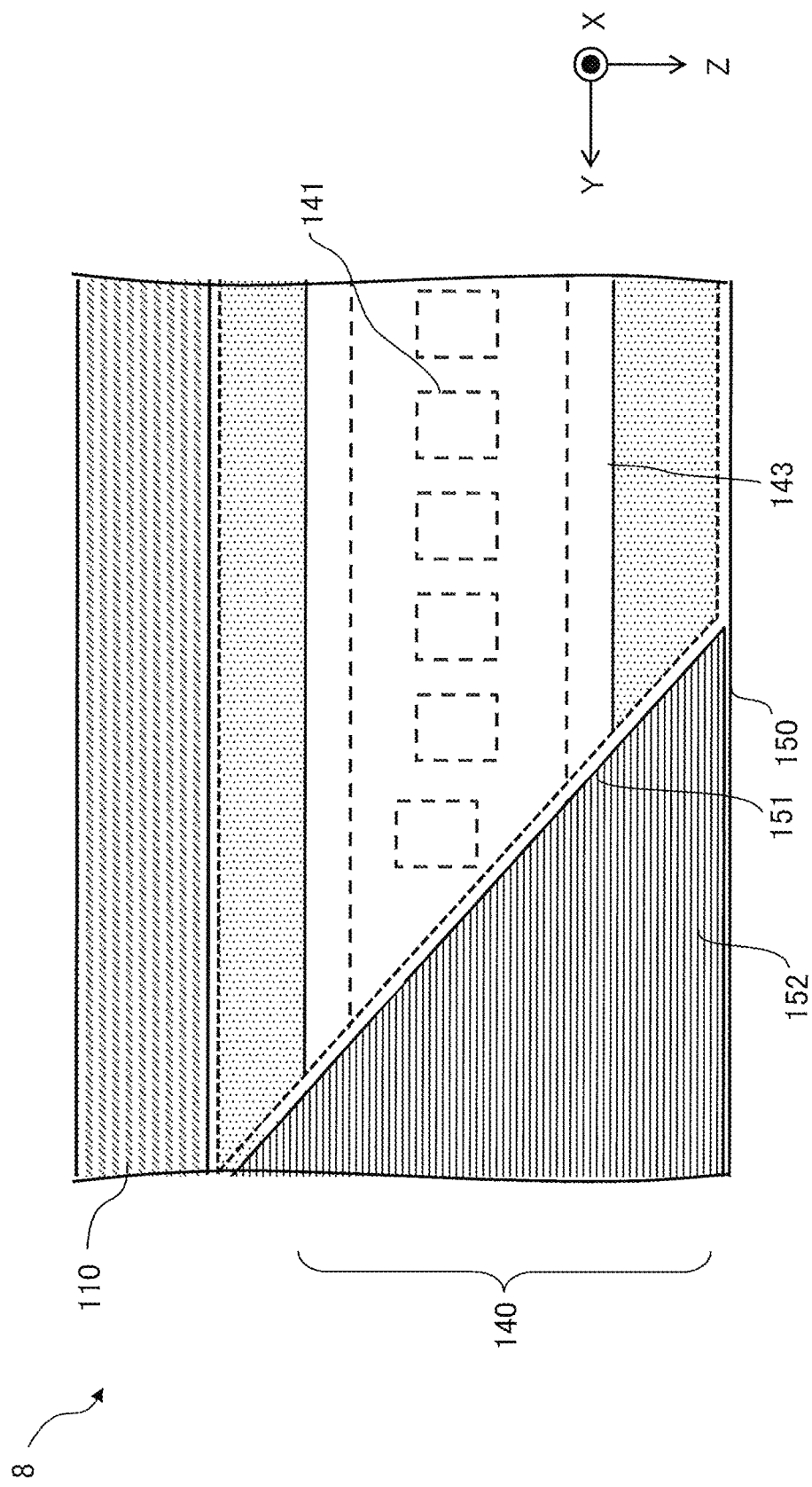
FIG. 27 is a rear view of the frame-like member of the illumination device according to the eighth embodiment as viewed from a back side.

FIG. 25 is a principal part exploded perspective view schematically showing a configuration example of an illumination device 8 according to an eighth embodiment. FIG. 26 is a principal part perspective view schematically showing the configuration example of the illumination device 8. FIG. 27 is a rear view of the configuration example shown in FIG. 26 as viewed from the back side of the frame-like member. A frame-like member 820 in the eighth embodiment has the same structure as any one of the frame-like members in the first to seventh embodiments. However, the illumination device 8 does not need to include the mask (more specifically, the mask 122, 122a or the like) in the first to seventh embodiments.

The illumination device 8 differs from the illumination devices in the first to seventh embodiments in not including the mask and in the structure of the aforementioned light reflection diffusion member 150. More specifically, in the illumination device 8, the light reflection diffusion member 150 has the function of the first light restriction member. Namely, the light reflection diffusion member 150 of the illumination device 8 is arranged only in a region of the frame-like member 820 facing the bright part region 131 and is configured so that the light from the light source unit 140 does not reach a region (reference character 152 in the drawing) of the frame-like member 820 facing the dark part region 132 or so as to reduce the amount of light reaching the region facing the dark part region 132. Thus, in the illumination device 8, no mask is provided on the front surface of the frame-like member 820 where the dark part region 132 is provided or on the back surface of the frame-like member 820.

In the illumination device 8, instead of the mask, a side surface 151 of the light reflection diffusion member 150 is provided in a boundary part between a region on the back side of the frame-like member 820 corresponding to the bright part region 131 and a region on the back side of the frame-like member 820 corresponding to the dark part region 132. In this example, this side surface 151 corresponds to the first light restriction member. In the following description, such a surface provided in the boundary part between the region on the back side of the frame-like member 820 corresponding to the bright part region 131 and the region on the back side of the frame-like member 820 corresponding to the dark part region 132 and having the function of blocking light can be referred to as a blocking wall 151.

Incidentally, the frame-like member may include the light reflection member 150a having no diffusing power instead of the light reflection diffusion member 150 also in this example; however, also in that case, the light reflection member 150a is assumed to be arranged only in the region of the frame-like member 820 facing the bright part region 131. In other words, the light reflection member 150a is assumed to have the blocking wall 151 provided in the boundary part between the region facing the bright part region 131 and the region facing the dark part region 132.

Incidentally, such a blocking wall 151 can also be, in a broad sense, regarded as an optical member provided in "a region corresponding to the dark part region 132" in "the optical path until the light emitted from the light source unit 140 enters the back surface of the frame-like member 820 and is emitted again from the front surface of the frame-like member 820 as the light heading for the space 112".

Further, in the light reflection diffusion member 150, the blocking wall 151 (side surface 151) may be configured so that the spacing between the light reflection diffusion member 150 and the frame-like member 820 gradually increases with the increase in the distance from the light emission surface 111 of the light-emitting panel 110. With such a configuration, it is possible to leak out a part of the light emitted from the light source unit 140. With this configuration, it is possible to form blurring similar to the blurring in the boundary part shown in FIG. 15A.

As described above, by using the illumination device 8 according to the eighth embodiment, advantages similar to those of the first to seventh embodiments can be obtained even without providing the mask (e.g., the mask 122 or the mask 122a) on the surface of the frame-like member where the dark part region 132 is provided. However, the illumination device 8 can also be further provided with a mask similar to the mask in any one of the first to seventh embodiments.

(9) Modifications

In the illumination devices in the first to eighth embodiments described above, the light-emitting panel can also be a side light incidence panel upon which light is incident from the side. In that case, the frame-like member 120 may be provided on an end part of the light-emitting panel or in a space facing the end part.

Figure 28:
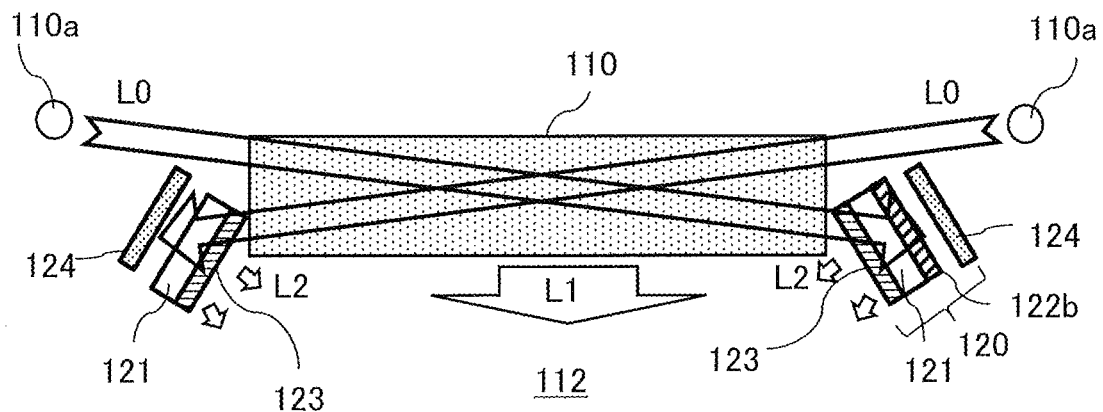
FIG. 28 is a schematic cross-sectional view showing a configuration example of an illumination device according to a modification of the first embodiment.
Figure 29:
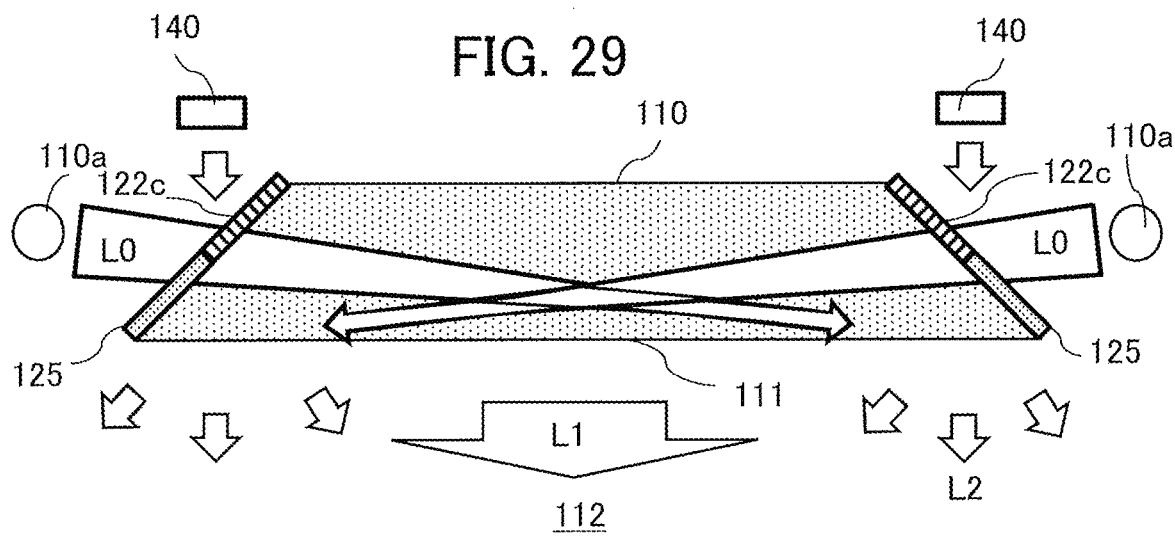
FIG. 29 is a schematic cross-sectional view showing another configuration example of the illumination device according to the modification of the first embodiment.
Figure 30:
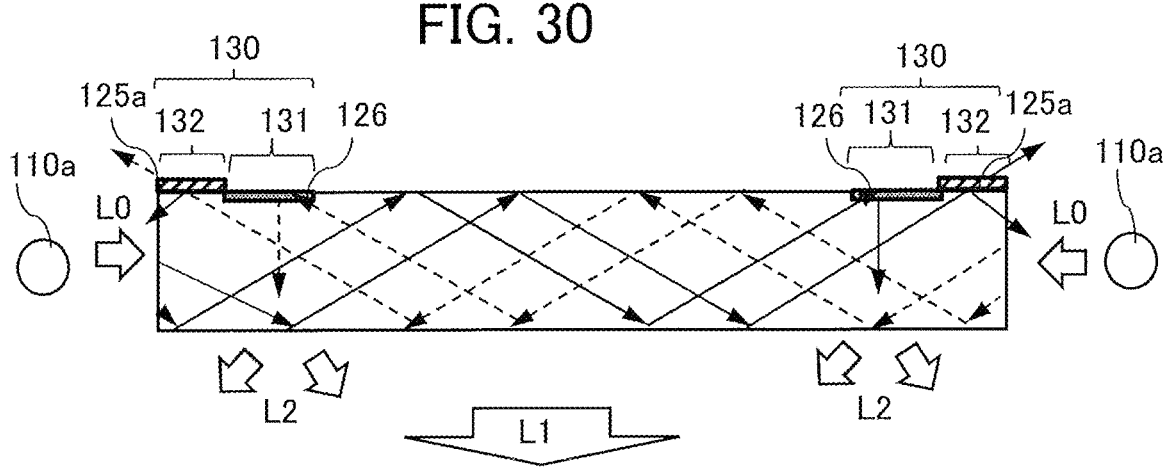
FIG. 30 is a schematic cross-sectional view showing another configuration example of the illumination device according to the modification of the first embodiment.

FIG. 28 to FIG. 30 are schematic cross-sectional views schematically showing configuration examples of illumination devices according to modifications of the embodiments. As shown in FIG. 28 to FIG. 30, the positional relationship between the light-emitting panel 110 and the frame-like member 120 is not limited to the above-described examples. In these examples, the observer views the frame-like member 120 through the light-emitting panel 110. In this case, the observer recognizes a region of the frame-like member 120 where the light restriction member is formed (or a region of the frame-like member 120 where no light extraction member is formed) as the dark part region 132, for example. Further, the observer recognizes a region of the frame-like member 120 where the light extraction member is formed (or a region of the frame-like member 120 where no light restriction member is formed) as the bright part region 131, for example.

For example, in the example of the illumination device shown in FIG. 28, the frame-like member 120 is arranged lateral to the light-emitting panel 110, more specifically, arranged in a space facing an end face of the light-emitting panel 110. The frame-like member 120 shown in FIG. 28 implements a reflective frame-like member by including the light reflection member 124 on the back side of the frame body 121 (in this example, on the side opposite to the side facing the space 112). In the illumination device in this example, the light absorptive mask 122b, for example, is provided in the dark part region 132 or a region corresponding to the dark part region 132 between the light reflection member 124 and the light transmission diffusion member 123 provided close to the front surface of the frame-like member 120.

Also in this example, it is possible to leave out the light transmission diffusion member 123. In that case, the mask 122b may be provided in the dark part region 132 or a region corresponding to the dark part region 132 between the frame body 121 and the light reflection member 124, such as on the back surface of the frame body 121 of the frame-like member 120.

Here, the mask 122b can be a polarization mask, for example, to have the function of transmitting the light from the panel-purposed light source 110a incident upon the front side of the frame-like member 120 while blocking (absorbing) returning light as the incident light reflected by the light reflection member 124 and returning to the mask 122b.

In the example shown in FIG. 28, the mask 122b is arranged on the back surface of the frame body 121 of the frame-like member 120 on the right side of the drawing. The example shown in FIG. 28 is an example in which the whole region on the front side of the frame-like member 120 on the right side of the drawing is the dark part region 132 and the whole region on the front side of the frame-like member 120 on the left side of the drawing is the bright part region 131.

Incidentally, it is also possible to leave out the mask 122b and the light reflection member 124 by using the mask 122d whose light reflectance varies in a surface.

Further, in the example shown in FIG. 28, the sunlight expression part 130 is made to emit light by using the panel-purposed light source 110a instead of the light source unit 140. More specifically, light emitted from the panel-purposed light source 110a provided at an end part (opposing end part) of the light-emitting panel 110 opposing the light-emitting panel 110's end part (provision end part) provided with the frame-like member 120, passing through the light-emitting panel 110, and thereafter emitted from the end part as the light guide end is used instead of the light from the light source unit 140.

For example, upon the frame-like member 120 provided on the right side of the light-emitting panel 110 in FIG. 28, light emitted from the panel-purposed light source 110a provided on the left side of the light-emitting panel 110 in the drawing, guided in the light-emitting panel 110, and emitted from the right-side end part of the light-emitting panel 110 in the drawing is incident. The light incident upon the front side of the frame-like member 120 as above passes through the light transmission diffusion member 123, the frame body 121 and the mask 122b and is thereafter reflected by the light reflection member 124. The light reflected by the light reflection member 124 is diminished by the mask 122b if it is in a region where the mask 122b exists, thereafter passes through the frame body 121 and the light transmission diffusion member 123, and is emitted as the light heading for the space 112.

For example, upon the frame-like member 120 provided on the left side of the light-emitting panel 110 in FIG. 28, light emitted from the panel-purposed light source 110a provided on the right side of the light-emitting panel 110 in the drawing, guided in the light-emitting panel 110, and emitted from the left-side end part of the light-emitting panel 110 in the drawing is incident. The light incident upon the front side of the frame-like member 120 as above passes through the light transmission diffusion member 123 and the frame body 121 and is thereafter reflected by the light reflection member 124. The light reflected by the light reflection member 124 is diminished by the mask 122*b* if it is in a region where the mask 122*b* exists, thereafter passes through the frame body 121 and the light transmission diffusion member 123, and is emitted as the light heading for the space 112.

Incidentally, while the frame-like member 120 is provided lateral to the light-emitting panel 110 in order to make use of light emitted from an end part of the light-emitting panel 110 in the example shown in FIG. 28, it is also possible, in a case where the light-emitting panel 110 is configured to emit light from the back surface, for example, to provide a frame-like member 120, configured to receive the light emitted from the back surface of the light-emitting panel 110 and reflect the light forward, to the rear of the light-emitting panel 110 (more specifically, at a position close to a rear end part of the light-emitting panel 110).

In the example of the illumination device shown in FIG. 29, the sunlight is expressed by using side faces forming end parts of the light-emitting panel 110, without providing a separate frame body as the frame forming part 12. Namely, in the illumination device shown in FIG. 29, frame-like member 120 is provided on the side faces forming the end parts of the light-emitting panel 110 (specifically, side faces inclined so as to withdraw into the back side).

In this example, the light-emitting panel 110 has an inclined surface, inclined with respect to the light emission surface 111, in each end part, and the bright part region 131 and the dark part region 132 are provided on the inclined surface. In the example shown in FIG. 29, a mask 122*c* that transmits (prevents reflection of) the light heading for the light-emitting panel 110 from the panel-purposed light source 110*a* and blocks (e.g., absorbs, reflects or the like) the light from the light source unit 140 is provided in a region on the inclined surface where the dark part region 132 is provided.

Further, in a region on the inclined surface where the bright part region 131 is provided, an antireflection member 125 (e.g., antireflection film) that transmits (prevents reflection of) the light heading for the light-emitting panel 110 from the panel-purposed light source 110*a* and the light from the light source unit 140 may be provided.

Incidentally, the mask 122*c* may be left out in a case where the light from the light source unit 140 is reflected by the inclined surface even if no mask 122*c* is provided. Further, the antireflection member 125 may be left out in a case where the light from the light source unit 140 passes through the light-emitting panel 110 without being reflected by the inclined surface even if no antireflection member 125 is provided.

In the example shown in FIG. 29, the mask 122*c* corresponds to the light restriction member (more specifically, the first light restriction member). Further, the antireflection member 125 corresponds to the light extraction member. In the following description, the light extraction member provided for a transmissive frame-like member 120 as shown in FIG. 29 can be referred to as a first light extraction member.

For example, the mask 122*c* in this example absorbs or reflects at least a part of the light from the light source unit 140 (in this example, the light from the light source unit 140 incident upon the back side of a side face of the light-emitting panel 110 from the rear of the light-emitting panel 110) in the dark part region 132 or a region corresponding to the dark part region 132 included in the frame-like member 120 provided on an end part of the light-emitting panel 110 and thereby decreases the amount of the light heading for the space 112 from the dark part region 132 compared with a case where the member does not exist. Accordingly, the intensity of the light heading for the space 112 from the dark part region 132 can be made lower than the intensity of the light heading for the space 112 from the bright part region 131.

Further, for example, the antireflection member 125 in this example facilitates the transmission (more specifically, prevents the reflection) of at least a part of the light from the light source unit 140 (in this example, the light from the light source unit 140 incident upon the back side of a side face of the light-emitting panel 110 from the rear of the light-emitting panel 110) in the bright part region 131 or a region corresponding to the bright part region 131 included in the frame-like member 120 provided on an end part of the light-emitting panel 110 and thereby increases the amount of the light heading for the space 112 from the bright part region 131 compared with a case where the member does not exist. Accordingly, the intensity of the light heading for the space 112 from the bright part region 131 can be made higher than the intensity of the light heading for the space 112 from the dark part region 132.

In such a configuration, the observer recognizes the bright part region 131 and the dark part region 132 on each inclined surface as a side face through the light emission surface 111 of the light-emitting panel 110.

Incidentally, in the example shown in FIG. 29, the light-emitting panel 110 is assumed to be a diffusive panel including particles or the like. In that case, the light L2 can be diffused by configuring the light-emitting panel 110 so that the light from the light source unit 140 enters the light-emitting panel 110 through the inclined surface of the light-emitting panel 110, passes through the inside of the light-emitting panel 110, and is thereafter emitted from the light emission surface 111. In this case, the particles or the like included in the light-emitting panel 110 correspond to the light transmission diffusion member 123.

As another method, it is also possible to diffuse the light L2 by performing surface treatment of turning a region as a part of the light emission surface 111 of the light-emitting panel 110 for emitting the light from the light source unit 140 (region adjoining a side face) into a rough surface or the like. In this case, the surface-treated part formed on the light emission surface 111 to exhibit diffusing power corresponds to the light transmission diffusion member 123.

While the frame-like member 120 is provided on the side faces of the light-emitting panel 110 included in the end parts of the light-emitting panel 110 in the example shown in FIG. 29, it is also possible to provide the frame-like member 120 on a region as a part of the back surface or the front surface of the light-emitting panel 110 (e.g., region adjoining a side face).

While the example in FIG. 29 showed an example in which the end part where the frame-like member 120 is provided serves also as an incidence surface through which the light from the panel-purposed light source 110*a* enters the light-emitting panel 110, the mask 122*c* may be replaced with the aforementioned mask 122 having no polarization dependence in a case where the end part does not serve also as the incidence surface for the light from the panel-purposed light source 110*a*.

Further, in a case where the illumination device includes a transmissive frame-like member and the frame-like member is arranged at a position upon which the light from the panel-purposed light source 110*a* is incident, the configuration on the surface of the frame-like member may be made the same as the above-described configuration on the side face of the light-emitting panel 110. For example, it is possible to provide the mask 122c in the dark part region 132 of the frame-like member or a region of the frame-like member corresponding to the dark part region 132 and provide the antireflection member 125 in the bright part region 131 of the frame-like member or a region of the frame-like member corresponding to the bright part region 131. While the illumination device includes the light source unit 140 in FIG. 29, the illumination device may also be configured more simply to make the panel-purposed light source 110a serve also as the light source unit 140. Further, it is not necessarily essential to arrange light sources on both sides in the drawing; the illumination device may also employ a configuration in which a light source is arranged only on one side. In that case, the end part of the light-emitting panel 110 on the side where the panel-purposed light source 110a is arranged does not need to be inclined. Further, since an end part (opposing end part) opposing the end part of the light-emitting panel 110 on the side where the panel-purposed light source 110a is arranged does not serve also as the incidence surface for the light from the panel-purposed light source 110a, the mask 122c arranged on the opposing end part may also be the mask 122 having no polarization dependence.

It is also possible, for example, to leave out the light source unit 140 and configure the frame-like member 120 to emit light by using the light from the panel-purposed light source 110a as shown in FIG. 30. In the example shown in FIG. 30, the frame-like member 120 is formed on the back surface forming an end part of the light-emitting panel 110. Further, a light deflection member 126 for extracting the light emitted from the panel-purposed light source 110a and guided in the light-emitting panel 110 from the light emission surface 111 is provided in a region on the back surface of the light-emitting panel 110 specified as the bright part region 131.

Here, the light deflection member 126 is an optical member having a deflection function of deflecting the light propagating in the light-emitting panel 110 at the back surface of the light-emitting panel 110 and thereby having the light emitted from the light emission surface 111. In the following description, the light deflection member 126 can be referred to as a second light deflection member.

At least a part of the light deflected by the light deflection member 126 is emitted at an angle not satisfying the total reflection condition at the light emission surface 111. Here, light propagating in the light-emitting panel 110 without being incident upon the light deflection member 126 is reflected by the light emission surface 111 and is not emitted from the light emission surface 111, for example.

The light deflection member 126 is implemented by a prism, for example. In that case, the light deflection member 126 may be arranged continuously to cover the bright part region 131 on the back surface of the light-emitting panel 110. In this case, the size of each prism may be varied. Further, the light deflection member 126 can be substituted with a member other than a prism having the deflection function. The light deflection member 126 can be substituted with a print pattern or a surface-treated part such as a rough surface, for example. In this case, light is diffused and reflected by the print pattern or the surface-treated part such as a rough surface, by which light entering the region in the light-emitting panel 110 where the light deflection member 126 is formed is emitted from the light emission surface 111. In this case, density of the print pattern per unit area may be varied. It is also possible to stick a film having the light diffusion function.

Further, in the example shown in FIG. 30, an antireflection member 125a for preventing the light emitted from the panel-purposed light source 110a and guided in the light-emitting panel 110 from heading for the light emission surface 111 may be provided in a region on the back surface of the light-emitting panel 110 specified as the dark part region 132. Incidentally, the antireflection member 125a can be left out in a case where the light-emitting panel 110 is configured so that the light propagating in the light-emitting panel 110 is reflected by the light emission surface 111 and is not emitted from the light emission surface 111 as described earlier.

Also with a configuration like that shown in FIG. 30, the observer recognizes the bright part region 131 and the dark part region 132 on the back surface through the light emission surface 111 of the light-emitting panel 110.

In the example shown in FIG. 30, the light deflection member 126 corresponds to the light extraction member. Further, the antireflection member 125a corresponds to the light restriction member (more specifically, the second light restriction member). In the following description, the light extraction member provided for a reflective frame-like member 120 as shown in FIG. 30 can be referred to as a second light extraction member.

For example, the light deflection member 126 in this example deflects (including reflection) at least a part of the incident light and thereby increases the amount of the light heading for the space 112 from the bright part region 131 compared with a case where the member does not exist.

Further, for example, the antireflection member 125a in this example allows at least a part of the incident light (in this example, the light guided in the light-emitting panel 110) to pass through the dark part region 132 or a region corresponding to the dark part region 132 without being reflected in the region and thereby decreases the amount of the light heading for the space 112 from the dark part region 132 compared with a case where the member does not exist.

Also in this example, the end part where the frame-like member 120 is formed is not limited to the back surface. For example, it is also possible to provide the frame-like member 120 on a region as a part of a side face or the front surface of the fight-emitting panel 110.

Incidentally, in a case where the frame-like member 120 is provided on an end part of the front surface, a third light deflection member 125b (not shown) that reflects at least a part of the incident light (in this example, the light guided in the light-emitting panel 110) in the dark part region 132 or a region corresponding to the dark part region 132 and turns the light into light not heading for the space 112 may be provided instead of the antireflection member 125a. Here, the third light deflection member 125b may also be represented as a light deflection member that is provided in the dark part region 132 or a region corresponding to the dark part region 132 and deflects (including reflection) the light emitted from the panel-purposed light source and guided in the light-emitting panel into an angle not heading for the space 112. Incidentally, in a case where the front surface of the light-emitting panel is functioning as a part of a light guide path for guiding the light incident from the panel-purposed light source by means of total reflection, the third light deflection member 125b can be the light-emitting panel's front surface itself. The third light deflection member is an example of the second light restriction member.

Further, the configuration shown in FIG. 30 is also applicable to the frame-like member. For example, the configuration on the surface of a reflective frame-like member may be made the same as the above-described configuration on the back surface of the light-emitting panel 110. For example, it is possible to provide the antireflection member 125a in the dark part region 132 of the frame-like member or a region of the frame-like member corresponding to the dark part region 132 and provide the light deflection member 126 in the bright part region 131 of the frame-like member or a region of the frame-like member corresponding to the bright part region 131.

It is possible to appropriately combine some of the configurations of illumination devices in the above first to eighth embodiments. For example, a plurality of frame-like members may be arranged in front of, lateral to, or to the rear of the light-emitting panel. It is also possible to arrange a plurality of frame-like members 120 on a side face, the front surface or the back surface forming an end part of the light-emitting panel. It is also possible to use plural of the frame-like members 120 making use of an end part of the light-emitting panel 110.

In the present application, a range represented by a term like "parallel" and "orthogonal" indicating the position of a component, positional relationship between components or the shape of a component is a range taking into account tolerances in the manufacture, variations in the assembly, or the like. Therefore, when such a term like "parallel" and "orthogonal" indicating the position of a component, positional relationship between components or the shape of a component is used without describing "substantially" in the present application, the range represented by such a term means a range taking into account the tolerances in the manufacture, the variations in the assembly, or the like.

Further, while embodiments of the present invention have been described as above, the present invention is not limited to these embodiments. For example, while the examples described above showed examples in which the bright part region 131 and the dark part region 132 as the sunlight expression part 130 are provided on the frame-like member or an end part of the light-emitting panel corresponding to the frame-like member, it is also possible to provide only the bright part region 131 or only the dark part region 132, for example.

Based on the above-described embodiments, the contents of the present invention will be described below as appendixes.

APPENDIX 1

An illumination device comprising:
a frame forming part (12) that is provided at at least one position on an end part of a light-emitting panel having a light emission surface or in a vicinity of the light-emitting panel and includes a bright part region (131) and a dark part region (132);
a light source (140, 110a) that emits light to be incident upon the frame forming part; and
a light amount regulation part (22) that makes intensity of light heading for a space facing the light emission surface from the dark part region weaker than intensity of light heading for the space from the bright part region in the light entering the frame forming part from the light source, or strengthens the intensity of the light heading for the space from the bright part region than the intensity of the light heading for the space from the dark part region in the light entering the frame forming part from the light source.

APPENDIX 2

The illumination device according to appendix 1, comprising a first light transmission diffusion member (123) provided at a position closer to the space than the light amount regulation part (22).

APPENDIX 3

The illumination device according to appendix 1 or 2, wherein the frame forming part (12) includes a frame-like member (120, 120a, 220, 320, 420, 520, 620, 720, 820) on which the bright part region and the dark part region are provided.

APPENDIX 4

The illumination device according to appendix 3, wherein
the frame-like member includes a light transmissive member (121, 121a),
the light source is arranged to make light enter the frame-like member from a back side of the frame-like member when a surface of the frame-like member on a side facing the space is defined to be on a front side and a side opposite to the front side is defined as the back side, and
the light amount regulation part includes a first light restriction member (122, 122a, 122c, 151) that is arranged in the dark part region or a region corresponding to the dark part region in an optical path until the light emitted from the light source enters a back surface of the frame-like member and is emitted from a front surface of the frame-like member as light heading for the space and absorbs or reflects at least a part of incident light.

APPENDIX 5

The illumination device according to appendix 4, wherein the first light restriction member is a mask (122, 122a, 122c) that decreases an amount of the light heading for the space from the dark part region by blocking a part of light advancing to the space through the frame-like member.

APPENDIX 6

The illumination device according to appendix 5, wherein the light transmissive member (121 in FIG. 14) is configured so that its thickness increases with an increase in a distance from the light emission surface in at least a region including the bright part region or the dark part region, and
the mask is provided on the back side of the light transmissive member.

APPENDIX 7

The illumination device according to appendix 5 or 6, wherein the mask (122a) has light transmittance varying in a surface and is configured so that the light transmittance of a boundary part between the dark part region and the bright part region increases with an increase in a distance from the light emission surface.

APPENDIX 8

The illumination device according to any one of appendixes 4 to 6, wherein the mask (122a) has light transmittance varying in a surface and is configured so that the light transmittance of the dark part region becomes lower than the light transmittance of the bright part region.

APPENDIX 9

The illumination device according to any one of appendixes 4 to 8, further comprising a first light deflection member (150, 150*a*, 160) that deflects the light from the light source and guides the light to the frame-like member, wherein the first light deflection member includes a light reflection member (150*a*) that reflects the light from the light source unit and guides the light to the frame-like member or a light reflection diffusion member (150) that reflects and diffuses the light from the light source unit and guides the light to the frame-like member.

APPENDIX 10

The illumination device according to appendix 9, wherein the first light deflection member further includes a light transmission diffusion member (160) that is provided between the frame-like member and the light reflection member or the light reflection diffusion member.

APPENDIX 11

The illumination device according to appendix 9 or 10, wherein the light reflection member or the light reflection diffusion member includes a blocking wall (151) as a surface having a function of blocking light in a boundary part between a region on the back side corresponding to the bright part region 131 and a region on the back side corresponding to the dark part region 132.

APPENDIX 12

The illumination device according to any one of appendixes 4 to 11, further comprising a light guide part (740) that scatters the light from the light source while guiding the light, wherein
the light guide part is configured so that its region farther from the frame-like member emits more scattered light, and
the frame-like member receives the scattered light emitted from the light guide part and emits light heading for the space.

APPENDIX 14

The illumination device according to appendix 3, wherein
the frame-like member includes a light reflection member (124),
the light source is arranged to make light enter the frame-like member from a front side of the frame-like member when a surface of the frame-like member on a side facing the space is defined to be on the front side and a side opposite to the front side is defined as a back side, and
the light restriction member includes a second light restriction member (122*b*, 122*d*, 125*a*, 125*b*) that is arranged in the dark part region or a region corresponding to the dark part region in an optical path until the light emitted from the light source enters a front surface of the frame-like member and is emitted again from the front surface as light heading for the space and absorbs or transmits at least a part of incident light or deflects at least a part of the incident light into an angle not heading for the space.

APPENDIX 15

The illumination device according to any one of appendixes 3 to 14, wherein
the frame-like member includes a frame body (121*a*) provided on a light emission direction side of the light emission surface and including an opening part (170), and
the bright part region and the dark part region are provided at least on a side wall (171) of the opening part.

APPENDIX 16

The illumination device according to any one of appendixes 3 to 15, wherein when a traveling direction of the light emitted from the light emission surface is defined as a direction toward a front, the frame-like member has a shape that extends outward toward the front.

APPENDIX 17

The illumination device according to any one of appendixes 3 to 16, wherein the frame-like member is arranged to surround at least one of the space and the light-emitting panel.

APPENDIX 18

The illumination device according to any one of appendixes 3 to 17, comprising a flange part that is connected to a farthest end part of a region of the frame-like member where at least the bright part region or the dark part region is provided, farthest from the light emission surface, and extends outward from the end part.

APPENDIX 19

The illumination device according to appendix 18, wherein a frame body forming the frame-like member and the flange part are formed integrally.

APPENDIX 20

The illumination device according to appendix 1 or 2, wherein
the frame forming part is formed on a surface forming an end part of the light-emitting panel, and
the light amount regulation part includes a mask (122*c*) that is provided in a region on the surface specified as the dark part region and transmits light heading for the light-emitting panel from a panel-purposed light source while blocking the light from the light source or an antireflection member (125) that is provided in a region on the surface specified as the bright part region and transmits the light heading for the light-emitting panel from the panel-purposed light source and the light from the light source.

APPENDIX 21

The illumination device according to appendix 1 or 2, wherein the frame forming part is formed on a surface forming an end part of the light-emitting panel, and the light amount regulation part includes a second light deflection member (126) that is provided in a region on the surface specified as the bright part region and deflects light emitted from a panel-purposed light source and guided in the light-emitting panel and thereby has the light emitted from the light emission surface or a second light restriction member (125a, 125b) that is provided in a region on the surface specified as the dark part region and transmits or deflects the light emitted from the panel-purposed light source and guided in the light-emitting panel and thereby turns the light into light not heading for the space.

APPENDIX 22

The illumination device according to any one of appendixes 1 to 21, comprising a light splitting part that splits the light from the light source into light heading for an incidence surface of the light-emitting panel and light heading for the frame forming part.

APPENDIX 23

The illumination device according to any one of appendixes 1 to 22, wherein the light incident upon the frame forming part includes light emitted from the light source, passing through the light-emitting panel and being incident upon the frame forming part.

APPENDIX 24

The illumination device according to appendix 23, wherein the light incident upon the frame forming part includes light emitted from the light source, being incident upon an end face of the light-emitting panel, being guided in the light-emitting panel and thereafter being emitted from the light-emitting panel.

APPENDIX 25

The illumination device according to any one of appendixes 1 to 24, comprising a light-emitting panel that includes an optical medium on a nanometer order and emits scattered light generated by having incident light scattered by the optical medium from the light emission surface as the light-emitting panel.

APPENDIX 26

The illumination device according to any one of appendixes 1 to 25, wherein a ratio of luminance or luminous flux of the bright part region relative to the light emission surface in a state in which the light-emitting panel is emitting light is within a range of 1/20 to 30.

APPENDIX 27

The illumination device according to any one of appendixes 1 to 25, wherein a difference between a correlated color temperature of the light emitted from the light emission surface and a correlated color temperature of the light emitted from the bright part region in a state in which the light-emitting panel is emitting light is greater than or equal to 20000 K and less than or equal to 98000 K.

DESCRIPTION OF REFERENCE CHARACTERS 1-8, 1a, 4a, 5a, 5b, 7a: illumination device
110: light-emitting panel
111: light emission surface
112: space
22: light amount regulation part
120, 120a, 220, 320, 420, 520, 620, 720, 820: frame-like member
121, 121a: frame body
122, 122a, 122b, 122c, 122d: mask
122c: polarization mask
123: light transmission diffusion member
124, 124a: light reflection member
125, 125a: antireflection member
126: light deflection member
130: sunlight expression part
131: bright part region
132: dark part region
133: boundary part
140, 140a: light source unit
150: light reflection diffusion member
151: blocking wall
150a: light reflection member
160: light transmission diffusion member
170: opening part
171: side wall
172: storage part
180: light splitting part
110a: panel-purposed light source
115: panel-purposed light source drive unit
116: lighting control unit
145: light source drive unit
230: flange part
233: flange surface
231: plate-shaped part
232: light diffusion member
740: light guide part
750: light reflection diffusion member

What is claimed is:

1. An illumination device comprising:
a frame-like member that is provided at at least one position on an end part of a light-emitting panel having a light emission surface or in a vicinity of the light-emitting panel, the frame-like member including a bright part region and a dark part region;
a light source that emits light to be incident upon the frame-like member; and
a light amount regulation part that makes intensity of light heading for a space facing the light emission surface from the dark part region weaker than intensity of light heading for the space from the bright part region in the light entering the frame-like member from the light source, or makes the intensity of the light heading for the space from the bright part region stronger than the intensity of the light heading for the space from the dark part region in the light entering the frame-like member from the light source.

2. The illumination device according to claim 1, wherein a ratio of luminance between the bright part region and the dark part region when the light source is on is within a range of 100:1 to 20:1.

3. The illumination device according to claim 1, wherein a ratio of luminance or luminous flux of the bright part region relative to the light emission surface in a state in which the light-emitting panel is emitting light is within a range of 1/20 to 30.

4. The illumination device according to claim 1, wherein a ratio of luminance or luminous flux of the bright part region relative to the light emission surface in a state in which the light-emitting panel is emitting light is within a range of 1/20 to 30.

5. The illumination device according to claim 1, further comprising a first light transmission diffusion member provided at a position closer to the space than the light amount regulation part.

6. The illumination device according to claim 1, wherein
the frame-like member includes a light transmissive member,
the light source is arranged to make light enter the frame-like member from a back side of the frame-like member when a surface of the frame-like member on a side facing the space is defined to be on a front side and a side opposite to the front side is defined as the back side, and
the light amount regulation part includes a first light restriction member that is arranged in the dark part region or a region corresponding to the dark part region in an optical path until the light emitted from the light source enters a back surface of the frame-like member and is emitted from a front surface of the frame-like member as light heading for the space and absorbs or reflects at least a part of incident light.

7. The illumination device according to claim 6, wherein the first light restriction member is a mask that decreases an amount of the light heading for the space from the dark part region by blocking a part of light advancing to the space through the frame-like member.

8. The illumination device according to claim 7, wherein
the light transmissive member is configured so that a thickness of the light transmissive member increases with an increase in a distance from the light emission surface in at least a region including the bright part region or the dark part region, and
the mask is provided on the back side of the light transmissive member.

9. The illumination device according to claim 7, wherein the mask has light transmittance varying in a surface and is configured so that the light transmittance of a boundary part between the dark part region and the bright part region increases with an increase in a distance from the light emission surface.

10. The illumination device according to claim 6, further comprising a first light deflection member that deflects the light from the light source and guides the light to the frame-like member,
wherein the first light deflection member includes a light reflection member that reflects the light from the light source and guides the light to the frame-like member or a light reflection diffusion member that reflects and diffuses the light from the light source and guides the light to the frame-like member.

11. The illumination device according to claim 10, wherein the first light deflection member further includes a light transmission diffusion member that is provided between the frame-like member and the light reflection member or the light reflection diffusion member.

12. The illumination device according to claim 6, wherein
the frame-like member includes a light reflection member,
the light source is arranged to make light enter the frame-like member from a front side of the frame-like member when a surface of the frame-like member on a side facing the space is defined to be on the front side and a side opposite to the front side is defined as a back side, and
the first light restriction member includes a second light restriction member that is arranged in the dark part region or a region corresponding to the dark part region in an optical path until the light emitted from the light source enters a front surface of the frame-like member and is emitted again from the front surface as light heading for the space and absorbs or transmits at least a part of incident light or deflects at least a part of the incident light into an angle not heading for the space.

13. The illumination device according to claim 4, wherein when a traveling direction of the light emitted from the light emission surface is defined as a direction toward a front, the frame-like member has a shape that extends outward toward the front.

14. The illumination device according to claim 4, wherein
the frame-like member includes a frame body provided on a light emission direction side of the light emission surface and including an opening part, and
the bright part region and the dark part region are provided at least on a side wall of the opening part.

15. The illumination device according to claim 4, comprising a flange part that is connected to a farthest end part of a region of the frame-like member where at least the bright part region or the dark part region is provided, farthest from the light emission surface, and extends outward from the end part.

16. The illumination device according to claim 1, wherein
the frame-like member is formed on a surface forming an end part of the light-emitting panel,
the light amount regulation part includes a mask that is provided in a region on the surface specified as the dark part region and transmits light heading for the light-emitting panel from a panel-purposed light source while blocking the light from the light source or an antireflection member that is provided in a region on the surface specified as the bright part region and transmits light heading for the light-emitting panel from the panel-purposed light source and light from the light source, and
the dark part region and the bright part region are arranged so as to be visually recognized by an observer.

17. The illumination device according to claim 1, wherein
the light-emitting panel emits illuminating light at a color temperature representing a color of a natural sky,
the frame-like member is formed on a surface forming an end part of the light-emitting panel,
the light amount regulation part includes a second light deflection member that is provided in a region on the surface specified as the bright part region and deflects light emitted from a panel-purposed light source and guided in the light-emitting panel and thereby has the light emitted from the light emission surface or a second light restriction member that is provided in a region on the surface specified as the dark part region and transmits or deflects the light emitted from the panel-purposed light source and guided in the light-emitting panel and thereby turns the light into light not heading for the space,
a correlated color temperature of the illuminating light emitted from the light-emitting panel when the light source is on is 10000 [K] to 100000 [K], and
a correlated color temperature of the light emitted from the bright part region is 2000 [K] to 7000 [K].

18. The illumination device according to claim 1, comprising a light splitting part that splits the light from the light source into light heading for an incidence surface of the light-emitting panel and light heading for the frame-like member.

19. The illumination device according to claim 1, wherein the light incident upon the frame-like member includes light emitted from the light source, passing through the light-emitting panel and being incident upon the frame-like member.

20. The illumination device according to claim 1, comprising a light-emitting panel that includes an optical medium having at least one of nanoparticles, a sol-gel hardened oxide, cavities, surface concave parts, and surface convex parts and emits scattered light generated by having incident light scattered by the optical medium from the light emission surface as the light-emitting panel.

21. An illumination device comprising:
a frame-like member that is provided at at least one position on an end part of a light-emitting panel having a light emission surface or in a vicinity of the light-emitting panel, the frame-like member including a bright part region and a dark part region;
a light source that emits light to be incident upon the frame-like member; and
a light amount regulation part that makes intensity of light heading for a space facing the light emission surface from the dark part region weaker than intensity of light heading for the space from the bright part region in the light entering the frame-like member from the light source, or makes the intensity of the light heading for the space from the bright part region stronger than the intensity of the light heading for the space from the dark part region in the light entering the frame-like member from the light source, wherein
the frame-like member includes a light transmissive member,
the light source is arranged to make light enter the frame-like member from a back side of the frame-like member when a surface of the frame-like member on a side facing the space is defined to be on a front side and a side opposite to the front side is defined as the back side, and
the light amount regulation part includes a first light restriction member that is arranged in the dark part region or a region corresponding to the dark part region in an optical path until the light emitted from the light source enters a back surface of the frame-like member and is emitted from a front surface of the frame-like member as light heading for the space and absorbs or reflects at least a part of incident light.

* * * * *